United States Patent
Sugama et al.

(10) Patent No.: US 12,181,833 B2
(45) Date of Patent: Dec. 31, 2024

(54) PHOTORESPONSIVE POLYMER

(71) Applicant: Konica Minolta, Inc., Tokyo (JP)

(72) Inventors: Kouji Sugama, Musashino (JP); Yukiko Nakai, Toyohashi (JP); Haruo Horiguchi, Koganei (JP); Kazuaki Nakamura, Hino (JP); Toyoko Shibata, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 677 days.

(21) Appl. No.: 17/376,281

(22) Filed: Jul. 15, 2021

(65) Prior Publication Data
US 2022/0043366 A1    Feb. 10, 2022

(30) Foreign Application Priority Data
Aug. 7, 2020  (JP) .................. 2020-135376

(51) Int. Cl.
*G03G 9/087*    (2006.01)
*C08G 63/688*   (2006.01)
(Continued)

(52) U.S. Cl.
CPC ....... *G03G 9/08768* (2013.01); *C08G 63/688* (2013.01); *C09J 9/00* (2013.01);
(Continued)

(58) Field of Classification Search
CPC .............. G03G 9/08711; G03G 9/08791
See application file for complete search history.

(56) References Cited

U.S. PATENT DOCUMENTS

| 2013/0066068 A1 | 3/2013 | Norikane et al. |
| 2014/0323704 A1 | 10/2014 | Norikane |

(Continued)

FOREIGN PATENT DOCUMENTS

| JP | 58-57138 | * 4/1983 | ............ G03G 9/122 |
| JP | H05-323298 A | 12/1993 | |

(Continued)

OTHER PUBLICATIONS

Translation of JP 58-57138.*
(Continued)

*Primary Examiner* — Peter L Vajda
(74) *Attorney, Agent, or Firm* — LUCAS & MERCANTI, LLP

(57) ABSTRACT

[Object]
An object of the present invention is to provide a photoresponsive polymer that sufficiently secures photoresponsiveness to be fluidized by light irradiation and reversibly non-fluidized, improves fixability, and further has good color reproducibility.
[Solution]
Provided is a photoresponsive polymer containing a structural unit derived from an azomethine derivative represented by the following general formula (1), the photoresponsive polymer being fluidized by light irradiation and reversibly non-fluidized:

$$R_1\text{—}Z_1\text{=}Z_2\text{—}R_2 \quad \text{General formula (1):}$$

$Z_1$ and $Z_2$ are N or CH, while $Z_1 \neq Z_2$, $R_1$ contains an aromatic hydrocarbon structure, $R_2$ contains an aromatic heterocyclic structure, and a hydrogen atom is bonded to at least one carbon atom bonded adjacent to a carbon atom in the aromatic heterocyclic structure bonded to the $Z_2$.

26 Claims, 3 Drawing Sheets

(51) Int. Cl.
*C09J 9/00* (2006.01)
*C09J 167/00* (2006.01)
*G03G 15/20* (2006.01)

(52) U.S. Cl.
CPC ........ *C09J 167/00* (2013.01); *G03G 15/2098* (2021.01); *C08G 2170/00* (2013.01)

(56) References Cited

U.S. PATENT DOCUMENTS

2020/0012026 A1* 1/2020 Saito .......................... C08J 5/18
2020/0263088 A1* 8/2020 Horiguchi .............. C09K 19/24

FOREIGN PATENT DOCUMENTS

| JP | H08-092324 A | 4/1996 |
| JP | 2011256155 A | 12/2011 |
| WO | 2013081155 A1 | 6/2013 |

OTHER PUBLICATIONS

Bagheri, M.; et al., "Synthesis of polymers containing donor-acceptor Schiff base in side chain for nonlinear optics", European Polymer Journal, vol. 38, Issue 2, 2002, pp. 317-326.

Japanese Patent Office, "Notice of Reasons for Refusal", drafted on Mar. 29, 2024, which was issued in connection with related Japanese patent application No. 2020-135376 and its English translation, 11 pages.

* cited by examiner

[FIG. 1]
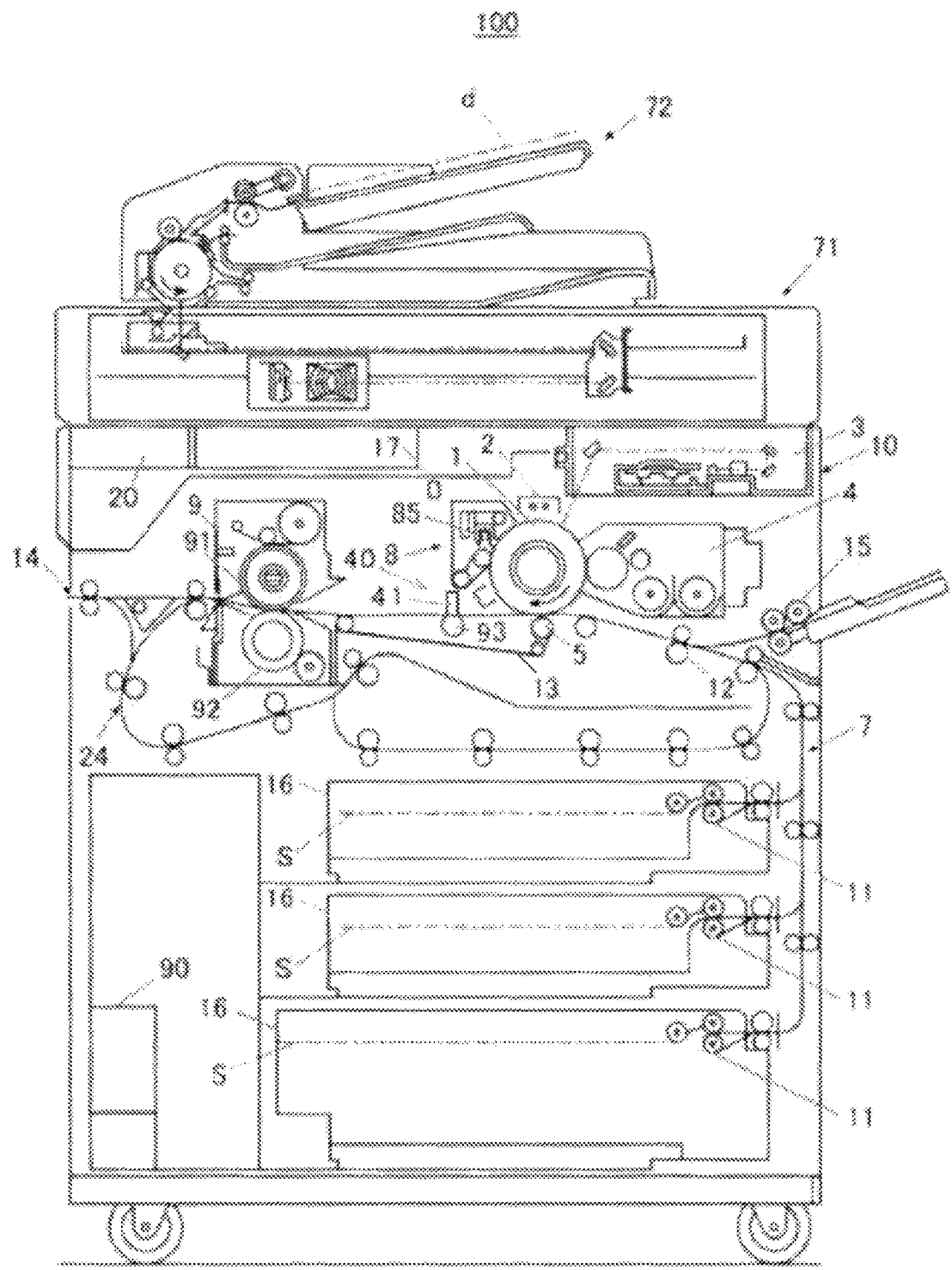

[FIG. 2]
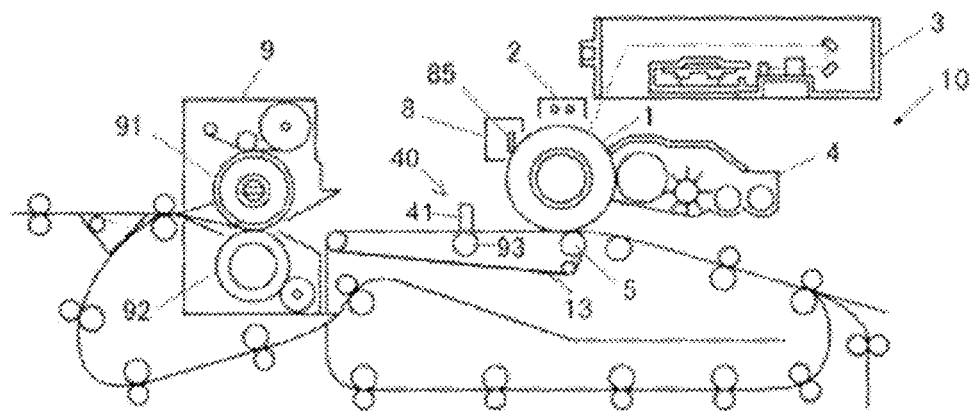

[FIG. 3]
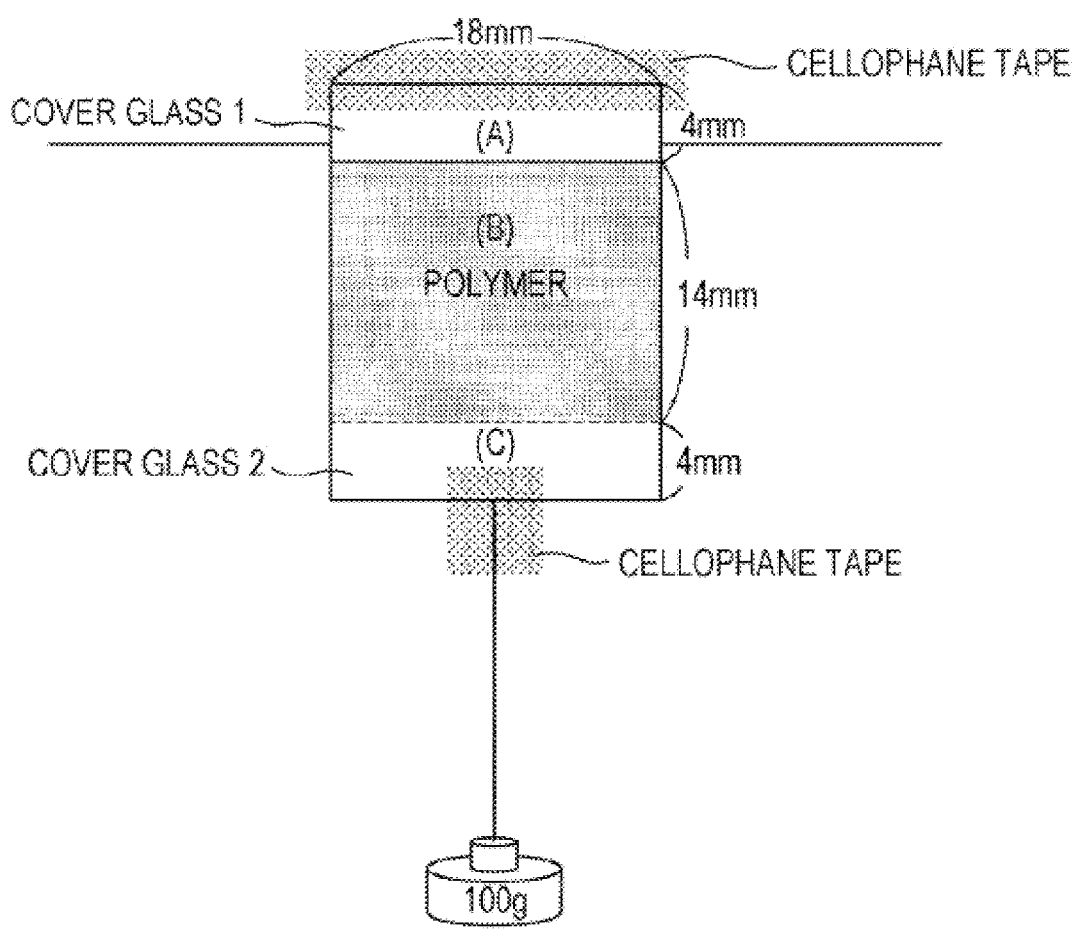

PHOTORESPONSIVE POLYMER

TECHNICAL FIELD

The present invention relates to a photoresponsive polymer that is fluidized by light irradiation and reversibly non-fluidized.

BACKGROUND ART

Photoresponsive materials are known as materials whose fluidity changes by light irradiation. For example, an azobenzene compound (azobenzene derivative) described in Patent Literature 1 or Patent Literature 2 causes a phase change accompanying an isomerization reaction by light irradiation.

This molecular structure change is considered to induce a phase transition from a solid state to a fluidized state. In addition, by changing a wavelength and performing re-irradiation, heating, or leaving in a dark place at room temperature, a reverse reaction occurs and solidifies again.

CITATION LIST

Patent Literature

[Patent Literature 1] JP2011-256155A
[Patent Literature 2] WO2013/081155 A1

SUMMARY OF INVENTION

Technical Problem

However, it has been found that since the azobenzene derivative described in Patent Literature 1 or Patent Literature 2 has a relatively low molecular weight, toughness as a material is low, and sufficient fixability is not realized. In addition, it has been found that all of the azobenzene derivatives described in Patent Literature 1 and Patent Literature 2 have coloring of yellow to orange, and there is a problem that a desired color cannot be reproduced when the azobenzene derivative is applied to industrial products such as toners and adhesives.

Therefore, an object of the present invention is to provide a photoresponsive polymer that sufficiently secures photoresponsiveness to be fluidized by light irradiation and reversibly non-fluidized, improves fixability, and further has good color reproducibility.

Solution to Problem

In view of the above problems, the present inventors have conducted extensive research and have found that the above problems can be solved by providing a photoresponsive polymer containing a structural unit derived from an azomethine derivative represented by the following general formula (1), the photoresponsive polymer being fluidized by light irradiation and reversibly non-fluidized:

[Chemical 1]

$$R_1-Z_1=Z_2-R_2 \quad \text{General formula (1):}$$

wherein $Z_1$ and $Z_2$ are N or CH, while $Z_1 \neq Z_2$, $R_1$ contains an aromatic hydrocarbon structure, $R_2$ contains an aromatic heterocyclic structure, and a hydrogen atom is bonded to at least one carbon atom bonded adjacent to a carbon atom in the aromatic heterocyclic structure bonded to the $Z_2$, which has led to the completion of the present invention.

Advantageous Effects of Invention

According to the present invention, it is possible to provide a photoresponsive polymer that sufficiently secures photoresponsiveness to be fluidized by light irradiation and reversibly non-fluidized, improves fixability, and further has good color reproducibility.

BRIEF DESCRIPTION OF DRAWINGS

FIG. 1 is a schematic configuration diagram illustrating an image forming apparatus 100 used in an image forming method according to an embodiment of the present invention.

FIG. 2 is a schematic configuration diagram of an irradiation unit 40 in the image forming apparatus 100.

FIG. 3 is a schematic view of an apparatus for measuring a change in adhesion associated with light irradiation of a polymer used in a photoresponsive adhesion test of Examples.

DESCRIPTION OF EMBODIMENTS

Preferred embodiments of the present invention will now be described. In the present specification, the "from X to Y" indicating the range means "X or more and Y or less". Also, in the present specification, unless otherwise specified, the operation and the measurement of physical properties and the like are carried out under conditions of room temperature (from 20 to 25° C.)/relative humidity from 40 to 50% RH.

<Photoresponsive Polymer>

An embodiment of the present invention is a photoresponsive polymer containing a structural unit derived from an azomethine derivative represented by the following general formula (1), the photoresponsive polymer being fluidized by light irradiation and reversibly non-fluidized:

[Chemical 2]

$$R_1-Z_1=Z_2-R_2 \quad \text{General formula (1):}$$

wherein $Z_1$ and $Z_2$ are N or CH, while $Z_1 \neq Z_2$, $R_1$ contains an aromatic hydrocarbon structure, $R_2$ contains an aromatic heterocyclic structure, and a hydrogen atom is bonded to at least one carbon atom bonded adjacent to a carbon atom in the aromatic heterocyclic structure bonded to the $Z_2$.

Here, the general formula (1) will be described using one of the following specific examples. As shown in the following formula:

[Chemical 3]

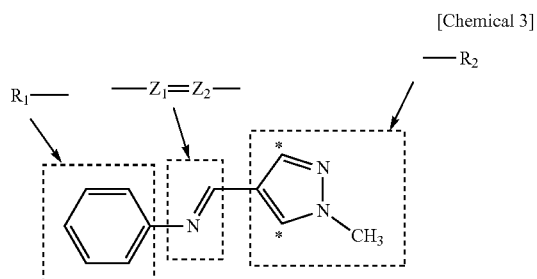

a carbon atom in the aromatic heterocyclic structure is bonded to $Z_2$, at least one of bonding sites adjacent to the carbon atom (that is, bonding sites represented by *) is a carbon atom (two carbon atoms in the specific example), and a hydrogen atom (two hydrogen atoms in the specific example) is bonded to the carbon atom (two carbon atoms in the specific example). In the present specification, the "photoresponsive polymer" may also be simply referred to as a "polymer". By being a photoresponsive polymer containing such a structural unit derived from an azomethine derivative, it is possible to provide a photoresponsive polymer that sufficiently secures photoresponsiveness to be fluidized by light irradiation and reversibly non-fluidized, improves fixability, and further has good color reproducibility.

In the present specification, the phrase "is fluidized by light irradiation and reversibly non-fluidized" refers to changing from a non-fluidized state to a fluidized state by light irradiation and further returning to a non-fluidized state. That is, the polymer of the present invention is in a non-fluid solid state when not irradiated with light at normal temperature and normal pressure, and is softened by light irradiation to change to a fluidized state. The light irradiation is stopped, and the polymer is left in a dark place at room temperature or under visible light irradiation, or heated, thereby returning to the non-fluid solid state. In the present specification, the fluidized state refers to a state of being deformed by a small external force.

A mechanism of exhibiting such a technical effect is presumed as follows. However, the technical scope of the present invention is not limited to such mechanism. That is, an azobenzene compound having a long-chain alkyl chain at a terminal, which is a conventional example, is a material that absorbs light and softens (optical phase transition) from a solid state, and the optical phase transition is considered to be caused by collapse of crystal structure due to cis-trans isomerization. The azobenzene compound described in JP 2011-256155 A or WO 2013/081155 A1 undergoes a phase change accompanying an isomerization reaction by light irradiation, but the present inventors have found that such an azobenzene compound has a problem of low toughness as a material. In addition, it has been found that since these compounds exhibit strong absorption derived from n–π* transition in a visible light region and are colored in orange, there is a problem in that it is difficult to reproduce a desired color when the compounds are applied to industrial products.

In the present invention, a polymer containing a structural unit derived from an azomethine derivative is used. As a result, it has been realized to provide a polymer that is fluidized by light irradiation and reversibly non-fluidized, has high toughness, and is not significantly colored. Here, in a polymer containing a structural unit derived from an azomethine derivative, it is considered that the azomethine derivative absorbs light, and thermal energy released in a photoexcitation-deactivation process is transferred to repeating units (structural units) to be bonded (photothermal conversion), thereby inducing a reversible fluidization and non-fluidization phenomenon. In particular, when the polymer is a trans-form, trans-cis photoisomerization is more likely to occur by light irradiation in addition to the photothermal conversion described above, and a cis-form having a low Tg is likely to be produced. It is considered that when a non-fluid trans-form (E) is irradiated with light and isomerized into a cis-form (Z), many trans-forms (E) change to cis-forms (Z), so that its ordered structure collapses and a phase transition change, that is, a fluidization phenomenon can be induced. In addition, it is considered that when the cis-form (Z) returns to the trans-form (E), the ordered structure is formed again, and a non-fluidization phenomenon can be induced. Accordingly, it is considered that a more efficient fluidization and non-fluidization phenomenon can be induced. Therefore, in order to induce the fluidization phenomenon, it is considered preferable that many trans-forms (E) are isomerized into cis-forms (Z). However, in general, an azomethine derivative may have a higher cis-trans isomerization rate as compared to an azobenzene derivative, and it has been anticipated that it is disadvantageous to induce fluidization in an azomethine derivative in which an unsubstituted benzene ring is bonded to both ends of a C=N bond.

Therefore, in the present invention, in the polymer containing an azomethine derivative, a polymer having an aromatic hydrocarbon group and an aromatic heterocyclic group respectively at both ends of the C=N part and using a cyclic structure in which a hydrogen atom is bonded to at least one of carbons adjacent to a carbon bonded to the C=N part in the heterocyclic ring, whereby fluidization associated with a photoisomerization reaction could be induced. This is considered to be because introduction of a heterocyclic ring decreases cis→trans reaction rate, and further, in a cis-form, the hydrogen atom on the carbon adjacent to the carbon bonded to the C=N part of the heterocyclic ring and the aromatic hydrocarbon group form a CH-π interaction, whereby the cis-form is stabilized, and more cis-forms are produced.

In an embodiment of the present invention, the photoresponsive polymer has a structural unit derived from an azomethine derivative represented by the general formula (1) having a polymerizable group.

In an embodiment of the present invention, the photoresponsive polymer has a structural unit derived from an azomethine derivative represented by the general formula (1) as a side chain in a repeating unit in the photoresponsive polymer.

In an embodiment of the present invention, the photoresponsive polymer contains at least one selected from the group consisting of structures derived from a (meth)acrylic acid ester, structures derived from an olefin, and structures derived from a vinyl ester. In an embodiment of the present invention, the photoresponsive polymer includes a structure derived from a (meth)acrylic acid ester. With such an embodiment, the photoresponsive polymer has a technical effect that polymerization is easy.

In an embodiment of the present invention, the photoresponsive polymer contains a structural unit represented by general formula (2):

[Chemical 4]

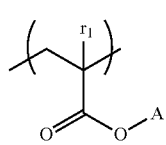

General formula (2)

in the general formula (2), $r_1$ is a hydrogen atom or a methyl group, and

A is any one of general formulae (1-1) to (1-4):

[Chemical 5]

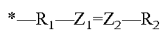   General formula (1-1)

[Chemical 6]

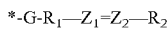   General formula (1-2)

[Chemical 7]

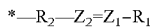   General formula (1-3)

[Chemical 8]

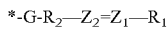   General formula (1-4)

wherein
* represents a bonding point, G is a divalent group, and $R_1$, $Z_1$, $Z_2$ and $R_2$ are as defined in the general formula (1). With such an embodiment, a desired effect of the present invention can be efficiently exhibited.

Here, the general formula (1-2) will be described using one of the following specific examples. Typically, as shown in the following formula:

[Chemical 9]

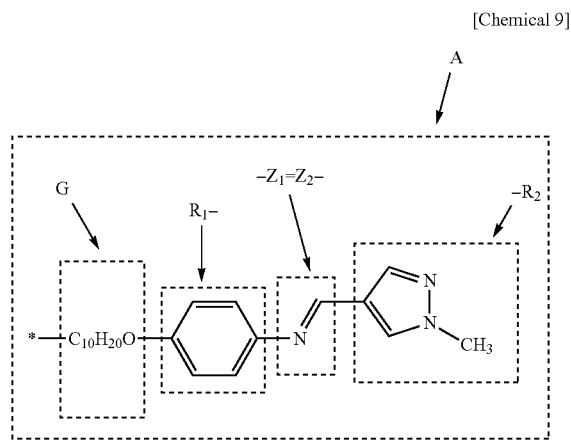

"$R_1$—", "—$Z_1=Z_2$—", and "—$R_2$" are as described above, G as a divalent group is an oxyalkylene group having 10 carbon atoms, and the A is bonded to a structural unit derived from a (meth)acrylic acid ester using the G as a bonding point.

In an embodiment of the present invention, all atoms bonded adjacent to a carbon atom in the aromatic heterocyclic structure bonded to the $Z_2$ are carbon atoms, and a hydrogen atom is bonded to each of the said carbon atoms (that is, all the said carbon atoms bond to a hydrogen atom respectively). With such an embodiment, the desired effect of the present invention, particularly, fixability, is remarkably improved.

Hereinafter, the general formula (1) and the general formula (2) will be further described.
($Z_1$ and $Z_2$)
In an embodiment of the present invention, as described above, $Z_1$ and $Z_2$ are N or CH, while $Z_1 \neq Z_2$.
($R_1$ and $R_2$)
In an embodiment of the present invention, as described above, $R_1$ contains an aromatic hydrocarbon structure, and $R_2$ contains an aromatic heterocyclic structure.

In an embodiment of the present invention, the aromatic hydrocarbon structure is not particularly limited; however, an aromatic hydrocarbon having 6 to 30 carbon atoms is preferable, and for example, is derived from a structure of benzene, naphthalene, anthracene, phenanthrene, pyrene, biphenyl, or the like. Among them, benzene, naphthalene and phenanthrene are preferable from the viewpoint of easily developing packing between molecular chains, exhibiting high thermal mobility when trans-cis isomerization is performed, and easily inducing a fluidization phenomenon.

In an embodiment of the present invention, the aromatic hydrocarbon structure has a polycyclic structure such as naphthalene, anthracene, phenanthrene, or pyrene.

In an embodiment of the present invention, the aromatic heterocyclic structure is not particularly limited; however, an aromatic heterocyclic structure having 2 to 30 carbon atoms is preferable. In addition, those having high electron donating properties are preferable, and examples thereof include those derived from structures of thiophene, pyrrole, pyrazole, imidazole, pyridine, pyrimidine, pyrazine, triazine, benzothiophene, benzimidazole, indole, isoindole, quinoline, isoquinoline, quinazoline, quinoxaline, naphthyridine, acridine, a carbazole group, dibenzothiophene, and the like.

In an embodiment of the present invention, when the photoresponsive polymer contains the structural unit represented by the general formula (2), and the A is represented by the general formula (1-1) or the general formula (1-2), the aromatic hydrocarbon structure represented by the $R_1$ is a divalent group. That is, the aromatic hydrocarbon structure is an arylene group having 6 to 30 carbon atoms such as a phenylene group, a naphthalenylene group, an anthracenylene group, a phenanthrenylene group, or a pyrenylene group. In an embodiment of the present invention, when the photoresponsive polymer contains the structural unit represented by the general formula (2), and the A is represented by the general formula (1-3) or the general formula (1-4), the aromatic hydrocarbon structure represented by the $R_1$ is a monovalent group. That is, the aromatic hydrocarbon structure is an aryl group having 6 to 30 carbon atoms such as a phenyl group, a biphenyl group, a naphthyl group, an anthracenyl group, a phenanthrenyl group, or a pyrenyl group.

In an embodiment of the present invention, when the photoresponsive polymer contains the structural unit represented by the general formula (2), and the A is represented by the general formula (1-1) or the general formula (1-2), the aromatic heterocyclic structure represented by the $R_2$ is a monovalent group. That is, the aromatic heterocyclic structure is, for example, a group such as a thienyl group, a furanyl group, a pyrrolyl group, a pyrazolyl group, an imidazolyl group, a pyridyl group, a pyrimidinyl group, a pyrazinyl group, a triazinyl group, a benzothienyl group, a benzimidazolyl group, an indolyl group, an isoindolyl group, a quinolinyl group, an isoquinolinyl group, a quinazolinyl group, a quinoxalinyl group, a naphthyridinyl group, an acridinyl group, a carbazolyl group, or a dibenzothienyl group. In an embodiment of the present invention, when the photoresponsive polymer contains the structural unit represented by the general formula (2), and the A is represented by the general formula (1-3) or the general formula (1-4), the aromatic heterocyclic structure represented by the $R_2$ is a divalent group. That is, examples of the aromatic heterocyclic structure include divalent groups corresponding to the groups exemplified as the monovalent aromatic heterocyclic group.

In an embodiment of the present invention, each of the aromatic hydrocarbon structure and the aromatic heterocyclic structure may have a substituent. The substituent is not particularly limited; however, examples thereof include a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, an alkoxycarbonyl group having 2 to 19 carbon atoms, and the like. Preferred are a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, and an alkoxycarbonyl group having 2 to 19 carbon atoms. At this time, it is preferable that at least one of the substituents is a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 18 carbon atoms, or an alkoxycarbonyl group having 2 to 18 carbon atoms. It is considered that by having such a structure, cis-trans isomerization is more likely to proceed, and fluidization is likely to occur. Among them, the substituent is more preferably an alkyl group having 1 to 18 carbon atoms, an alkoxy group having 1 to 18 carbon atoms or a dialkylamino group having 2 to 10 carbon atoms because of high thermal mobility.

As the number of carbon atoms of the substituent, the alkyl group is more preferably an alkyl group having 1 to 12 carbon atoms, and further preferably an alkyl group having 4 to 8 carbon atoms. Moreover, the alkoxy group is more preferably an alkoxy group having 1 to 12 carbon atoms, and further preferably an alkoxy group having 4 to 8 carbon atoms. Further, the dialkylamino group is more preferably a dialkylamino group having 2 to 8 carbon atoms, and further preferably a dialkylamino group having 4 to 6 carbon atoms. The acyl group is more preferably an acyl group having 2 to 13 carbon atoms, and further preferably an acyl group having 5 to 13 carbon atoms. Furthermore, the alkoxycarbonyl group is more preferably an alkoxycarbonyl group having 2 to 13 carbon atoms, and further preferably an alkoxycarbonyl group having 5 to 13 carbon atoms. As such, by introducing a long-chain substituent, crystals become liable to collapse, photo-meltability is improved, and fixability is improved. Examples of the alkyl group having 1 to 18 carbon atoms are not particularly limited, and examples thereof include linear alkyl groups such as a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, and an n-hexadecyl group; and branched alkyl groups such as an isopropyl group, a sec-butyl group, an isobutyl group, a t-butyl group, a 1-methylpentyl group, a 4-methyl-2-pentyl group, a 3,3-dimethylbutyl group, a 2-ethylbutyl group, a 1-methylhexyl group, a t-octyl group, a 1-methylheptyl group, a 2-ethylhexyl group, a 2-propylpentyl group, a 2,2-dimethylheptyl group, a 2,6-dimethyl-4-heptyl group, a 3,5,5-trimethylhexyl group, a 1-methyldecyl group, and a 1-hexylheptyl group.

Examples of the alkoxy group having 1 to 18 carbon atoms include linear alkoxy groups such as a methoxy group, an ethoxy group, an n-propoxy group, an n-butoxy group, an n-pentyloxy group, an n-hexyloxy group, an n-heptyloxy group, an n-octyloxy group, an n-nonyloxy group, an n-decyloxy group, an n-undecyloxy group, an n-dodecyloxy group, an n-tridecyloxy group, an n-tetradecyloxy group, an n-pentadecyloxy group, and an n-hexadecyloxy group; and branched alkoxy groups such as a 1-methylpentyloxy group, a 4-methyl-2-pentyloxy group, a 3,3-dimethylbutyloxy group, a 2-ethylbutyloxy group, a 1-methylhexyloxy group, a t-octyloxy group, a 1-methylheptyloxy group, a 2-ethylhexyloxy group, a 2-propylpentyloxy group, a 2,2-dimethylheptyloxy group, a 2,6-dimethyl-4-heptyloxy group, a 3,5,5-trimethylhexyloxy group, a 1-methyldecyloxy group, and a 1-hexylheptyloxy group.

Examples of the alkylamino group having 1 to 10 carbon atoms include a methylamino group, an ethylamino group, an n-propylamino group, an n-butylamino group, an isobutylamino group, an n-hexylamino group, an n-heptylamino group, an n-octylamino group, an n-nonylamino group, an n-decylamino group, and the like.

Examples of the dialkylamino group having 2 to 10 carbon atoms include a dimethylamino group, a diethylamino group, a di-n-propylamino group, a di-n-butylamino group, a di-isobutylamino group, a methylethylamino group, and the like.

Examples of the acyl group having 2 to 19 carbon atoms include saturated or unsaturated linear or branched acyl groups such as an acetyl group, a propanoyl group (propionyl group), a butanoyl group (butyryl group), an isobutanoyl group (isobutyryl group), a pentanoyl group (valeryl group), an isopentanoyl group (isovaleryl group), a sec-pentanoyl group (2-methylbutyryl group), a t-pentanoyl group (pivaloyl group), a hexanoyl group, a heptanoyl group, an octanoyl group, a t-octanoyl group (2,2-dimethylhexanoyl group), a 2-ethylhexanoyl group, a nonanoyl group, an isononanoyl group, a decanoyl group, an isodecanoyl group, an undecanoyl group, a lauroyl group, a myristoyl group, a palmitoyl group, a stearoyl group, a behenoyl group, an undecylenoyl group, an oleoyl group, and the like.

Examples of the alkoxycarbonyl group having 2 to 19 carbon atoms include linear or branched alkoxycarbonyl groups such as linear alkoxycarbonyl groups such as a methoxycarbonyl group, an ethoxycarbonyl group, an n-butoxycarbonyl group, an n-hexyloxycarbonyl group, an n-heptyloxycarbonyl group, an n-octyloxycarbonyl group, an n-nonyloxycarbonyl group, an n-decyloxycarbonyl group, an n-undecyloxycarbonyl group, an n-dodecyloxycarbonyl group, an n-tridecyloxycarbonyl group, an n-tetradecyloxycarbonyl group, an n-pentadecyloxycarbonyl group, and an n-hexadecyloxycarbonyl group; and branched alkoxycarbonyl groups such as a 1-methylpentyloxycarbonyl group, a 4-methyl-2-pentyloxycarbonyl group, a 3,3-dimethylbutyloxycarbonyl group, a 2-ethylbutyloxycarbonyl group, a 1-methylhexyloxycarbonyl group, a t-octyloxycarbonyl group, a 1-methylheptyloxycarbonyl group, a 2-ethylhexyloxycarbonyl group, a 2-propylpentyloxycarbonyl group, a 2,2-dimethylheptyloxycarbonyl group, a 2,6-dimethyl-4-heptyloxycarbonyl group, a 3,5,5-trimethylhexyloxycarbonyl group, a 1-methyldecyloxycarbonyl group, and a 1-hexylheptyloxycarbonyl group.

($r_1$)

In an embodiment of the present invention, as described above, $r_1$ is a hydrogen atom or a methyl group. In such an embodiment, the $r_1$ is preferably a hydrogen atom, from the viewpoint of having high fluidity and excellent fixability when trans-cis isomerization is performed.

(A)

In an embodiment of the present invention, as described above, A is any of:

[Chemical 10]

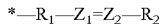   General formula (1-1)

*—$R_1$—$Z_1$=$Z_2$—$R_2$

[Chemical 11]

*-G-$R_1$—$Z_1$=$Z_2$—$R_2$   General formula (1-2)

[Chemical 12]

*—$R_2$—$Z_2$=$Z_1$-$R_1$   General formula (1-3)

[Chemical 13]

*-G-$R_2$—$Z_2$=$Z_1$—R   General formula (1-4)

wherein * represents a bonding point, G is a divalent group, and $R_1$, $Z_1$, $Z_2$ and $R_2$ are as defined in the general formula (1).

In an embodiment of the present invention, the G is not particularly limited as long as it is a divalent group, but the G is preferably an alkylene group having 1 to 18 carbon atoms or an oxyalkylene group having 1 to 18 carbon atoms. With such an embodiment, thermal mobility is high and photo-meltability is excellent. In an embodiment of the present invention, the G is an alkylene group having 2 to 16 carbon atoms, an alkylene group having 3 to 14 carbon atoms, or an alkylene group having 4 to 12 carbon atoms. In an embodiment of the present invention, the oxyalkylene group is represented by -(E-O)$_n$—, E is an alkylene group having 1 to 18 carbon atoms (2 to 16 carbon atoms, 3 to 14 carbon atoms, or 4 to 12 carbon atoms), and n is 1 to 3 and preferably 1.

In an embodiment of the present invention, as an example of the alkylene group having 1 to 18 carbon atoms, a group obtained by removing one hydrogen atom from the group described as the examples of the alkyl group having 1 to 18 carbon atoms is suitable.

($Z_2$—$R_2$)

In an embodiment of the present invention, when the A is represented by the general formula (1-1) or the general formula (1-2), a "$Z_2$—$R_2$" structure is represented by the following formula:

[Chemical 14]

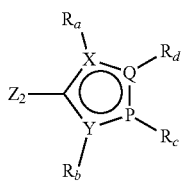

wherein at least two of X, Y, P and Q are carbon atoms, and the remainder is a nitrogen atom, a sulfur atom or an oxygen atom, provided that at least one of X and Y is a carbon atom, and $R_a$, $R_b$, $R_c$ and $R_d$ are alkyl groups having 1 to 18 carbon atoms, alkoxy groups having 1 to 18 carbon atoms or hydrogen atoms, provided that at least one of $R_a$ and $R_b$ is a hydrogen atom, and $R_a$ and $R_b$ and $R_c$ and $R_d$ may each independently form a fused ring with a benzene ring or the like.

In an embodiment of the present invention, it is preferable that at least one of P and Q is a nitrogen atom, and it is more preferable that two of P and Q are nitrogen atoms.

In an embodiment of the present invention, it is preferable that $R_a$ and $R_b$ are both hydrogen atoms.

In an embodiment of the present invention, at least one of $R_c$ and $R_d$ is an alkyl group having 1 to 18 carbon atoms, an alkyl group having 1 to 12 carbon atoms, an alkyl group having 3 to 8 carbon atoms, or an alkyl group having 4 to 6 carbon atoms. In particular, the alkyl group having 4 or more carbon atoms efficiently exhibits a desired effect (particularly, a fixability improving effect when used in a toner) of the present invention.

(—$R_2$—$Z_2$)

In an embodiment of the present invention, when the A is represented by the general formula (1-3) or the general formula (1-4), the "—$R_2$—$Z_2$" structure is represented by the following formula:

[Chemical 15]

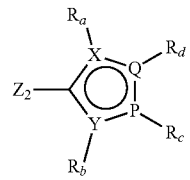

wherein at least two of X, Y, P and Q are carbon atoms, and the remainder is a nitrogen atom, a sulfur atom or an oxygen atom, provided that at least one of X and Y is a carbon atom, and $R_a$ and $R_b$ are alkyl groups having 1 to 18 carbon atoms, alkoxy groups having 1 to 18 carbon atoms or hydrogen atoms, provided that at least one of $R_a$ and $R_b$ is a hydrogen atom, and one of $R_c$ and $R_d$ is a structure derived from a polymerizable group such as a structural unit derived from a (meth)acrylic acid ester or a single bond bonded to the G, and the other is an alkyl group having 1 to 18 carbon atoms, an alkoxy group having 1 to 18 carbon atoms or a hydrogen atom.

In an embodiment of the present invention, it is preferable that at least one of P and Q is a nitrogen atom, and it is more preferable that two of P and Q are nitrogen atoms.

In an embodiment of the present invention, it is preferable that $R_a$ and $R_b$ are both hydrogen atoms. In an embodiment of the present invention, one of $R_c$ and $R_d$ is a structure derived from a polymerizable group such as a structural unit derived from a (meth)acrylic acid ester or a single bond bonded to the G, and the other is preferably a hydrogen atom.

Such an embodiment efficiently exhibits the desired effect (particularly, the fixability improving effect) of the present invention.

In an embodiment of the present invention, the A is represented by the general formula (1-1) or the general formula (1-2), wherein the "$Z_2$—$R_2$" structure is represented by the following formula:

[Chemical 16]

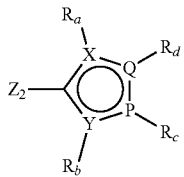

wherein at least two of X, Y, P and Q are carbon atoms, and the remainder is a nitrogen atom, a sulfur atom or an oxygen atom, provided that at least one of X and Y is a carbon atom, and $R_a$, $R_b$, $R_c$ and $R_d$ are each independently an alkyl group having 1 to 18 carbon atoms, an alkoxy group having 1 to 18 carbon atoms or a hydrogen atom when $R_a$, $R_b$, $R_c$ and $R_d$ are present according to valences of X, Y, P and Q, provided that at least one of $R_a$ and $R_b$ bonded to a carbon atom is a hydrogen atom, and $R_a$ and $R_b$ and $R_c$ and $R_d$ may each independently form a fused ring. Such an embodiment efficiently exhibits the desired effect (particularly, the fixability improving effect) of the present invention.

In an embodiment of the present invention, the P and the Q are nitrogen atoms, the X and the Y are both carbon atoms, and the $R_a$ and the $R_b$ are both hydrogen atoms.

In an embodiment of the present invention, the P and the Q are nitrogen atoms, the X and the Y are both carbon atoms, the $R_a$ and the $R_b$ are both hydrogen atoms, and at least one (either one) of the $R_c$ and $R_d$ is an alkyl group having 4 or more carbon atoms. Such an embodiment efficiently exhibits the desired effect (particularly, the fixability improving effect) of the present invention.

In an embodiment of the present invention, the A is represented by the general formula (1-3) or the general formula (1-4), wherein the "—$R_2$—$Z_2$" structure is represented by the following formula:

[Chemical 17]

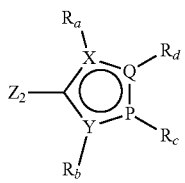

wherein at least two of X, Y, P and Q are carbon atoms, and the remainder is a nitrogen atom, a sulfur atom or an oxygen atom, provided that at least one of X and Y is a carbon atom, and $R_a$ and $R_b$ are each independently an alkyl group having 1 to 18 carbon atoms, an alkoxy group having 1 to 18 carbon atoms or a hydrogen atom when $R_a$ and $R_b$ are present according to valences of X, Y, P and Q, provided that at least one of $R_a$ and $R_b$ bonded to a carbon atom is a hydrogen atom, one of $R_c$ and $R_d$ is a structure derived from a polymerizable group or a single bond bonded to the G, and the other is an alkyl group having 1 to 18 carbon atoms, an alkoxy group having 1 to 18 carbon atoms or a hydrogen atom when the said other is present according to the valence. Such an embodiment efficiently exhibits the desired effect (particularly, the fixability improving effect) of the present invention.

In an embodiment of the present invention, the P and the Q are nitrogen atoms, the X and the Y are both carbon atoms, the $R_a$ and the $R_b$ are both hydrogen atoms, and one of the $R_c$ and the $R_d$ is a structure derived from a polymerizable group or a single bond bonded to the G, and the other is not present. Such an embodiment efficiently exhibits the desired effect (particularly, the fixability improving effect) of the present invention.

<Method for Producing Photoresponsive Polymer>

An embodiment of the present invention provides a method for producing a photoresponsive polymer containing a structural unit derived from an azomethine derivative represented by the following general formula (1), the photoresponsive polymer being fluidized by light irradiation and reversibly non-fluidized:

[Chemical 18]

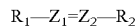

$R_1$—$Z_1$=$Z_2$—$R_2$    General formula (1):

wherein $Z_1$ and $Z_2$ are N or CH, while $Z_1 \neq Z_2$, $R_1$ contains an aromatic hydrocarbon structure, $R_2$ contains an aromatic heterocyclic structure, and a hydrogen atom is bonded to at least one carbon atom bonded adjacent to a carbon atom in the aromatic heterocyclic structure bonded to the $Z_2$.

In an embodiment of the present invention, the photoresponsive polymer can be obtained by preparing an azomethine derivative (monomer) represented by the general formula (1) having a polymerizable group, and polymerizing the azomethine derivative by a conventionally known method.

In an embodiment of the present invention, the photoresponsive polymer can be obtained by preparing an azomethine derivative (monomer) represented by any one of the following formulas:

[Chemical 19]

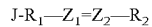

J-$R_1$—$Z_1$=$Z_2$—$R_2$    General formula (1-1')

[Chemical 20]

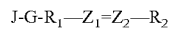

J-G-$R_1$—$Z_1$=$Z_2$—$R_2$    General formula (1-2')

[Chemical 21]

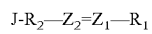

J-$R_2$—$Z_2$=$Z_1$—$R_1$    General formula (1-3')

[Chemical 22]

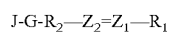

J-G-$R_2$—$Z_2$=$Z_1$—$R_1$    General formula (1-4')

wherein J is a polymerizable group, and G, $R_1$, $Z_1$, $Z_2$ and $R_2$ are as defined in the general formula (1), and polymerizing the azomethine derivative by a conventionally known method.

(Specific Example of Method for Preparing Azomethine Derivative Having Polymerizable Group)

Preparation of the azomethine derivative having a polymerizable group can be performed by preparing the azomethine derivative represented by the general formula (1) and introducing a polymerizable group into the azomethine derivative.

For example, in the case of preparing an azomethine derivative containing a pyrazole ring, as a first stage, an aniline derivative is reacted with a pyrazolecarbaldehyde derivative as a compound having a pyrazole ring. At this time, when either the aniline derivative or the pyrazolecarbaldehyde derivative as a raw material has an OH group as a substituent, a polymerizable group can be easily introduced into a position of the OH group.

Specifically, 4-hydroxyaniline and 1-methyl-1H-pyrazole-4-carbaldehyde are treated (reacted by heating and refluxing) in a solvent such as methanol (MeOH) or ethanol (EtOH), the reaction liquid is filtered, and a powder thus obtained is washed with cold ethanol and recrystallized with methanol/ethanol, whereby a target substance can be obtained.

[Chemical 23]

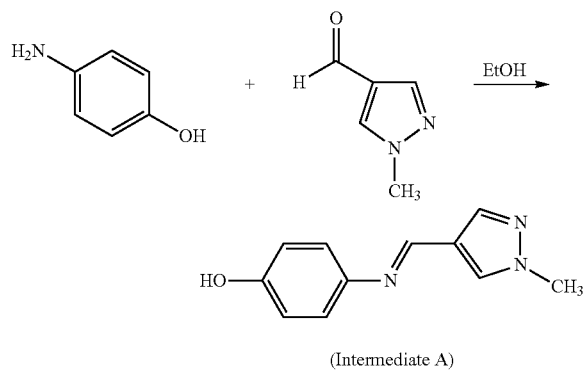

(Intermediate A)

Thereafter, as a second stage, a polymerizable group is introduced into the intermediate A. The method of introducing a polymerizable group is also not particularly limited. For example, in the case of first introducing —O—$C_{10}H_{20}$— as a linker into the intermediate A, for example, Cl—$C_{10}H_{20}$—OH as a halogenated alcohol compound is reacted to obtain the following intermediate B.

The reaction conditions are not particularly limited; however, for example, it is preferable that the reaction is carried out in a solvent such as dimethylformamide (DMF), in the presence of potassium carbonate and potassium iodide, preferably within the range of 10° C. or more and 150° C. or less, more preferably within the range of 50° C. or more and 140° C. or less, and further preferably within the range of 80° C. or more and 130° C. or less. Meanwhile, the order of addition of potassium carbonate and potassium iodide is preferably potassium carbonate first, and potassium carbonate is added, and before adding potassium iodide, stirring is performed preferably within the range of 0° C. or more and 100° C. or less, more preferably within the range of 0° C. or more and 60° C. or less, and further preferably within the range of 0° C. or more and 40° C. or less.

[Chemical 24]

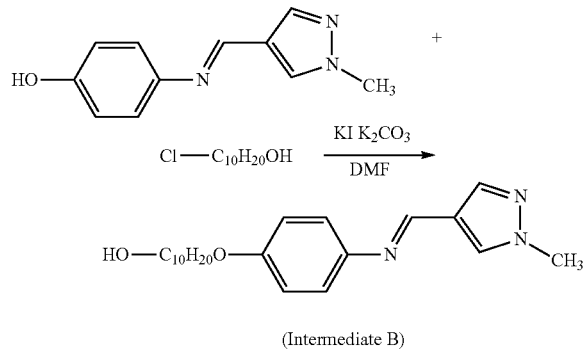

(Intermediate B)

Thereafter, as a third stage, a compound for constituting a polymerizable group, for example, an acrylate or a methacrylate is reacted with the intermediate B. As a result, the photoresponsive polymer contains a structural unit derived from a (meth)acrylic acid ester. At this time, the reaction conditions are not particularly limited. For example, it is preferable that the reaction is carried out in a known organic solvent in the presence of a tertiary amine such as triethylamine or triethanolamine. Preferably, while maintaining a mixed liquid containing the intermediate B, a tertiary amine, and a solvent at 0° C. to 10° C., a compound for constituting a polymerizable group, such as an acrylate or a methacrylate, is added dropwise to this mixed liquid, and the mixture is mixed. Thereafter, the mixed liquid is reacted, for example, at room temperature for about 5 to 10 hours, whereby an azomethine derivative having a polymerizable group can be obtained.

[Chemical 25]

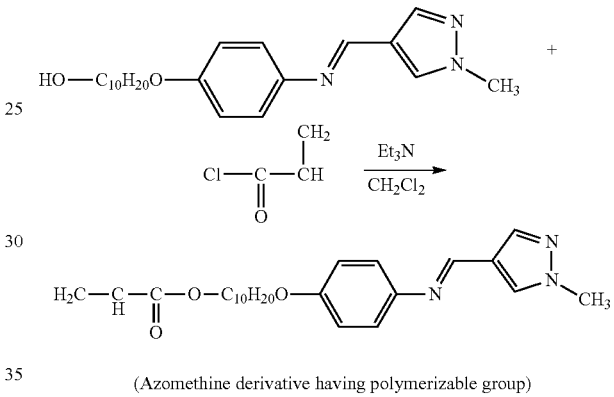

(Azomethine derivative having polymerizable group)

Meanwhile, an azomethine derivative having a desired substituent can be obtained by changing the raw materials to be used to other compounds in the first stage. Similarly, an azomethine derivative having a different structure can be obtained by changing the aniline derivative as a raw material to an aromatic hydrocarbon compound or aromatic heterocyclic compound having another amino group.

In addition, groups having a polymerizable group having a different structure can be introduced by changing the compounds to be added in the second stage and the third stage. A person skilled in the art can synthesize an azomethine derivative having a desired polymerizable group by appropriately making the above changes and selecting appropriate reaction conditions.

Furthermore, a polymerizable group can also be introduced into the intermediate A without carrying out the second stage, by appropriately selecting the raw materials to be used in the first stage.

An embodiment of the present invention is a photoresponsive polymer containing a structural unit derived from an azomethine derivative represented by the following general formula (1), the photoresponsive polymer being fluidized by light irradiation and reversibly non-fluidized:

[Chemical 26]

$$R_1-Z_1=Z_2-R_2$$  General formula (1):

wherein $Z_1$ and $Z_2$ are N or CH, while $Z_1 \neq Z_2$, $R_1$ contains an aromatic hydrocarbon structure, $R_2$ contains an aromatic heterocyclic structure, and a hydrogen atom is bonded to at least one carbon atom bonded adjacent to a carbon atom in the aromatic heterocyclic structure bonded to the $Z_2$, with the exception of azomethine derivatives of the following structures (specifically disclosed in Tables 1 to 8):

a polymer containing a structural unit derived from an azomethine derivative having a polymerizable group represented by the following chemical formula (1), the polymer being reversibly fluidized by light irradiation and non-fluidized, in which X, Y, $Z_1$, $Z_2$, and $R_1$ to $R_{10}$ are represented by Table 1 below:

[Chemical 27]

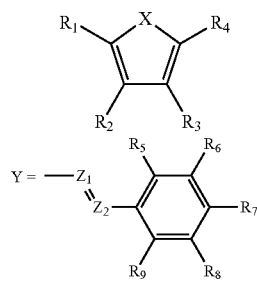

(1)

Here, the "Group having polymerizable group" in Table 1 is a group represented by any one of the following formulas (i) to (iv), and corresponds to a group represented by the "Polymerizable group position" in Table 1 among $R_1$ to $R_{10}$:

[Chemical 28]

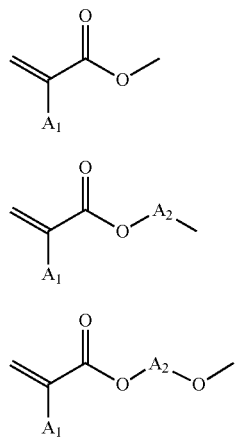

(i)

(ii)

(iii)

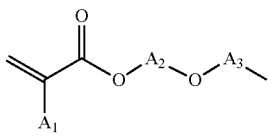

(iv)

in the formulas (i) to (iv), $A_1$ is a hydrogen atom or a methyl group, $A_2$ is an alkylene group having 1 to 18 carbon atoms, and $A_3$ is an alkylene group having 1 to 6 carbon atoms.

A block copolymer containing a polymer block containing a structural unit derived from an azomethine derivative having a polymerizable group represented by the chemical formula (1) and reversibly fluidized by light irradiation and non-fluidized, in which X, Y, $Z_1$, $Z_2$, and $R_1$ to $R_{10}$ are represented by Table 2 below (the group having a polymerizable group is the same as described above):

a polymer having a structural unit represented by the following general formula (1), the polymer having a structural unit shown in Table 3, fluidized by light irradiation and reversibly non-fluidized ($r_1$ is a hydrogen atom or a methyl group, and $r_2$ is an alkylene group having 1 to 18 carbon atoms):

[Chemical 28-1]

General formula (1)

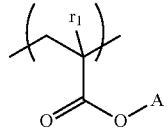

A is a group having an azomethine structure represented by the following general formula (2):

[Chemical 28-2]

General formula (2)

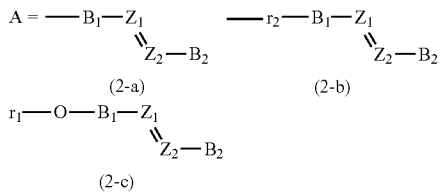

(2-a)   (2-b)

(2-c)

TABLE 1

| | Group having polymerizable group | | | | | Azomethine derivative | | | | | | | | | | | | |
|---|---|---|---|---|---|---|---|---|---|---|---|---|---|---|---|---|---|---|
| | | | A₂ | A₃ | | | | Z | | | | | | R | | | | |
| | Structure | A₁ | Number of carbon atoms | Number of carbon atoms | Polymerizable group position | X | Y | Z₁ | Z₂ | R₁ | R₂ | R₃ | R₄ | R₅ | R₆ | R₇ | R₈ | R₉ | R₁₀ |
| 1 | (iii) | H | 6 | — | R₇ | S | R₄ | CH | N | CH₃ | H | H | — | H | H | — | H | — |
| 2 | (iii) | H | 6 | — | R₇ | S | R₄ | CH | N | C₆H₁₃ | H | H | — | H | H | — | H | — |
| 3 | (iii) | H | 6 | — | R₇ | S | R₄ | CH | N | C₈H₁₇ | H | H | — | H | H | — | H | — |
| 4 | (iii) | H | 6 | — | R₇ | S | R₄ | CH | N | C₁₂H₂₅ | H | H | — | H | H | — | H | — |
| 5 | (iii) | H | 6 | — | R₇ | S | R₄ | CH | N | C(CH₃)₃ | H | H | — | H | H | — | H | — |
| 6 | (iii) | H | 6 | — | R₇ | S | R₄ | CH | N | OCH₃ | H | H | — | H | H | — | H | — |
| 7 | (iii) | H | 6 | — | R₇ | S | R₄ | CH | N | OC₆H₁₃ | H | H | — | H | H | — | H | — |
| 8 | (iii) | H | 6 | — | R₇ | S | R₄ | CH | N | COOCH₃ | H | H | — | H | H | — | H | — |
| 9 | (iii) | H | 6 | — | R₇ | S | R₄ | CH | N | COOC₆H₁₃ | H | H | — | H | H | — | H | — |
| 10 | (iii) | H | 6 | — | R₇ | S | R₄ | CH | N | CHOCH₃ | H | H | — | H | H | — | H | — |
| 11 | (iii) | H | 6 | — | R₇ | S | R₄ | CH | N | CHOC₆H₁₃ | H | H | — | H | H | — | H | — |
| 12 | (iii) | H | 6 | — | R₇ | S | R₄ | CH | N | H | H | H | — | H | H | — | H | — |
| 13 | (iii) | H | 6 | — | R₇ | S | R₄ | CH | N | Br | H | H | — | H | H | — | H | — |
| 14 | (iii) | H | 6 | — | R₇ | S | R₄ | CH | N | CN | H | H | — | H | H | — | H | — |
| 15 | (iii) | H | 6 | — | R₇ | S | R₄ | CH | N | NO₂ | H | H | — | H | H | — | H | — |
| 16 | (iii) | H | 6 | — | R₇ | S | R₄ | CH | N | C₆H₁₃ | CH₃ | H | — | H | H | — | H | — |
| 17 | (iii) | H | 6 | — | R₇ | S | R₄ | CH | N | C₆H₁₃ | C₃H₇ | H | — | H | H | — | H | — |
| 18 | (iii) | H | 6 | — | R₇ | S | R₄ | CH | N | C₆H₁₃ | C(CH₃)₃ | H | — | H | H | — | H | — |
| 19 | (iii) | H | 6 | — | R₇ | S | R₄ | CH | N | C₆H₁₃ | Br | H | — | H | H | — | H | — |
| 22 | (iii) | H | 6 | — | R₇ | S | R₄ | CH | N | C₆H₁₃ | H | H | — | H | H | — | H | — |
| 23 | (iii) | H | 6 | — | R₇ | S | R₄ | CH | N | C₆H₁₃ | H | — | H | H | H | — | H | — |
| 24 | (iii) | H | 6 | — | R₇ | S | R₄ | CH | N | C₆H₁₃ | H | — | H | H | H | — | H | — |
| 25 | (iii) | H | 6 | — | R₇ | S | R₄ | CH | N | H | H | H | — | CH₃ | H | — | H | — |
| 26 | (iii) | H | 6 | — | R₇ | S | R₄ | CH | N | CH₃ | CH₃ | H | — | H | H | — | H | — |
| 27 | (iii) | H | 6 | — | R₇ | S | R₄ | CH | N | CH₃ | CH₃ | H | CH₃ | CH₃ | CH₃ | — | H | — |
| 28 | (iii) | H | 3 | — | R₇ | S | R₃ | CH | N | CH₃ | H | H | H | H | H | — | H | — |
| 29 | (iii) | H | 3 | — | R₇ | S | R₃ | CH | N | C₆H₁₃ | H | H | H | H | H | — | H | — |
| 30 | (iii) | H | 8 | — | R₇ | S | R₃ | CH | N | CH₃ | CH₃ | H | CH₃ | H | H | — | H | — |
| 31 | (iii) | H | 12 | — | R₇ | S | R₄ | CH | N | C₆H₁₃ | H | H | — | H | H | — | H | — |
| 32 | (iii) | H | 12 | — | R₇ | S | R₄ | N | CH | CH₃ | H | H | — | H | H | — | H | — |
| 33 | (iii) | H | 6 | — | R₇ | S | R₄ | N | CH | CH₃ | H | H | — | H | H | — | H | — |
| 34 | (iii) | H | 6 | — | R₇ | S | R₄ | CH | N | C₆H₁₃ | H | H | — | H | H | — | H | — |
| 35 | (iii) | H | 6 | — | R₇ | S | R₃ | CH | N | CH₃ | H | H | — | H | H | — | H | — |
| 36 | (iii) | H | 6 | — | R₇ | S | R₄ | CH | N | C₆H₁₃ | H | H | — | H | H | — | H | — |
| 37 | (iii) | H | 6 | — | R₇ | S | R₄ | CH | N | CH₃ | H | H | — | H | H | — | H | — |
| 38 | (iii) | H | 6 | — | R₇ | S | R₄ | CH | N | C₆H₁₃ | H | H | — | H | H | — | H | — |
| 39 | (ii) | H | 6 | — | R₇ | S | R₄ | CH | N | CH₃ | H | H | — | H | H | — | H | — |
| 40 | (ii) | H | 6 | — | R₇ | S | R₄ | CH | N | CH₃ | H | H | — | H | H | — | H | — |
| 41 | (iii) | CH₃ | 6 | — | R₇ | S | R₄ | CH | N | C₆H₁₃ | H | H | — | H | H | — | H | — |
| 42 | (iii) | CH₃ | 6 | — | R₇ | S | R₄ | CH | N | CH₃ | H | H | — | H | H | — | H | — |
| 43 | (iii) | CH₃ | 8 | — | R₇ | S | R₄ | CH | N | C₆H₁₃ | H | H | H | H | H | — | H | — |
| 44 | (iii) | CH₃ | 6 | — | R₇ | S | R₄ | N | CH | CH₃ | H | H | — | H | H | — | H | — |

TABLE 1-continued

| | | Group having polymerizable group | | | | Polymerizable group position | Azomethine derivative | | | | | | | | | | | | | | |
|---|---|---|---|---|---|---|---|---|---|---|---|---|---|---|---|---|---|---|---|---|---|
| | Structure | $A_1$ | $A_2$ Number of carbon atoms | $A_3$ Number of carbon atoms | | | X | Y | $Z_1$ | $Z_2$ | $R_1$ | $R_2$ | $R_3$ | $R_4$ | $R_5$ | $R_6$ | $R_7$ | $R_8$ | $R_9$ | $R_{10}$ |
| 45 | (iii) | H | 6 | — | | $R_6$ | S | $R_4$ | CH | N | — | — | — | — | H | — | H | H | H | — |
| 46 | (iii) | H | 6 | — | | $R_5$ | S | $R_4$ | CH | N | — | — | — | — | — | H | H | H | H | — |
| 47 | (iii) | H | 6 | — | | $R_1$ | S | $R_4$ | CH | N | $CH_3$ | H | H | H | H | H | $CH_3$ | H | H | — |
| 48 | (iii) | H | 6 | — | | $R_1$ | S | $R_4$ | CH | N | $CH_3$ | H | H | H | H | H | $C_6H_{13}$ | H | H | — |
| 49 | (iii) | H | 6 | — | | $R_1$ | S | $R_4$ | CH | N | — | H | H | H | H | H | $OC_{12}H_{25}$ | H | H | — |
| 50 | (iii) | H | 6 | — | | $R_1$ | S | $R_4$ | CH | N | — | H | H | H | H | H | $OC_6H_{13}$ | H | H | — |
| 51 | (iii) | H | 6 | — | | $R_1$ | S | $R_4$ | CH | N | — | H | H | H | H | H | H | H | H | — |
| 52 | (iii) | H | 6 | — | | $R_1$ | S | $R_4$ | CH | N | — | $CH_3$ | H | H | H | $CH_3$ | $C_6H_{13}$ | H | H | — |
| 53 | (iii) | H | 6 | — | | $R_1$ | S | $R_3$ | CH | N | — | H | H | H | H | H | $CH_3$ | H | H | — |
| 54 | (iii) | H | 6 | — | | $R_1$ | S | $R_4$ | CH | N | — | H | H | H | H | H | $CH_3$ | H | H | — |
| 55 | (iv) | H | 6 | 1 | | $R_1$ | S | $R_4$ | CH | N | — | H | H | H | H | H | $CH_3$ | H | H | — |
| 56 | (iv) | H | 6 | 2 | | $R_1$ | S | $R_4$ | CH | N | — | H | H | H | H | H | H | H | H | — |
| 57 | (iii) | H | 6 | — | | $R_2$ | S | $R_4$ | CH | N | H | H | H | H | H | H | H | H | H | — |
| 58 | (iii) | H | 6 | — | | $R_2$ | S | $R_3$ | CH | N | $CH_3$ | H | H | H | H | H | H | H | H | — |
| 59 | (iii) | H | 6 | — | | $R_7$ | O | $R_4$ | CH | N | $C_6H_{13}$ | H | H | H | H | H | — | H | H | — |
| 60 | (iii) | H | 6 | — | | $R_1$ | O | $R_3$ | CH | N | — | H | H | H | H | H | — | H | H | — |
| 61 | (iii) | H | 6 | — | | $R_7$ | O | $R_4$ | CH | N | H | H | H | H | H | H | — | H | H | — |
| 62 | (iii) | H | 6 | — | | $R_7$ | O | $R_3$ | CH | N | $CH_3$ | H | H | H | H | H | — | H | H | — |
| 63 | (iii) | H | 6 | — | | $R_7$ | O | $R_3$ | N | CH | $CH_3$ | H | H | H | H | H | $CH_3$ | H | H | — |
| 64 | (iii) | H | 6 | — | | $R_1$ | O | $R_3$ | CH | N | — | H | H | H | H | H | — | H | H | — |
| 65 | (iii) | H | 6 | — | | $R_7$ | $NR_{10}$ | $R_3$ | CH | N | H | H | H | H | H | H | — | H | H | H |
| 66 | (iii) | H | 6 | — | | $R_7$ | $NR_{10}$ | $R_3$ | CH | N | H | H | H | H | H | H | — | H | H | $CH_3$ |
| 67 | (iii) | H | 6 | — | | $R_7$ | $NR_{10}$ | $R_3$ | CH | N | H | H | H | H | H | H | — | H | H | $C_6H_{13}$ |
| 68 | (iii) | H | 6 | — | | $R_7$ | $NR_{10}$ | $R_3$ | CH | N | H | H | H | H | H | H | — | H | H | $C_8H_{17}$ |
| 69 | (iii) | H | 6 | — | | $R_7$ | $NR_{10}$ | $R_3$ | CH | N | $CH_3$ | H | H | H | H | H | — | H | H | $C(CH_3)_3$ |
| 70 | (iii) | H | 6 | — | | $R_7$ | $NR_{10}$ | $R_3$ | CH | N | $CH_3$ | H | H | H | H | H | — | H | H | $CH_3$ |
| 71 | (iii) | H | 6 | — | | $R_7$ | $NR_{10}$ | $R_3$ | CH | N | H | $CH_3$ | H | H | H | H | — | H | H | $CH_3$ |
| 72 | (iii) | H | 6 | — | | $R_7$ | $NR_{10}$ | $R_3$ | CH | N | $CH_3$ | $CH_3$ | H | H | H | H | — | H | H | $CH_3$ |
| 73 | (iii) | H | 6 | — | | $R_7$ | $NR_{10}$ | $R_3$ | CH | N | $C_6H_{13}$ | H | H | H | H | H | — | H | H | $OCOCH_3$ |
| 74 | (iii) | H | 6 | — | | $R_7$ | $NR_{10}$ | $R_3$ | CH | N | $C_8H_{17}$ | H | H | H | H | H | — | H | H | H |
| 75 | (iii) | H | 6 | — | | $R_7$ | $NR_{10}$ | $R_3$ | CH | N | $C_6H_{13}$ | H | H | H | H | H | — | H | H | $CH_3$ |
| 76 | (iii) | H | 6 | — | | $R_7$ | $NR_{10}$ | $R_3$ | CH | N | $C_8H_{17}$ | H | H | H | H | H | — | H | H | $CH_3$ |
| 77 | (iii) | H | 6 | — | | $R_7$ | $NR_{10}$ | $R_3$ | CH | N | $CH_3$ | $CH_3$ | H | H | H | H | — | H | H | $CH_3$ |
| 78 | (iii) | H | 6 | — | | $R_7$ | $NR_{10}$ | $R_3$ | CH | N | $C_6H_{13}$ | $CH_3$ | H | H | H | H | — | H | H | H |
| 79 | (iii) | H | 6 | — | | $R_7$ | $NR_{10}$ | $R_3$ | CH | N | $CH_3$ | $CH_3$ | H | H | H | H | — | H | H | $CH_3$ |
| 80 | (iii) | H | 6 | — | | $R_7$ | $NR_{10}$ | $R_4$ | CH | N | $CH_3$ | H | H | H | H | H | — | H | H | $CH_3$ |
| 81 | (iii) | H | 6 | — | | $R_7$ | $NR_{10}$ | $R_3$ | CH | N | H | H | H | H | H | H | — | H | H | $CH_3$ |
| 82 | (iii) | H | 6 | — | | $R_7$ | $NR_{10}$ | $R_3$ | CH | N | H | H | H | H | H | H | — | H | H | $CH_3$ |
| 83 | (iii) | H | 6 | — | | $R_7$ | $NR_{10}$ | $R_4$ | CH | N | — | H | H | H | H | H | — | H | H | $CH_3$ |
| 84 | (iii) | H | 6 | — | | $R_7$ | $NR_{10}$ | $R_3$ | CH | N | H | H | H | H | H | H | — | H | H | $CH_3$ |
| 85 | (iii) | H | 6 | — | | $R_2$ | $NR_{10}$ | $R_4$ | CH | N | — | H | H | H | H | H | $CH_3$ | H | H | $CH_3$ |
| 86 | (iii) | H | 6 | — | | $R_2$ | $NR_{10}$ | $R_3$ | CH | N | H | H | H | H | H | H | $CH_3$ | H | H | $CH_3$ |
| 87 | (iii) | H | 6 | — | | $R_1$ | $NR_{10}$ | $R_3$ | CH | N | — | H | H | H | H | H | $C_6H_{13}$ | H | H | $CH_3$ |
| 88 | (iii) | H | 6 | — | | $R_1$ | $NR_{10}$ | $R_3$ | CH | N | — | H | H | H | H | H | $C_{12}H_{25}$ | H | H | $CH_3$ |

TABLE 1-continued

| Azomethine derivative monomer | Structure | Group having polymerizable group | | | Polymerizable group position | Azomethine derivative | | | | | | | | | | | | |
|---|---|---|---|---|---|---|---|---|---|---|---|---|---|---|---|---|---|---|---|
| | | A₁ | A₂ Number of carbon atoms | A₃ Number of carbon atoms | | X | Y | Z₁ | Z₂ | R₁ | R₂ | R₃ | R₄ | R₅ | R₆ | R₇ | R₈ | R₉ | R₁₀ |
| 89 | (iii) | H | 6 | — | R₁ | NR₁₀ | R₃ | CH | N | H | H | — | H | H | CH₃ | C₆H₁₃ | H | H | CH₃ |
| 90 | (iii) | H | 6 | — | R₁₀ | NR₁₀ | R₃ | CH | N | H | H | — | H | H | H | CH₃ | H | H | — |
| 91 | (iii) | H | 6 | — | R₁₀ | NR₁₀ | R₃ | CH | N | H | H | — | H | H | H | C₆H₁₃ | H | H | — |
| 92 | (iii) | H | 6 | — | R₁₀ | NR₁₀ | R₃ | CH | N | H | H | — | H | H | H | C₁₂H₂₅ | H | H | — |
| 93 | (iii) | H | 6 | — | R₁₀ | NR₁₀ | R₃ | CH | N | H | H | — | H | H | CH₃ | CH₃ | H | H | — |
| 94 | (iii) | H | 6 | — | R₁₀ | NR₁₀ | R₃ | CH | N | H | H | — | H | H | CH₃ | C₆H₁₃ | H | H | — |
| 95 | (iii) | H | 6 | — | R₁₀ | NR₁₀ | R₃ | CH | N | H | H | — | H | H | H | OC₆H₁₃ | H | H | — |
| 96 | (iii) | H | 6 | — | R₁₀ | NR₁₀ | R₄ | CH | N | H | H | H | — | H | H | H | H | H | — |
| 97 | (iii) | H | 6 | — | R₁₀ | NR₁₀ | R₄ | CH | N | CH₃ | H | H | — | H | H | CH₃ | H | H | — |
| 98 | (iii) | CH₃ | 6 | — | R₇ | NR₁₀ | R₄ | CH | N | CH₃ | H | H | — | H | H | — | H | H | H |
| 99 | (iii) | CH₃ | 6 | — | R₇ | NR₁₀ | R₄ | CH | N | C₆H₁₃ | H | H | — | H | H | — | H | H | H |
| 100 | (iii) | CH₃ | 8 | — | R₇ | NR₁₀ | R₄ | CH | N | CH₃ | H | H | — | H | H | — | H | H | H |
| 101 | (iii) | CH₃ | 6 | — | R₇ | NR₁₀ | R₄ | N | CH | CH₃ | H | H | — | H | H | — | H | H | H |
| 102 | (iii) | CH₃ | 6 | — | R₇ | NR₁₀ | R₄ | CH | N | CH₃ | H | H | — | H | H | — | H | H | H |

TABLE 2

| Azomethine derivative monomer | Group having polymerizable group | | | | | Azomethine derivative | | | | | | | | | | | | |
|---|---|---|---|---|---|---|---|---|---|---|---|---|---|---|---|---|---|---|
| | Structure | $A_1$ | $A_2$ Number of carbon atoms | $A_3$ Number of carbon atoms | Polymerizable group position | X | Y | $Z_1$ | $Z_2$ | $R_1$ | $R_2$ | $R_3$ | $R_4$ | $R_5$ | $R_6$ | $R_7$ | $R_8$ | $R_9$ | $R_{10}$ |
| 2-1 | (iii) | H | 6 | — | $R_7$ | S | $R_4$ | CH | N | $C_6H_{13}$ | H | H | — | H | H | — | H | H | — |
| 2-2 | (iii) | H | 6 | — | $R_7$ | S | $R_4$ | CH | N | $CH_3$ | H | H | — | H | H | — | H | H | — |
| 2-3 | (iii) | H | 6 | — | $R_7$ | S | $R_4$ | CH | N | $C_{10}H_{21}$ | H | H | — | H | H | — | H | H | — |
| 2-4 | (iii) | H | 6 | — | $R_7$ | S | $R_4$ | CH | N | $OC_6H_{13}$ | H | H | — | H | H | — | H | H | — |
| 2-5 | (iii) | H | 6 | — | $R_7$ | S | $R_4$ | CH | N | $COOC_6H_{13}$ | H | H | — | H | H | — | H | H | — |
| 2-6 | (iii) | H | 6 | — | $R_7$ | S | $R_4$ | CH | N | $COOC_6H_{13}$ | H | H | — | H | H | — | H | H | — |
| 2-7 | (iii) | H | 6 | — | $R_7$ | S | $R_4$ | CH | N | H | H | H | — | H | H | — | H | H | — |
| 2-8 | (iii) | H | 6 | — | $R_7$ | S | $R_4$ | CH | N | Br | H | H | — | H | H | — | H | H | — |
| 2-9 | (iii) | H | 6 | — | $R_7$ | S | $R_4$ | CH | N | CN | H | H | — | H | H | — | H | H | — |
| 2-10 | (iii) | H | 6 | — | $R_7$ | S | $R_4$ | CH | N | $NO_2$ | H | H | — | H | H | — | H | H | — |
| 2-11 | (iii) | H | 6 | — | $R_7$ | S | $R_4$ | CH | N | COOH | H | H | — | H | H | — | H | H | — |
| 2-12 | (iii) | H | 6 | — | $R_7$ | S | $R_4$ | CH | N | $C_6H_{13}$ | $CH_3$ | H | — | H | H | — | H | H | — |
| 2-13 | (iii) | H | 6 | — | $R_7$ | S | $R_4$ | CH | N | $C_6H_{13}$ | H | H | — | $CH_3$ | H | — | H | H | — |
| 2-14 | (iii) | H | 6 | — | $R_7$ | S | $R_4$ | CH | N | $C_6H_{13}$ | H | H | — | H | $CH_3$ | — | H | H | — |
| 2-15 | (iii) | H | 6 | — | $R_7$ | S | $R_4$ | CH | N | H | $C_6H_{13}$ | H | H | H | H | — | H | H | — |
| 2-16 | (iii) | H | 6 | — | $R_7$ | S | $R_3$ | CH | N | $C_6H_{13}$ | H | H | — | H | H | — | H | H | — |
| 2-17 | (iii) | H | 6 | — | $R_7$ | S | $R_4$ | CH | N | $C_6H_{13}$ | H | — | — | H | — | H | H | H | — |
| 2-18 | (iii) | H | 10 | — | $R_7$ | S | $R_4$ | N | N | $C_6H_{13}$ | H | — | — | H | — | $C_6H_{13}$ | H | H | — |
| 2-19 | (ii) | $CH_3$ | 6 | — | $R_7$ | S | $R_4$ | CH | N | $C_6H_{13}$ | H | H | — | H | H | $C_6H_{13}$ | H | H | — |
| 2-20 | (iii) | H | 6 | — | $R_7$ | S | $R_4$ | CH | N | $C_6H_{13}$ | H | H | — | H | H | $C_6H_{13}$ | H | H | — |
| 2-21 | (iii) | H | 6 | — | $R_6$ | S | $R_4$ | CH | N | $C_6H_{13}$ | H | H | — | H | — | $C_6H_{13}$ | H | H | — |
| 2-22 | (iii) | H | 6 | — | $R_1$ | S | $R_4$ | CH | N | — | H | H | — | H | H | — | H | H | — |
| 2-23 | (iv) | H | 6 | 1 | $R_1$ | S | $R_4$ | CH | N | — | H | H | — | H | H | — | H | H | — |
| 2-24 | (iii) | H | 6 | — | $R_2$ | S | $R_4$ | CH | N | H | — | H | — | H | H | — | H | H | — |
| 2-25 | (iii) | H | 6 | — | $R_7$ | O | $R_4$ | CH | N | $CH_3$ | H | H | — | H | H | — | H | H | — |
| 2-26 | (iii) | H | 6 | — | $R_7$ | O | $R_4$ | CH | N | $C_6H_{13}$ | H | H | — | H | H | — | H | H | — |
| 2-27 | (iii) | H | 6 | — | $R_7$ | O | $R_4$ | CH | N | H | H | H | — | H | H | — | H | H | — |
| 2-28 | (iii) | H | 6 | — | $R_7$ | O | $R_3$ | CH | N | $C_6H_{13}$ | H | — | — | H | H | — | H | H | — |
| 2-29 | (iii) | H | 6 | — | $R_7$ | $NR_{10}$ | $R_4$ | CH | N | H | H | H | H | H | H | — | H | H | H |
| 2-30 | (iii) | H | 6 | — | $R_7$ | $NR_{10}$ | $R_3$ | CH | N | H | H | H | — | H | H | — | H | H | $CH_3$ |
| 2-31 | (iii) | H | 6 | — | $R_7$ | $NR_{10}$ | $R_3$ | CH | N | H | H | H | — | H | H | — | H | H | $C_6H_{13}$ |
| 2-32 | (iii) | H | 6 | — | $R_7$ | $NR_{10}$ | $R_3$ | CH | N | H | H | H | — | H | H | — | H | H | $C_{10}H_{21}$ |
| 2-33 | (iii) | H | 6 | — | $R_7$ | $NR_{10}$ | $R_3$ | CH | N | H | H | H | — | H | H | — | H | H | $OCOCH_3$ |
| 2-34 | (iii) | H | 6 | — | $R_7$ | $NR_{10}$ | $R_3$ | CH | N | $CH_3$ | H | H | — | H | H | — | H | H | H |
| 2-35 | (iii) | H | 6 | — | $R_7$ | $NR_{10}$ | $R_3$ | CH | N | $C_6H_{13}$ | H | H | — | H | H | — | H | H | $CH_3$ |
| 2-36 | (iii) | H | 6 | — | $R_7$ | $NR_{10}$ | $R_3$ | CH | N | $CH_3$ | H | H | — | H | H | — | H | H | $CH_3$ |
| 2-37 | (iii) | H | 6 | — | $R_7$ | $NR_{10}$ | $R_3$ | CH | N | $C_6H_{13}$ | H | H | — | H | H | — | H | H | $CH_3$ |
| 2-38 | (iii) | H | 6 | — | $R_7$ | $NR_{10}$ | $R_3$ | CH | N | $CH_3$ | H | H | — | H | H | — | H | H | $CH_3$ |
| 2-39 | (iii) | H | 6 | — | $R_7$ | $NR_{10}$ | $R_3$ | CH | N | $C_6H_{13}$ | H | H | — | H | H | — | H | H | $CH_3$ |
| 2-40 | (iii) | H | 6 | — | $R_7$ | $NR_{10}$ | $R_4$ | CH | N | H | $C_6H_{13}$ | H | H | H | H | — | H | H | $CH_3$ |
| 2-41 | (iii) | H | 6 | — | $R_7$ | $NR_{10}$ | $R_4$ | CH | N | H | H | — | H | H | H | $C_6H_{13}$ | H | H | $CH_3$ |
| 2-42 | (iii) | H | 6 | — | $R_1$ | $NR_{10}$ | $R_3$ | CH | N | — | H | H | — | H | H | $C_6H_{13}$ | H | H | $CH_3$ |
| 2-43 | (iii) | H | 6 | — | $R_1$ | $NR_{10}$ | $R_4$ | CH | N | — | H | H | H | H | H | — | H | H | $CH_3$ |
| 2-44 | (iii) | H | 6 | — | $R_2$ | $NR_{10}$ | $R_4$ | CH | N | H | — | H | H | H | H | — | H | H | $CH_3$ |

TABLE 2-continued

| Azomethine derivative monomer | Group having polymerizable group | | | | | Azomethine derivative | | | | | | | | | | | | |
|---|---|---|---|---|---|---|---|---|---|---|---|---|---|---|---|---|---|---|
| | Structure | $A_1$ | $A_2$ Number of carbon atoms | $A_3$ Number of carbon atoms | Polymerizable group position | X | Y | $Z_1$ | $Z_2$ | $R_1$ | $R_2$ | $R_3$ | $R_4$ | $R_5$ | $R_6$ | $R_7$ | $R_8$ | $R_9$ | $R_{10}$ |
| 2-45 | (iii) | H | 6 | — | $R_{10}$ | $NR_{10}$ | $R_3$ | CH | N | H | H | — | H | H | H | $CH_3$ | H | H | — |
| 2-46 | (iii) | H | 6 | — | $R_{10}$ | $NR_{10}$ | $R_3$ | CH | N | H | H | — | H | H | H | $C_6H_{13}$ | H | H | — |
| 2-47 | (iii) | H | 6 | — | $R_{10}$ | $NR_{10}$ | $R_3$ | CH | N | H | H | — | H | H | H | $C_6H_{13}$ | H | H | — |

[Table 7]

(Structure of $B_1$—$Z_1$=$Z_2$—$B_2$)

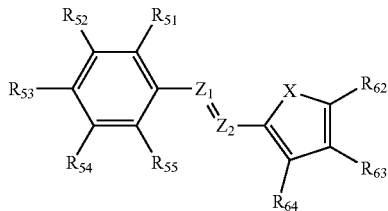

TABLE 3

| Structural unit No. | $r_1$ | A | $r_2$ Number of carbon atoms | Substitution position in $B_1$ | $Z_1$ | $Z_2$ | $B_1$ | | | | | $B_2$ | | | | |
|---|---|---|---|---|---|---|---|---|---|---|---|---|---|---|---|---|
| | | | | | | | $R_{51}$ | $R_{52}$ | $R_{53}$ | $R_{54}$ | $R_{55}$ | X | $R_{61}$ | $R_{62}$ | $R_{63}$ | $R_{64}$ |
| 5 | H | (2-c) | 6 | $R_{53}$ | N | CH | H | H | — | H | H | O | — | H | H | H |
| 6 | H | (2-c) | 6 | $R_{53}$ | N | CH | H | H | — | H | H | S | — | $CH_3$ | H | H |
| 7 | H | (2-c) | 6 | $R_{53}$ | N | CH | H | H | — | H | H | S | — | $OCH_3$ | H | H |
| 8 | H | (2-c) | 6 | $R_{53}$ | N | CH | H | H | — | H | H | S | — | $N(CH_3)_2$ | H | H |
| 9 | H | (2-b) | 6 | $R_{53}$ | N | CH | H | H | — | H | H | S | — | H | H | H |
| 10 | H | (2-c) | 6 | $R_{53}$ | N | CH | H | H | — | H | H | $NR_{61}$ | $CH_3$ | H | H | H |
| 11 | H | (2-b) | 6 | $R_{53}$ | N | CH | H | H | — | H | H | $NR_{61}$ | $CH_3$ | H | H | H |
| 12 | H | (2-c) | 2 | $R_{53}$ | N | CH | H | H | — | H | H | $NR_{61}$ | H | $CH_3$ | H | H |
| 13 | H | (2-c) | 6 | $R_{53}$ | N | CH | H | H | — | H | H | $NR_{61}$ | H | H | H | H |
| 14 | H | (2-c) | 6 | $R_{52}$ | N | CH | H | — | H | H | H | S | — | $CH_3$ | H | H |

[Table 8]

(Structure of $B_1$—$Z_1$=$Z_2$—$B_2$)

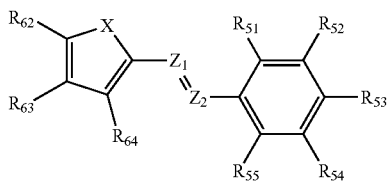

TABLE 4

| Structural unit No. | $r_1$ | A | $r_2$ Number of carbon atoms | Substitution position in $B_1$ | $Z_1$ | $Z_2$ | $B_1$ | | | | | $B_2$ | | | | |
|---|---|---|---|---|---|---|---|---|---|---|---|---|---|---|---|---|
| | | | | | | | X | $R_{61}$ | $R_{62}$ | $R_{63}$ | $R_{64}$ | $R_{51}$ | $R_{52}$ | $R_{53}$ | $R_{54}$ | $R_{55}$ |
| 15 | H | (2-b) | 1 | $R_{62}$ | CH | N | S | — | — | H | H | H | H | $OC_6H_{13}$ | H | H |
| 16 | H | (2-b) | 2 | $R_{61}$ | CH | N | $NR_{61}$ | — | H | H | H | H | H | $OC_6H_{13}$ | H | H |

[Table 9]

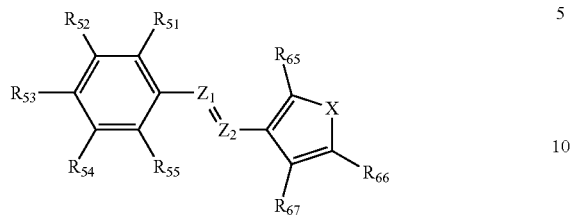

(Structure of $B_1$—$Z_1$=$Z_2$—$B_2$)

TABLE 5

| Structural unit No. | $r_1$ | A | $r_2$ Number of carbon atoms | Substitution position in $B_1$ | $Z_1$ | $Z_2$ | $R_{51}$ | $R_{52}$ | $R_{53}$ | $R_{54}$ | $R_{55}$ | X | $R_{61}$ | $R_{65}$ | $R_{66}$ | $R_{67}$ |
|---|---|---|---|---|---|---|---|---|---|---|---|---|---|---|---|---|
| 17 | H | (2-c) | 6 | $R_{53}$ | N | CH | H | H | — | H | H | $NR_{61}$ | $C_6H_{13}$ | H | H | H |
| 18 | H | (2-c) | 4 | $R_{53}$ | N | CH | H | H | — | H | H | $NR_{61}$ | H | H | H | H |
| 19 | $CH_3$ | (2-c) | 2 | $R_{53}$ | N | CH | H | H | — | H | H | $NR_{61}$ | $CH_3$ | H | H | H |
| 20 | H | (2-c) | 6 | $R_{53}$ | N | CH | H | H | — | H | H | $NR_{61}$ | H | H | H | H |

[Table 10]

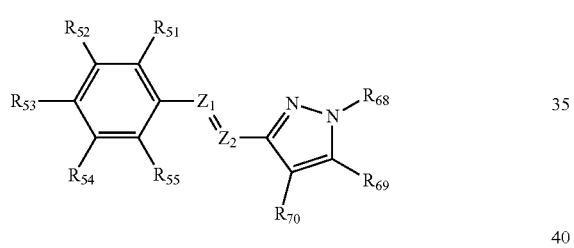

(Structure of $B_1$—$Z_1$=$Z_2$—$B_2$)

TABLE 6

| Structural unit No. | $r_1$ | A | $r_2$ Number of carbon atoms | Substitution position in $B_1$ | $Z_1$ | $Z_2$ | $R_{51}$ | $R_{52}$ | $R_{53}$ | $R_{54}$ | $R_{55}$ | $R_{68}$ | $R_{69}$ | $R_{70}$ |
|---|---|---|---|---|---|---|---|---|---|---|---|---|---|---|
| 21 | H | (2-c) | 6 | $R_{53}$ | N | CH | $CH_3$ | H | — | H | H | H | H | H |
| 22 | $CH_3$ | (2-b) | 6 | $R_{53}$ | N | CH | H | H | — | H | H | H | H | H |
| 23 | H | (2-b) | 6 | $R_{53}$ | CH | N | H | H | — | H | H | $CH_3$ | H | H |

[Table 11]

(Structure of $B_1$—$Z_1$=$Z_2$—$B_2$)

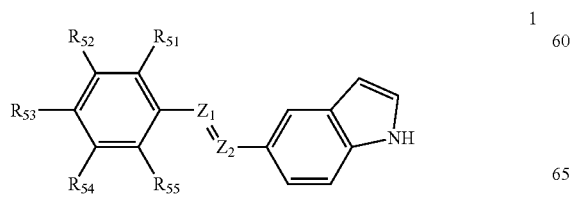

1

-continued

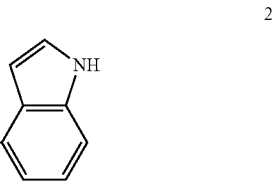

2

-continued

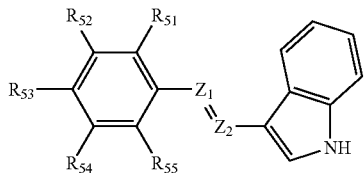

TABLE 7

| Structural unit No. | $r_1$ | A | $r_2$ Number of carbon atoms | Substitution position in $B_1$ | $B_1$ | | | | | | | $B_2$ |
|---|---|---|---|---|---|---|---|---|---|---|---|---|
| | | | | | $Z_1$ | $Z_2$ | $R_{51}$ | $R_{52}$ | $R_{53}$ | $R_{54}$ | $R_{55}$ | |
| 27 | H | (2-c) | 6 | $R_{53}$ | N | CH | H | $CH_3$ | — | H | H | 2 |
| 28 | H | (2-c) | 6 | $R_{53}$ | N | CH | H | $CH_3$ | — | H | H | 3 |
| 29 | H | (2-b) | 6 | $R_{53}$ | CH | N | H | H | — | H | H | 1 |

[Table 12]

(Structure of $B_1$—$Z_1$=$Z_2$—$B_2$)

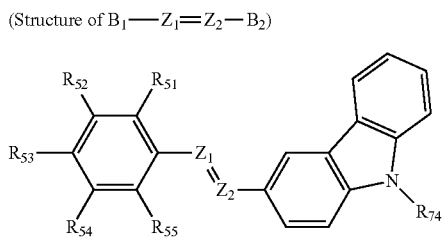

TABLE 8

| Structural unit No. | $r_1$ | A | $r_2$ Number of carbon atoms | Substitution position in $B_1$ | $B_1$ | | | $B_2$ | | | | |
|---|---|---|---|---|---|---|---|---|---|---|---|---|
| | | | | | $Z_1$ | $Z_2$ | $R_{74}$ | $R_{51}$ | $R_{52}$ | $R_{53}$ | $R_{54}$ | $R_{55}$ |
| 30 | H | (2-b) | 6 | $R_{74}$ | CH | N | — | H | H | $N(C_2H_5)_2$ | H | H |

(Other Structural Unit)

In an embodiment of the present invention, the photoresponsive polymer may contain a structural unit other than the structural unit derived from an azomethine derivative represented by the general formula (1) (other structural unit). In the case of a copolymer containing other structural unit, arrangement form of a repeating unit of the copolymer is also not particularly limited, and may be any of a random copolymer, a block copolymer, and an alternating copolymer.

The other structural unit is preferably a structural unit not containing the structural unit derived from an azomethine derivative represented by the general formula (1), and more preferably a structural unit constituting a thermoplastic resin that is softened by heating.

The other structural unit preferably has a vinyl-based polymerizable group because synthesis of a copolymer is easy. That is, in an embodiment of the present invention, the photoresponsive polymer further contains other structural unit derived from a monomer having a vinyl-based polymerizable group. Specifically, for example, a styrene derivative, a (meth)acrylic acid derivative, an olefin derivative, a vinyl ester derivative, a vinyl ether derivative, a vinyl ketone derivative or the like is used, and the other structural unit is preferably a structural unit derived from a styrene derivative, a (meth)acrylic acid derivative or an olefin derivative. That is, in an embodiment of the present invention, the monomer having a vinyl-based polymerizable group is at least one selected from the group consisting of styrene derivatives, (meth)acrylic acid derivatives, and olefin derivatives. With such an embodiment, the desired effect of the present invention is efficiently exhibited.

Examples of the styrene derivative include styrene, o-methylstyrene, m-methylstyrene, p-methylstyrene, α-methylstyrene, p-phenylstyrene, p-ethylstyrene, 2,4-dimethylstyrene, p-t-butylstyrene, p-n-hexylstyrene, p-n-octylstyrene, p-n-nonylstyrene, p-n-decylstyrene, p-n-dodecylstyrene, and the like.

Examples of the (meth)acrylic acid derivative include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-hexyl (meth)acrylate, n-octyl (meth)acrylate, 2-ethylhexyl (meth)acrylate, stearyl (meth)acrylate, dodecyl (meth)acrylate, phenyl (meth)acrylate, diethylaminoethyl (meth)acrylate, dimethylaminoethyl (meth)acrylate, and the like.

Examples of the olefin derivative include ethylene, propylene, n-butylene, isobutylene, n-pentene, 3-methyl-1-pentene, and the like. The olefin derivative may be linear or branched, and the number of carbon chains is also not particularly limited.

Examples of the vinyl ester derivative include vinyl propionate, vinyl acetate, vinyl benzoate, and the like. Examples of the vinyl ether derivative include vinyl methyl ether, vinyl ethyl ether, and the like. Examples of the vinyl ketone derivative include vinyl methyl ketone, vinyl ethyl ketone, vinyl hexyl ketone, and the like.

The content of the other structural unit in the polymer is not particularly limited, and can be appropriately selected; however, the content is preferably 70% by mass or less, and more preferably 40% by mass or less, with respect to a total amount of 100% by mass of all the structural units constituting the polymer. In an embodiment of the present invention, the content of the other structural unit in the polymer can be 5% by mass or more, 15% by mass or more.

In an embodiment of the present invention, the number average molecular weight Mn of the photoresponsive polymer is not particularly limited; however, the number average molecular weight is 3,000 or more, 3,500 or more, 4,000 or more, 5,000 or more, or 10,000 or more. In an embodiment of the present invention, the number average molecular weight Mn of the photoresponsive polymer is not particularly limited; however, the number average molecular weight Mn is 100,000 or less, 70,000 or less, 50,000 or less, 40,000 or less, or 30,000 or less. When the number average molecular weight of the polymer is 3,000 or more, it is preferable because the polymer is excellent in toughness, and a toner image having excellent fixability is more easily obtained when the polymer is used as a toner. Furthermore, when the number average molecular weight is 100,000 or less, it is preferable because efficiencies of isomerization and softening and melting increase.

The number average molecular weight of the polymer of the present invention can be measured by gel permeation chromatography (GPC). Specifically, the number average molecular weight can be measured by the method described in Examples to be described later.

(Method for Preparing Polymer)

The method for synthesizing the polymer of the present invention is not particularly limited, and a method of polymerizing the azomethine derivative represented by the general formula (1) having a polymerizable group as a monomer using a known polymerization initiator, such as anionic polymerization, cationic polymerization or living radical polymerization, can be used. A known chain transfer agent may be used as necessary.

As the polymerization initiator, for example, an azo-based or diazo-based polymerization initiator or a peroxide-based polymerization initiator as shown below is used.

Examples of the azo-based or diazo-based polymerization initiator include azobisisobutyronitrile (AIBN) such as 2,2'-azobis-(2,4-dimethylvaleronitrile) and 2,2'-azobisisobutyronitrile, 1,1'-azobis(cyclohexane-1-carbonitrile), 2,2'-azobis-4-methoxy-2,4-dimethylvaleronitrile, and the like.

Examples of the peroxide-based polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl) propane, tris(t-butylperoxy) triazine, and the like.

Examples of the chain transfer agent include benzyl dithiobenzoate, 1-phenylethyl dithiobenzoate, 2-phenylprop-2-yl dithiobenzoate, 1-acetoxyethyl dithiobenzoate, hexakis (thiobenzoylthiomethyl)benzene, 1,4-bis(thiobenzoylthiomethyl)benzene, 1,2,4,5-tetrakis(thiobenzoylthiomethyl)benzene, 1,4-bis-(2-(thiobenzoylthio) prop-2-yl)benzene, 1-(4-methoxyphenyl)ethyl dithiobenzoate, benzyl dithioacetate; ethoxycarbonylmethyl dithioacetate, 2-(ethoxycarbonyl) prop-2-yl dithiobenzoate, 2-cyanoprop-2-yl dithiobenzoate, t-butyl dithiobenzoate, 2,4,4-trimethylpent-2-yl dithiobenzoate, 2-(4-chlorophenyl) prop-2-yl dithiobenzoate, 3- and 4-vinylbenzyl dithiobenzoate, S-benzyl diethoxyphosphinyl dithioformate, t-butyl trithioperbenzoate, 2-phenylprop-2-yl 4-chlorodithiobenzoate, 2-phenylprop-2-yl 1-dithionaphthalate, 4-cyanopentanoic acid dithiobenzoate, dibenzyl tetrathioterephthalate, dibenzyl trithiocarbonate, carboxymethyl dithiobenzoate, and the like.

The polymerization temperature varies depending on the type of monomer or polymerization initiator to be used; however, the polymerization temperature is preferably from 50° C. to 100° C., and more preferably from 55° C. to 90° C. Further, the polymerization time varies depending on the type of monomer or polymerization initiator to be used; however, for example, the polymerization time is preferably from 2 to 60 hours.

Meanwhile, also for the copolymer containing a structural unit other than the structural unit containing the group having an azomethine structure as represented by the general formula (1) (other structural unit), the preparation method of the copolymer is not particularly limited.

For example, in the case of preparing a random copolymer, as monomers that serve as raw materials, in addition to the monomer for constituting the structural unit represented by the general formula (1), a monomer for constituting the other structural unit is mixed with a chain transfer agent, a polymerization initiator and the like, and a polymerization reaction is carried out, whereby a desired copolymer can be obtained. Specific forms of the monomers for constituting the other structural unit are as described above.

In an embodiment of the present invention, the photoresponsive polymer is represented by
the following general formula (3):

[Chemical 29]

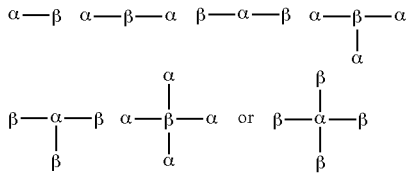

wherein

αs are each independently a polymer block containing a structural unit represented by the general formula (2), and βs are each independently a polymer block containing a structural unit other than the structural unit represented by the general formula (2). With such an embodiment, the azomethine derivative easily forms a domain in the polymer and can efficiently induce softening and melting, and by having a structural unit other than the structural unit represented by the general formula (2), a polymer having high toughness is obtained.

The polymer of the present invention is polymerized, whereby a portion of an azomethine structure absorbs light, and thermal energy released in a photoexcitation-deactivation process is transferred to repeating units (structural units) to be bonded (photothermal conversion), and thus melting or softening can proceed. In addition, it is considered that by forming a block copolymer, the portion of an azomethine structure easily forms a domain in the polymer, and efficiently induces softening and melting. Therefore, the effect of the present invention can be more remarkably obtained.

Specific forms of the structural units represented by the general formula (1) constituting the polymer block α are as described above.

The structural unit constituting the polymer block β does not contain the azomethine structure ($R_1$—$Z_1$=$Z_2$—$R_2$) in the general formula (1). Specifically, the forms described as structural units other than the structural unit containing a group having an azomethine structure can be preferably used. In particular, from the viewpoint of application to synthesis of a block copolymer by a living radical polymerization method such as an ATRP method, an ARGET-ATRP method or an RAFT method, the structural unit constituting the polymer block β is preferably a structural unit having a vinyl-based polymerizable group. Specifically, for example, a styrene derivative, a (meth)acrylic acid derivative, an olefin derivative, a vinyl ester derivative, a vinyl ether derivative, a vinyl ketone derivative or the like is used, and the structural unit is preferably a styrene derivative, a (meth)acrylic acid derivative or an olefin derivative. That is, in an embodiment of the present invention, in the photoresponsive polymer, the β is a polymer block containing at least one structural unit selected from the group consisting of styrene derivatives, (meth)acrylic acid derivatives, and olefin derivatives. With such an embodiment, the photoresponsive polymer has a technical effect that a polymer having high toughness is obtained.

The number average molecular weight (number average molecular weight of the sum) of the polymer blocks α contained in the polymer represented by the general formula (3) is not particularly limited; however, the number average molecular weight is preferably from 1,000 or more, more preferably from 1,000 to 100,000, further preferably from 1,000 to 70,000, still more preferably from 1,000 to 50,000, and particularly preferably from 3,000 to 50,000. When the number average molecular weight of the sum of the polymer blocks α is 1,000 or more, it is preferable because a toner image having excellent fixability is more easily obtained when the polymer is used as a toner. Furthermore, when the number average molecular weight of the sum of the polymer blocks α is 100,000 or less, it is preferable because the efficiency of softening and melting increases. Here, regarding the number average molecular weight of the sum of the polymer blocks α, in a case in which the polymer represented by the general formula (3) contains a single polymer block α, the number average molecular weight refers to the number average molecular weight of the polymer block α; and in a case in which the polymer contains a plurality of polymer blocks α, the number average molecular weight means the sum total of the number average molecular weights of the polymer blocks α.

The number average molecular weight (number average molecular weight of the sum) of the polymer blocks β contained in the polymer represented by the general formula (3) is not particularly limited; however, the number average molecular weight is preferably 1,000 or more, more preferably from 1,100 to 100,000, further preferably from 1,500 to 70,000, still more preferably from 2,000 to 50,000, and particularly preferably from 3,000 to 40,000. It is preferred that the number average molecular weight of the sum of the polymer blocks β is 1,000 or more, because a toner image having excellent fixability is more easily obtained when the polymer is used as a toner. Furthermore, it is preferred that the number average molecular weight of the sum of the polymer blocks β is 100,000 or less, because the efficiency of softening and melting increases. Here, regarding the number average molecular weight of the sum of the polymer blocks β, in a case in which the polymer represented by the general formula (3) contains a single polymer block β, the number average molecular weight refers to the number average molecular weight of the polymer block β; and in a case in which the polymer contains a plurality of polymer blocks β, the number average molecular weight means the sum total of the number average molecular weights of the polymer blocks β.

Moreover, the total number average molecular weight Mn of the polymer represented by the general formula (3) is preferably 3,000 or more, more preferably from 3,200 to 100,000, even more preferably from 3,300 to 70,000, still more preferably from 3,400 to 50,000, and particularly preferably from 3,450 to 50,000. It is preferred that the total number average molecular weight of the polymer represented by the general formula (3) is 3,000 or more, because a toner image having excellent fixability is more easily obtained when the polymer is used as a toner. Furthermore, it is preferred that the total number average molecular weight is 100,000 or less, because the efficiency of softening and melting increases.

That is, in an embodiment of the present invention, in the photoresponsive polymer, the number average molecular weight of the α is 1,000 or more, the number average molecular weight of the β is 1,000 or more, and the total number average molecular weight is 3,000 or more.

In the polymer represented by the general formula (3), the ratio of the number average molecular weight of the sum of the polymer blocks α and the number average molecular weight of the sum of the polymer blocks β is not particularly limited; however, from the viewpoint of ease of achieving softening and melting and image strength, the ratio of the number average molecular weight of the sum of the polymer blocks α: the number average molecular weight of the sum of the polymer blocks β is preferably from 1:20 to 20:1, and more preferably from 1:15 to 15:1.

The total number average molecular weight of the polymer represented by the general formula (3) and the number average molecular weight of the sum of the polymer blocks α and β can be measured by gel permeation chromatography (GPC). Specifically, the number average molecular weight can be measured by the method described in Examples to be described later.

The method for synthesizing the block copolymer represented by the general formula (3) is not particularly limited, and any known method such as anionic polymerization, cationic polymerization or living radical polymerization can be used. Above all, as a simple synthesis method, a living radical polymerization method such as an atom transfer radical polymerization method (ATRP method), an ARGET-ATRP method or an RAFT method can be suitably used.

To mention the ATRP method as an example, synthesis can be carried out by a method of polymerizing a monomer that becomes the structural unit of the polymer block α or β in the presence of a catalyst, using a monofunctional, bifunctional, trifunctional or tetrafunctional compound containing a halogen element as a starting material, as an initiator, or the like.

In the stage of polymerizing a monomer, for example, a monomer that becomes a structural unit of either the polymer block α or β (block that becomes a core portion of the block copolymer) is polymerized in the presence of an initiator, a catalyst and a ligand to produce a macroinitiator.

Examples of the initiator include butyl 2-bromoisobutyrate, ethyl 2-bromoisobutyrate, ethylene bis(2-bromoisobutyrate), 1,1,1-tris(2-bromoisobutyryloxymethyl)ethane, pentaerythritol tetrakis(2-bromoisobutyrate), α,α'-dibromo-p-xylene, ethyl bromoacetate, 2-bromoisobutyryl bromide, mixtures thereof, and the like; however, the initiator is not limited to these.

As the catalyst, there are copper(I) catalysts, iron(II) catalysts and the like, and examples thereof include Cu(I)Cl, Cu(I)Br, Fe(II)Cl, Fe(II)Br, mixtures thereof, and the like.

As the ligand, any known ligand can be used; however, one or more types selected from the group consisting of 2,2'-bipyridyl, 4,4'-dimethyl-2,2'-bipyridyl, 4,4'-di-tert-butyl-2,2'-bipyridyl, 1,1,4,7,10,10-hexamethyltriethylenetetramine, N,N,N',N'',N''-pentamethyldiethylenetriamine, cyclam(1,4,8,11-tetraazacyclotetradecane), 1,4,8,11-tetramethylcyclam(1,4,8,11-tetramethyl-1,4,8,11-tetraazacyclotetradecane), tris [2-(dimethylamino)ethyl]amine and the like are preferred.

The amounts of use of the catalyst and the ligand are not particularly limited, and can be appropriately determined with reference to conventionally known knowledge.

Next, the macroinitiator obtained by polymerization is isolated and is used as an initiator, and among the monomers that become the structural unit of the polymer block α or β, a monomer that has not been used for the synthesis of the macroinitiator is polymerized again in the presence of a catalyst and a ligand. Alternatively, in a stage in which the monomer has been almost entirely consumed in the synthesis of the macroinitiator, a monomer that has not been used for the synthesis of the macroinitiator may be added, without isolating the macroinitiator, and polymerization may be continued. Through these operations, an intended block copolymer can be obtained.

It is preferable that the above reactions are carried out in an inert atmosphere of nitrogen, a noble gas such as argon, or the like. The above reactions can be carried out at a temperature of, for example, from 25° C. to 160° C., and preferably from 35° C. to 130° C. Furthermore, the above reactions may be carried out without using a solvent or may be carried out in a solvent such as an organic solvent such as anisole.

Meanwhile, in the reaction of polymerizing a monomer that becomes a structural unit of either the polymer block α or β to obtain a macroinitiator and the reaction of reacting the macroinitiator with a monomer that becomes a structural unit of the other polymer block to obtain a block copolymer, the types and amounts of use of the catalyst and ligand to be used, and the conditions such as the temperature at the time of reaction may be the same or different.

<Fluidization by Light Irradiation and Reversible Non-Fluidization>

The wavelength of irradiation light when the polymer of the present invention is fluidized by light irradiation is preferably in the range of 280 nm or more and 480 nm or less, more preferably within the range of 300 nm or more and 420 nm or less, and further preferably within the range of 330 nm or more and 420 nm or less. When the wavelength is in the above ranges, crystals are likely to collapse (photomeltability is good), and fixability is improved. Furthermore, when fluidizing the polymer, fluidization may be promoted by applying heat and pressure in addition to light irradiation. By irradiating with irradiation light having the above wavelength, even when heat or pressure is applied, fluidization can be achieved with less heat or pressure. Therefore, by introducing the polymer of the present invention into a toner, fixation at the above wavelength becomes possible, and a toner having excellent fixability and high color reproducibility can be obtained.

Meanwhile, in the wavelength ranges described above, a portion of visible light is included. Therefore, it is desirable that the polymer of the present invention is not fluidized only by receiving solar light (natural light) or light produced by illumination such as a fluorescent lamp, but is fluidized by employing low cost conditions in which the irradiation amount and the irradiation time are suppressed as much as possible. From such a viewpoint, as irradiation conditions of the irradiation light when the polymer is fluidized, the irradiation amount is preferably within the range of 0.1 $J/cm^2$ or more and 200 $J/cm^2$ or less, more preferably within the range of 0.1 $J/cm^2$ or more and 100 $J/cm^2$ or less, and further preferably within the range of 0.1 $J/cm^2$ or more and 50 $J/cm^2$ or less.

When fluidizing the compound, the compound may be heated together with light irradiation. Whereby, fluidization can be achieved with a lower irradiation amount. The heating temperature at this time is, for example, within the range of 20° C. or more and 200° C. or less, and preferably within the range of 20° C. or more and 150° C. or less.

On the other hand, a condition for non-fluidizing (re-solidifying) the polymer of the present invention is preferably leaving the polymer at room temperature (in the range of 25° C.±15° C.) (in a natural environment). At this time, it is preferable to place the polymer in a dark place, but the polymer may receive visible light such as natural light or fluorescent light. It is more preferable to apply heat in the process of non-fluidizing the polymer. It is also acceptable to apply light.

When the polymer is non-fluidized by heating, the heating temperature is preferably within the range of 0° C. or more and 200° C. or less, and more preferably within the range of 20° C. or more and 150° C. or less.

[Configuration of Toner]

An embodiment of the present invention is a toner containing the polymer of the present invention. That is, the present invention provides a toner containing the photoresponsive polymer as a binder resin. By introducing the polymer of the present invention into a toner, it is possible to obtain a toner that can be fixed by light irradiation, has excellent fixability, and has high color reproducibility. Meanwhile, a toner refers to toner base particles or aggregates of toner particles. Toner particles are preferably particles obtained by adding an external additive to toner base particles; however, toner base particles can also be used as toner particles as they are. Meanwhile, in the present invention, when it is not necessary to particularly distinguish between the toner base particles, the toner particles and the toner, they are also simply referred to as "toner".

The content of the polymer in the toner depends on the azomethine structure ($R_1$—$Z_1$=$Z_2$—$R_2$) in the general formula (1) and the type of other structural unit, but is, for example, in the range of from 5% to 95% by mass with respect to the total amount of the binder resin, colorant, release agent, and the polymer of the present invention constituting the toner, from the viewpoint of efficient fluidization and image strength.

(Other Binder Resin)

The toner of the present invention may further contain other binder resin. With such an embodiment, viscosity at the time of fluidization can be adjusted, and image strength can be increased. As the binder resin, a resin that does not have a structure derived from another azomethine derivative, that is, a resin that does not contain an azomethine structure ($R_1$—$Z_1$=$Z_2$—$R_2$), and is generally used as a binder resin constituting a toner can be used without limitation. As the binder resin, for example, a styrene resin, an acrylic resin, a styrene-acrylic resin, a polyester resin, a silicone resin, an olefin resin, an amide resin, an epoxy resin, and the like can be used. These binder resins can be used singly or in combination of two or more types.

Among these, from the viewpoint of having low viscosity when melted, and having high sharp-meltability, it is preferable that the binder resin includes at least one selected from the group consisting of a styrene resin, an acrylic resin, a styrene-acrylic resin, and a polyester resin; and it is more preferable that the binder resin contains at least one selected from the group consisting of a styrene-acrylic resin and a polyester resin. With such an embodiment, image strength can be increased.

(Styrene-Acrylic Resin)

The styrene-acrylic resin in the present invention is a polymer containing at least a structural unit derived from a styrene monomer and a structural unit derived from a (meth)acrylic acid ester monomer. Here, the styrene monomer includes, in addition to styrene represented by the structural formula of $CH_2$=CH—$C_6H_5$, a monomer having a structure having a known side chain or functional group in the styrene structure.

Examples of the styrene monomer include those similar to the styrene monomers that can constitute the polymer described above.

Furthermore, a (meth)acrylic acid ester monomer is a monomer having a functional group having an ester bond in a side chain. Specifically, the (meth)acrylic acid ester monomer includes vinyl-based ester compounds such as, in addition to acrylic acid ester monomers represented by $CH_2$=CHCOOR (R is an alkyl group), methacrylic acid ester monomers represented by $CH_2$=C($CH_3$)COOR (R is an alkyl group). Meanwhile, the (meth)acrylic acid in the (meth)acrylic acid ester monomer means acrylic acid and methacrylic acid.

Examples of the (meth)acrylic acid ester monomer include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-octyl (meth)acrylate, 2-ethylhexyl (meth)acrylate, stearyl (meth)acrylate, dodecyl (meth)acrylate, phenyl (meth)acrylate, diethylaminoethyl (meth)acrylate, dimethylaminoethyl (meth)acrylate, and the like.

The styrene monomers and (meth)acrylic acid ester monomers can be each used singly or in combination of two or more types.

The contents of the structural unit derived from a styrene monomer and the structural unit derived from the (meth)acrylic acid ester monomer in the styrene-acrylic resin are not particularly limited, and can be appropriately adjusted from the viewpoint of controlling softening point and glass transition temperature of the binder resin. Specifically, the content of the structural unit derived from a styrene monomer is preferably from 40% to 95% by mass, and more preferably from 50% to 90% by mass, with respect to all the structural units constituting the styrene-acrylic resin. Furthermore, the content of the structural unit derived from a (meth)acrylic acid ester monomer is preferably from 5% to 60% by mass, and more preferably 10% to 50% by mass, with respect to all the structural units.

The content ratio of the styrene-acrylic resin is preferably from 5% to 60% by mass and more preferably 10% to 50% by mass with respect to the total resin.

If necessary, the styrene-acrylic resin may further contain a structural unit derived from other monomer other than the styrene monomer and (meth)acrylic acid ester monomer. Examples of the other monomer include vinyl monomers. Examples of the vinyl monomer that can be used in combination when the styrene-acrylic copolymer as used in the present invention is formed will be given below; however, the vinyl monomers that can be used in combination are not limited to those shown below.

(1) Olefins

Ethylene, propylene, isobutylene, and the like (2) Vinyl Esters

Vinyl propionate, vinyl acetate, vinyl benzoate, and the like (3) Vinyl Ethers

Vinyl methyl ether, vinyl ethyl ether, and the like (4) Vinyl Ketones

Vinyl methyl ketone, vinyl ethyl ketone, vinyl hexyl ketone, and the like (5) N-Vinyl Compounds N-Vinylcarbazole, N-vinylindole, N-vinylpyrrolidone, and the like (6) Others Vinyl compounds such as vinylnaphthalene and vinylpyridine, acrylic or methacrylic acid derivatives such as acrylonitrile, methacrylonitrile and acrylamide, and the like.

In addition, it is also possible to prepare a resin having a crosslinked structure using a polyfunctional vinyl monomer. Furthermore, it is also possible to use a vinyl monomer having an ionic dissociation group in a side chain. Specific examples of the ionic dissociation group include, for example, a carboxyl group, a sulfonic acid group, a phosphoric acid group, and the like. Specific examples of the vinyl monomer having the ionic dissociation group will be shown below.

Specific examples of the vinyl monomer having a carboxyl group include, for example, acrylic acid, methacrylic acid, maleic acid, itaconic acid, cinnamic acid, fumaric acid, maleic acid monoalkyl ester, itaconic acid monoalkyl ester, and the like.

In the case of forming the styrene-acrylic resin used in the present invention, the contents of the styrene monomer and the (meth)acrylic acid ester monomer are not particularly limited, and can be appropriately adjusted from the viewpoint of controlling the softening point temperature and the glass transition temperature of the binder resin. Specifically, the content of the styrene monomer is preferably from 40% to 95% by mass, and more preferably from 50% to 90% by mass, with respect to the entire monomers constituting the styrene-acrylic resin. Furthermore, the content of the (meth)acrylic acid ester monomer is preferably from 5% to 60% by mass, and more preferably from 10% to 50% by mass, with respect to the entire monomers constituting the styrene-acrylic resin.

The method for forming the styrene-acrylic resin is not particularly limited, and examples thereof include a method of polymerizing monomers using a known oil-soluble or water-soluble polymerization initiator. If necessary, for example, a known chain transfer agent such as n-octyl mercaptan may be used. As the oil-soluble polymerization initiator, for example, an azo-based or diazo-based polymerization initiator or a peroxide-based polymerization initiator as shown below is used.

Examples of the azo-based or diazo-based polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and the like.

Examples of the peroxide-based polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl) propane, tris(t-butylperoxy) triazine, and the like.

Furthermore, in the case of forming styrene-acrylic resin particles by an emulsion polymerization method, a water-soluble radical polymerization initiator can be used. Examples of the water-soluble radical polymerization initiator include persulfates such as potassium persulfate and ammonium persulfate, azobisaminodipropane acetate, azobiscyanovaleric acid and salts thereof, hydrogen peroxide, and the like.

The polymerization temperature varies depending on the type of monomer or polymerization initiator to be used; however, the polymerization temperature is preferably from 50° C. to 100° C., and more preferably from 55° C. to 90° C. Further, the polymerization time varies depending on the type of monomer or polymerization initiator to be used; however, for example, the polymerization time is preferably from 2 to 12 hours.

The styrene-acrylic resin particles to be formed by an emulsion polymerization method can also be configured to have two or more layers formed from resins of different compositions. As a production method in this case, it is possible to adopt a multi-stage polymerization method of adding a polymerization initiator and a polymerizable monomer to a dispersion liquid of resin particles that have been prepared by an emulsion polymerization treatment (first stage polymerization) according to a conventional method, and subjecting this system to a polymerization treatment (second stage and third stage polymerization).

(Polyester Resin)

The polyester resin is a polyester resin obtainable by a polycondensation reaction between a divalent or higher-valent carboxylic acid (polyvalent carboxylic acid component) and a dihydric or higher-hydric alcohol (polyhydric alcohol component). Meanwhile, the polyester resin may be amorphous or may be crystalline.

The valences of the polyvalent carboxylic acid component and the polyhydric alcohol component are preferably respectively 2 to 3, and more preferably respectively 2. That is, it is preferable that the polyvalent carboxylic acid component includes a dicarboxylic acid component, and it is preferable that the polyhydric alcohol component includes a dialcohol component.

Examples of the dicarboxylic acid component include saturated aliphatic dicarboxylic acids such as oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid (dodecanedioic acid), 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, and 1,18-octadecanedicarboxylic acid; unsaturated aliphatic dicarboxylic acids such as methylenesuccinic acid, fumaric acid, maleic acid, 3-hexenedioic acid, 3-octenedioic acid, and dodecenylsuccinic acid; and unsaturated aromatic dicarboxylic acids such as phthalic acid, terephthalic acid, isophthalic acid, t-butyl isophthalic acid, tetrachlorophthalic acid, chlorophthalic acid, nitrophthalic acid, p-phenylene-2-acetic acid, 2,6-naphthalenedicarboxylic acid, 4,4'-biphenyldicarboxylic acid, and anthracenedicarboxylic acid; and the like, and lower alkyl esters or acid anhydrides of these can also be used. The dicarboxylic acid components may be used singly or as mixtures of two or more types.

In addition, trivalent or higher-valent polyvalent carboxylic acids such as trimellitic acid and pyromellitic acid, anhydrides thereof, alkyl esters having 1 to 3 carbon atoms, and the like can also be used.

Examples of the diol component include saturated aliphatic diols such as ethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,20-eicosanediol, and neopentyl glycol; unsaturated aliphatic diols such as 2-butene-1,4-diol, 3-butene-1,4-diol, 2-butyne-1,4-diol, 3-butyne-1,4-diol, and 9-octadecene-7,12-diol; aromatic diols such as bisphenols such as bisphenol A and bisphenol F, and alkylene oxide adducts of bisphenols, such as ethylene oxide adducts and propylene oxide adducts of these bisphenols. Furthermore, derivatives thereof can also be used. The diol components may be used singly or as mixtures of two or more types.

The method for producing a polyester resin is not particularly limited, and a polyester resin can be produced by utilizing a known esterification catalyst and polycondensing (esterifying) the polyvalent carboxylic acid component and the polyhydric alcohol component.

Examples of a catalyst that can be used at the time of producing a polyester resin include alkali metal compounds of sodium, lithium, and the like; compounds containing Group 2 elements such as magnesium and calcium; compounds of metals such as aluminum, zinc, manganese, antimony, titanium, tin, zirconium, and germanium; phosphorous acid compounds; phosphoric acid compounds; amine compounds; and the like. Specifically, examples of tin compounds include dibutyltin oxide, tin octoate, tin dioctoate, salts thereof, and the like. Examples of titanium compounds include titanium alkoxides such as tetra-normal-butyl titanate $(Ti(O-n-Bu)_4)$, tetraisopropyl titanate, tetramethyl titanate, and tetrastearyl titanate; titanium acylates such as polyhydroxy titanium stearate; titanium chelates such as titanium tetraacetylacetonate, titanium lactate, and titanium triethanolaminate; and the like. Examples of germanium compounds include germanium dioxide and the like. Furthermore, examples of aluminum compounds include polyaluminum hydroxide, aluminum alkoxide, tributyl aluminate, and the like. These may be used singly or in combination of two or more types.

The polymerization temperature is not particularly limited; however, the polymerization temperature is preferably from 70° C. to 250° C. Furthermore, the polymerization time is also not particularly limited; however, the polymerization time is preferably from 0.5 to 10 hours. During polymerization, the pressure inside the reaction system may be reduced as necessary.

In a case in which the toner of the present invention contains a binder resin in addition to the polymer of the present invention, the content ratio of the polymer and the binder resin is not particularly limited.

The glass transition temperature (Tg) of the toner is preferably from 25° C. to 100° C., and more preferably from 30° C. to 80° C., from the viewpoint of fixability, heat-resistant storability, and the like. The glass transition temperature (Tg) of the toner can be adjusted by the molecular weight of the polymer, and, in a case in which the polymer contains a structural unit other than a structural unit containing a group having an azomethine structure, by the type, content and the like of the structural unit. In a case in which the toner contains a binder resin, the glass transition temperature can be further adjusted by the content ratio of the polymer and the binder resin, the type and molecular weight of the binder resin, and the like.

The content ratio of the polyester resin is preferably from 5% to 60% by mass and more preferably from 10% to 50% by mass with respect to the total resin.

Meanwhile, the toner of the present invention may be particles having a single layer structure or may be particles having a core-shell structure. The types of the binder resins used in core particles and a shell portion of the core-shell structure are not particularly limited.

<Colorant>

The toner of the present invention may further contain a colorant. Since the polymer of the present invention is not significantly colored, a toner having high color reproducibility of a colorant can be obtained. As the colorant, generally known dyes and pigments can be used.

Examples of a colorant for obtaining a black toner include carbon black, a magnetic body, iron-titanium composite oxide black, and the like, and examples of the carbon black include channel black, furnace black, acetylene black, thermal black, and lamp black. Furthermore, examples of the magnetic body include ferrite, magnetite, and the like.

Examples of a colorant for obtaining a yellow toner include dyes such as C.I. Solvent Yellow 19, C.I. Solvent Yellow 44, C.I. Solvent Yellow 77, C.I. Solvent Yellow 79, C.I. Solvent Yellow 81, C.I. Solvent Yellow 82, C.I. Solvent Yellow 93, C.I. Solvent Yellow 98, C.I. Solvent Yellow 103, C.I. Solvent Yellow 104, C.I. Solvent Yellow 112, and C.I. Solvent Yellow 162; and pigments such as C.I. Pigment Yellow 14, C.I. Pigment Yellow 17, C.I. Pigment Yellow 74, C.I. Pigment Yellow 93, C.I. Pigment Yellow 94, C.I. Pigment Yellow 138, C.I. Pigment Yellow 155, C.I. Pigment Yellow 180, and C.I. Pigment Yellow 185.

Examples of a colorant for obtaining a magenta toner include dyes such as C.I. Solvent Red 1, C.I. Solvent Red 49, C.I. Solvent Red 52, C.I. Solvent Red 58, C.I. Solvent Red 63, C.I. Solvent Red 111, and C.I. Solvent Red 122; and pigments such as C.I. Pigment Red 5, C.I. Pigment Red 48:1, C.I. Pigment Red 53:1, C.I. Pigment Red 57:1, C.I. Pigment Red 122, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

Examples of a colorant for obtaining a cyan toner include dyes such as C.I. Solvent Blue 25, C.I. Solvent Blue 36, C.I. Solvent Blue 60, C.I. Solvent Blue 70, C.I. Solvent Blue 93, and C.I. Solvent Blue 95; and pigments such as C.I. Pigment Blue 1, C.I. Pigment Blue 7, C.I. Pigment Blue 15, C.I. Pigment Blue 15:3, C.I. Pigment Blue 60, C.I. Pigment Blue 62, C.I. Pigment Blue 66, and C.I. Pigment Blue 76.

The colorants for obtaining a toner of each color can be used singly or in combination of two or more types for each color.

The content of the colorant is preferably from 0.5% to 20% by mass, and more preferably from 2% to 10% by mass, in the toner particles (toner base particles) before the addition of an external additive.

<Release Agent>

The toner according to the present invention may further contain a release agent. By introducing a release agent into the toner, in the case of performing thermal fixing together with light irradiation, a toner having superior fixability and high color reproducibility can be obtained.

The release agent to be used is not particularly limited, and various known waxes can be used. Examples of the wax include polyolefins such as low-molecular weight polypropylene and polyethylene, or oxidized type low-molecular weight polypropylene and polyethylene, paraffin wax, synthetic ester wax, and the like. Above all, it is preferable to use a paraffin wax, from the viewpoint of enhancing storage stability of the toner.

The content of the release agent is preferably from 1% to 30% by mass, and more preferably from 3% to 15% by mass, in the toner base particles.

<Charge Control Agent>

The toner according to the present invention may contain a charge control agent. The charge control agent to be used is not particularly limited as long as it is a substance that can give positive or negative charge as a result of frictional charging and is colorless, and various known positive charge type charge control agents and negative charge type charge control agents can be used.

The content of the charge control agent is preferably from 0.01% to 30% by mass, and more preferably from 0.1% to 10% by mass, in the toner base particles.

<External Additive>

In order to improve fluidity, chargeability, cleaning properties and the like of the toner, the toner according to the present invention may be configured by adding external additives such as a fluidizing agent and a cleaning aid, which are so-called post-treatment agents, to the toner base particles.

Examples of the external additives include inorganic particles, such as inorganic oxide particles such as silica particles, alumina particles, and titanium oxide particles; inorganic stearic acid compound particles such as aluminum stearate particles and zinc stearate particles; and inorganic titanic acid compound particles such as strontium titanate particles and zinc titanate particles. If necessary, these inorganic particles may be subjected to hydrophobization treatment. These can be used singly or in combination of two or more types.

Among these, as the external additives, for example, sol-gel silica particles, silica particles having a hydrophobicized surface (hydrophobic silica particles), or titanium oxide particles having a hydrophobicized surface (hydrophobic titanium oxide particles) are preferred, and among these, it is more preferable to use at least two or more types of external additives.

The number average primary particle size of the external additive is preferably within the range of from 1 to 200 nm, and more preferably from 10 to 180 nm. When two or more types of external additives are used in combination, at least one kind of the external additives is particularly preferably 30 nm or more and 180 nm or less. The amount of addition of these external additives is preferably from 0.05% to 5% by mass, and more preferably from 0.1% to 3% by mass, in the toner.

In an embodiment of the present invention, the amount of addition of the external additives is preferably from 0.05% to 5% by mass, and more preferably from 0.1% to 3% by mass, with respect to the toner base particles.

<Average Particle Size of Toner>

The average particle size of the toner (and the average particle size of the toner base particles) is preferably from 4 to 20 μm, and more preferably from 5 to 15 μm, as a volume-based median diameter (D50). When the volume-based median diameter (D50) is in the ranges described above, transfer efficiency is increased, half-tone image quality is enhanced, and image quality of fine lines, dots, and the like is enhanced.

The volume-based median diameter (D50) can be measured and calculated using a measuring apparatus in which a computer system mounted with a software program for data processing "Software V3.51" (manufactured by Beckman Coulter, Inc.) is connected to "COULTER COUNTER 3" (manufactured by Beckman Coulter, Inc.).

Specifically, 0.02 g of a measurement sample (toner or toner base particles) is added to 20 mL of a surfactant solution (a surfactant solution obtained by diluting, for example, a neutral detergent containing a surfactant component ten times with pure water for the purpose of dispersing toner particles), the mixture is mixed thoroughly and evenly, and then ultrasonic dispersion is performed for one minute to prepare a dispersion liquid. This dispersion liquid is injected into a beaker containing "ISOTON II" (manufactured by Beckman Coulter, Inc.) in a sample stand with a pipette until the indicated concentration of the measuring apparatus reaches 8%.

By setting the indicated concentration to the above range, it is possible to obtain reproducible measurement values. Further, with regard to the measuring apparatus, setting the counting number for particles for measurement to 25,000 particles and the aperture diameter to 50 μm, a measurement range of from 1 to 30 μm is divided into 256 parts and the frequency is calculated, and the particle size at 50% of volume fraction integrated from the larger side is defined as the volume-based median diameter (D50).

[Method for Producing Toner]

The method for producing the toner of the present invention is not particularly limited. For example, in a case in which a toner is produced only with the polymer of the present invention, it is possible to use a production method including pulverizing the polymer using a device such as a hammer mill, a feather mill or a counter jet mill, and then classifying the resultant to a desired particle size using a dry classifier such as SPIN AIR SIEVE, CLASSIEL, or Micron Classifier. In the case of producing a toner further containing a colorant, the polymer and the colorant are dissolved into a solution using a solvent in which both the polymer of the present invention and the colorant are dissolved, then the solution is removed, and thereafter, the resultant can be pulverized and classified by the same method as described above.

In particular, the toner containing the polymer of the present invention and, if necessary, a binder and a colorant is preferably produced by a production method utilizing an emulsion aggregation method in which the particle size and shape are easily controlled.

It is preferable that such a production method includes the following steps:
(1A) if necessary, a binder resin particle dispersion liquid preparation step of preparing a dispersion liquid of binder resin particles;
(1B) a polymer particle dispersion liquid preparation step of preparing a dispersion liquid of particles of the polymer of the present invention;
(1C) if necessary, a colorant particle dispersion liquid preparation step of preparing a dispersion liquid of colorant particles;
(2) an association step of adding an aggregating agent into an aqueous medium in which the polymer particles and, if necessary, binder resin particles and colorant particles are present, simultaneously promoting salting-out and performing aggregation and fusion, and thus forming associated particles;
(3) an aging step of forming toner base particles by controlling the shape of the associated particles; (4) a filtration and washing step of separating the toner base particles by filtration from the aqueous medium and removing a surfactant and the like from the toner base particles;
(5) a drying step of drying the washed toner base particles; and
(6) an external additive addition step of adding an external additive to the dried toner base particles.

Hereinafter, the steps (1A) to (1C) will be described.

(1A) Binder Resin Particle Dispersion Liquid Preparation Step

In this step, resin particles are formed by conventionally known emulsion polymerization or the like, and the resin particles are aggregated and fused to form binder resin particles. As an example, polymerizable monomer constituting the binder resin are charged and dispersed in an aqueous medium, and these polymerizable monomers are polymerized by a polymerization initiator to prepare a dispersion liquid of binder resin particles.

In addition, examples of a method for obtaining a binder resin particle dispersion liquid include, in addition to the method of polymerizing polymerizable monomers using a polymerization initiator in the aqueous medium, a method of performing a dispersion treatment in an aqueous medium without using a solvent, a method of dissolving a crystalline resin in a solvent such as ethyl acetate to form a solution, emulsifying and dispersing the solution into an aqueous medium using a disperser, and then performing a desolvation treatment, and the like.

At this time, a release agent may be incorporated in advance into the binder resin as necessary. In addition, for dispersion, it is also preferable to appropriately perform polymerization in the presence of a known surfactant (for example, an anionic surfactant such as sodium polyoxyethylene(2) dodecyl ether sulfate, sodium dodecyl sulfate, sodium dodecylbenzenesulfonate, or dodecylbenzenesulfonic acid).

The volume-based median diameter of the binder resin particles in the dispersion liquid is preferably from 50 to 300 nm. The volume-based median diameter of the binder resin particles in the dispersion liquid can be measured by a dynamic light scattering method using "MICROTRAC UPA-150" (manufactured by NIKKISO CO., LTD.).

(1B) Polymer Particle Dispersion Liquid Preparation Step

This polymer particle dispersion liquid preparation step is a step of dispersing the polymer of the present invention in a microparticulate state in an aqueous medium to prepare a dispersion liquid of particles of the polymer.

In preparing a dispersion liquid of particles of the polymer, first, an emulsified liquid of the polymer is prepared. Examples of a method for preparing the emulsified liquid of the polymer include a method of dissolving the polymer in an organic solvent and then emulsifying the resulting solution in an aqueous medium.

The method of dissolving the polymer in an organic solvent is not particularly limited, and examples thereof include a method of adding the polymer to an organic solvent and stirring and mixing the mixture so that the polymer is dissolved therein. The amount of addition of the polymer is preferably 5 parts by mass or more and 100 parts by mass or less, and more preferably 10 parts by mass or more and 50 parts by mass or less, with respect to 100 parts by mass of the organic solvent.

Next, the resulting solution of the polymer is mixed with an aqueous medium, and stirred using a known disperser such as a homogenizer. Whereby, the polymer is converted to liquid droplets and is emulsified into the aqueous medium, and thus an emulsified liquid of the polymer is prepared.

The amount of addition of the solution of the polymer is preferably 10 parts by mass or more and 110 parts by mass or less, with respect to 100 parts by mass of the aqueous medium.

The temperatures of the solution of the polymer and the aqueous medium at the time of mixing the solution of the polymer and the aqueous medium are each in a temperature range below the boiling point of the organic solvent, and are preferably 20° C. or more and 80° C. or less, and more preferably 30° C. or more and 75° C. or less. The temperature of the solution of the polymer and the temperature of the aqueous medium at the time of mixing the solution of the polymer and the aqueous medium may be the same or different, and are preferably the same.

As stirring conditions of the disperser, for example, when capacity of a stirring container is 1 to 3 L, rotation speed is preferably 7,000 rpm or more and 20,000 rpm or less, and stirring time is preferably 10 minutes or more and 30 minutes or less.

The dispersion liquid of particles of the polymer is prepared by removing the organic solvent from the emulsified liquid of the polymer. Examples of a method of removing the organic solvent from the emulsified liquid of the polymer include known methods such as air blowing, heating, pressure reduction, or a combination thereof.

As an example, the emulsified liquid of the polymer is, for example, heated at preferably 25° C. or more and 90° C. or less and more preferably 30° C. or more and 80° C. or less in an inert gas atmosphere such as nitrogen until, for example, 80% by mass or more and 95% by mass or less of initial amount of the organic solvent is removed (for example, from 20 to 150 minutes), whereby the organic solvent is removed. Whereby, the organic solvent is removed from the aqueous medium, and a dispersion liquid of particles of the polymer in which the particles of the polymer are dispersed in the aqueous medium is prepared.

Mass average particle size of particles of the polymer in the dispersion liquid of particles of the polymer is preferably 90 nm or more and 1,200 nm or less. The mass average particle size can be set within the above range, by appropriately adjusting a viscosity when the polymer is blended in an organic solvent, a blending ratio of the solution of the polymer and the aqueous medium, a stirring rate of a disperser when the emulsified liquid of the polymer is prepared, and the like. The mass average particle size of particles of the polymer in the dispersion liquid of particles of the polymer can be measured using MICROTRAC UPA-150 (manufactured by NIKKISO CO., LTD.) or an electrophoretic light scattering photometer "ELS-800" (manufactured by Otsuka Electronics Co., Ltd.).

<Organic Solvent>

The organic solvent used in this step can be used without any particular limitations as long as the organic solvent can dissolve the polymer. Specifically, examples thereof include esters such as ethyl acetate and butyl acetate; ethers such as diethyl ether, diisopropyl ether, and tetrahydrofuran; ketones such as acetone and methyl ethyl ketone; saturated hydrocarbons such as hexane and heptane; and halogenated hydrocarbons such as dichloromethane, dichloroethane, and carbon tetrachloride.

These organic solvents can be used singly or as mixtures of two or more types. Among these organic solvents, ketones and halogenated hydrocarbons are preferred, and methyl ethyl ketone and dichloromethane are more preferred.

<Aqueous Medium>

Examples of the aqueous medium used in this step include water, an aqueous medium containing water as a main component, in which a water-soluble solvent such as an alcohol or a glycol, or optional components such as a surfactant and a dispersant are incorporated, and the like. As the aqueous medium, a mixture of water and a surfactant is preferably used.

Examples of the surfactant include a cationic surfactant, an anionic surfactant, a nonionic surfactant, and the like. Examples of the cationic surfactant include dodecylammonium chloride, dodecylammonium bromide, dodecyltrimethylammonium bromide, dodecylpyridinium chloride, dodecylpyridinium bromide, hexadecyltrimethylammonium bromide, and the like. Examples of the anionic surfactant include fatty acid soaps such as sodium stearate and sodium dodecanoate, sodium dodecylbenzenesulfonate, sodium dodecyl sulfate, and the like. Furthermore, examples of the nonionic surfactant include polyoxyethylene dodecyl ether, polyoxyethylene hexadecyl ether, polyoxyethylene nonylphenyl ether, polyoxyethylene sorbitan monooleate ether, monodecanoyl sucrose, and the like.

These surfactants can be used singly or in combination of two or more types. Among the surfactants, preferably an anionic surfactant, and more preferably sodium dodecyl benzenesulfonate is used.

The amount of addition of the surfactant is preferably 0.01 parts by mass or more and 10 parts by mass or less, and more preferably 0.04 parts by mass or more and 1 part by mass or less, with respect to 100 parts by mass of the aqueous medium.

(1C) Colorant Particle Dispersion Liquid Preparation Step

This colorant particle dispersion liquid preparation step is a step of dispersing a colorant in a microparticulate state in an aqueous medium to prepare a dispersion liquid of colorant particles.

Dispersion of the colorant can be carried out by utilizing mechanical energy. The number-based median diameter of the colorant particles in the dispersion liquid is preferably from 10 to 300 nm, and more preferably from 50 to 200 nm. The number-based median diameter of the colorant particles can be measured using an electrophoretic light scattering photometer "ELS-800" (manufactured by Otsuka Electronics Co., Ltd.).

The steps from the (2) association step to the (6) external additive addition step can be carried out according to various conventionally known methods.

Meanwhile, the aggregating agent used in the (2) association step is not particularly limited; however, an aggregating agent selected from metal salts is suitably used. Examples of the metal salt include monovalent metal salts such as salts of alkali metals such as sodium, potassium and lithium; divalent metal salts of calcium, magnesium, manganese, copper, and the like; and trivalent metal salts of iron, aluminum and the like; and the like. Specific examples of the metal salts include sodium chloride, potassium chloride, lithium chloride, calcium chloride, magnesium chloride, zinc chloride, copper sulfate, magnesium sulfate, manganese sulfate, and the like, and among these, it is particularly preferable to use a divalent metal salt, since aggregation can be carried out with a smaller amount. These can be used singly or in combination of two or more types.

[Developer]

Regarding the toner according to the present invention, for example, a case of incorporating a magnetic body into the toner and using as a one-component magnetic toner, a case of mixing the toner with a so-called carrier and using as a two-component developer, a case of using a non-magnetic toner alone, and the like, can be considered, and all can be suitably used.

As the magnetic body, for example, magnetite, γ-hematite, various ferrites, or the like can be used.

As the carrier to be contained in a two-component developer, magnetic particles formed from conventionally known materials such as metals such as iron, steel, nickel, cobalt, ferrite, and magnetite; and alloys of those metals and metals such as aluminum and lead, can be used.

The carrier may be a coated carrier obtained by coating the surface of magnetic particles with a coating agent such as a resin, or may be a resin dispersion type carrier obtained by dispersing a magnetic body powder in a binder resin. The resin for coating is not particularly limited; however, for example, an olefin resin, an acrylic resin, a styrene resin, a styrene-acrylic resin, a silicone resin, a polyester resin, a fluororesin, or the like is used. Furthermore, the resin for constituting the resin dispersion type carrier particles is not particularly limited, and known resins can be used. For example, an acrylic resin, a styrene-acrylic resin, a polyester resin, a fluororesin, a phenolic resin, or the like can be used.

The volume-based median diameter of the carrier is preferably from 20 to 100 μm, and more preferably from 25 to 80 μm. The volume-based median diameter of the carrier can be measured representatively by a laser diffraction type particle size distribution analyzer "HELOS" (manufactured by Sympatec GmbH) equipped with a wet disperser.

The mixing amount of the toner to the carrier is preferably from 2% to 10% by mass on the basis of the total mass of the toner and the carrier as 100% by mass.

[Image Forming Method]

The toner of the present invention can be used in various known electrophotographic image forming methods. For example, the toner can be used in a monochrome image forming method or a full color image forming method. In regard to a full-color image forming method, the toner can be applied to any image forming method such as a four-cycle system image forming method constituted by four types of color developing devices respectively related to yellow, magenta, cyan, and black, and one photoreceptor; or a tandem system image forming method in which image forming units each having a color developing device related to each color and a photoreceptor, are mounted for the respective colors.

That is, the image forming method according to an embodiment of the present invention includes: 1) a step of forming a toner image formed of the toner of the present invention on a recording medium; and 2) a step of irradiating the toner image with light and to soften the toner image. With such an embodiment, the toner is excellent in fixability and provides higher image quality.

As to Step of 1)

In this step, a toner image formed of the toner of the present invention is formed on a recording medium.

(Recording Medium)

The recording medium is a member for holding a toner image. Examples of the recording medium include plain paper, high quality paper, art paper, coated printing paper such as coated paper, commercially available Japanese paper and postcard paper, resin films for OHP or packaging material, cloth, and the like.

The recording medium may be in a sheet form (sheet-like form) having a predetermined size, or may be in a long form that is wound in a roll form after the toner image is fixed.

Forming of a toner image can be carried out by, as will be described later, for example, transferring a toner image on a photoreceptor onto a recording medium.

As to Step of 2)

In this step, the formed toner image is irradiated with light to soften the toner image. Whereby, the toner image can be adhered onto the recording medium.

The wavelength of the light to be irradiated is not particularly limited as long as the toner image can be sufficiently softened by photothermal conversion or the like by the polymer in the toner; however, the wavelength is preferably 280 nm or more and 480 nm or less. When the wavelength is in the above range, the toner image can be softened more efficiently. Furthermore, the irradiation amount of light is preferably 0.1 to 200 $J/cm^2$, more preferably 0.1 to 100 $J/cm^2$, and further preferably 0.1 to 50 $J/cm^2$, from the same viewpoint.

Irradiation with light can be carried out, as will be described below, for example, using a light source such as a light emitting diode (LED) or a laser light source. Moreover, as will be described later, heating may be further carried out together with light irradiation.

After the step of 2), 3) a step of pressing the softened toner image may be further carried out as necessary. With such an embodiment, fixability is improved.

As to Step of 3)

In this step, the softened toner image is pressed.

The pressure at the time of pressing the toner image on the recording medium is not particularly limited; however, the pressure is preferably 0.01 to 5.0 MPa, and more preferably 0.05 to 1.0 MPa. By setting the pressure to 0.01 MPa or more, the amount of deformation of the toner image can be increased, so that the contact area between the toner image and recording paper S is increased, and the fixability of the image can be increased more easily. Furthermore, by setting the pressure to 5.0 MPa or less, shock noise at the time of pressing can be suppressed.

This pressing step may be carried out before or simultaneously with a step of irradiating the toner image with light and softening the toner image (the step of 2) as described above); however, carrying out the pressing step after light irradiation is preferred because the toner image in a state of having been softened in advance can be pressed, and as the result, fixability of the image can be further improved.

Furthermore, in the pressing step, the softened toner image may be further heated. That is, the pressing step may be carried out while heating the toner image. The temperature (for example, temperature of pressing member) at that time is preferably 15° C. or more, more preferably 20° C. or more, further preferably more than 20° C., even more preferably 30° C. or more, and even more preferably 40° C. or more. With such an embodiment, fixability is remarkably improved. The upper limit is not particularly limited, but is, for example, 200° C. or less, 150° C. or less, or 100° C. or less.

The heating temperature of the toner image (surface temperature of the toner image at the time of heating) is, when the glass transition temperature of the toner is designated as Tg, preferably from (Tg+20° C.) to (Tg+100° C.), and more preferably from (Tg+25° C.) to (Tg+80° C.) When the surface temperature of the toner image is (Tg+20° C.) or more, the toner image is easily deformed by pressing, and when the surface temperature is (Tg+100° C.) or less, hot offset is easily suppressed. Meanwhile, the hot offset refers to a phenomenon in which a part of the toner is transferred onto a pressing member such as a roller in the fixing step, and the toner layer is divided.

Furthermore, before the step of 2), 4) a step of heating the toner image in advance may be further carried out as necessary. As such, when 4) a step of heating the toner image in advance can be further carried out before the step of 2), sensitivity of the polymer of the present invention to light can be further enhanced. Whereby, the sensitivity to light is not likely to be impaired even with a polymer, so that melting or softening of the toner image by light irradiation is likely to be promoted.

The image forming method of the present invention can be carried out by, for example, using the following image forming apparatus.

FIG. 1 is a schematic configuration diagram illustrating an image forming apparatus 100 used in an image forming method according to an embodiment of the present invention. However, the image forming apparatus used in the present invention is not limited to the following form and the illustrated example. FIG. 1 illustrates an example of a monochrome image forming apparatus 100; however, the present invention can also be applied to a color image forming apparatus.

The image forming apparatus 100 is an apparatus for forming an image on recording paper S as a recording medium, includes an image reading device 71 and an automatic document feeder 72, and forms an image on the recording paper S that is conveyed by a paper conveyance system 7, by an image forming unit 10, an irradiation unit 40, and a compression unit 9.

Furthermore, in the image forming apparatus 100, the recording paper S is used as a recording medium; however, the medium to be subjected to image formation may be anything other than paper.

Document d placed on a copy holder of the automatic document feeder 72 is scanned and exposed by an optical system of a scanning exposure device of the image reading device 71 and is read by an image sensor CCD. An analog signal that has been photoelectrically converted by the image sensor CCD is subjected to analog processing, A/D conversion, shading compensation, image compression processing and the like in an image processing unit 20, and then is inputted into an exposure device 3 of the image forming unit 10.

The paper conveyance system 7 includes a plurality of trays 16, a plurality of paper feeding units 11, conveyance rollers 12, a conveyance belt 13, and the like. The trays 16 each accommodate recording paper S of an appointed size, and the paper feeding unit 11 of the determined tray 16 is operated in accordance with an instruction from a control unit 90 to feed the recording paper S. The conveyance rollers 12 convey recording paper S that has been sent from the tray 16 by the paper feeding unit 11 or recording paper S that has been carried in from a manual paper feeding unit 15 to the image forming unit 10.

The image forming unit 10 is configured such that a charging device 2, an exposure device 3, a developing unit 4, a transfer unit 5 and a cleaning unit 8 are disposed in this order around a photoreceptor 1, along a rotation direction of the photoreceptor 1.

The photoreceptor 1 as an image carrier is an image carrier having a photoconductive layer formed on a surface and is configured to be rotatable in a direction of arrow in FIG. 1 by a driving apparatus (not illustrated). Near the photoreceptor 1, a temperature humidity meter 17 that detects temperature and humidity inside the image forming apparatus 100 is provided.

The charging device 2 uniformly applies electric charge to the surface of the photoreceptor 1 and evenly electrostatically charges the surface of the photoreceptor 1. The exposure device 3 includes a beam light source such as a laser diode, and the exposure device 3 irradiates the surface of the electrostatically charged photoreceptor 1 with beam light to thereby cause the electric charge of the irradiated portion to be lost, and forms an electrostatic latent image in accordance with the image data on the photoreceptor 1. The developing unit 4 supplies a toner that is accommodated therein to the photoreceptor 1 and forms a toner image based on the electrostatic latent image on the surface of the photoreceptor 1.

The transfer unit 5 faces the photoreceptor 1, with a recording paper S interposed therebetween, and transfers the toner image onto the recording paper S. The cleaning unit 8 includes a blade 85. The surface of the photoreceptor 1 is cleaned by the blade 85, and the developer remaining on the surface of the photoreceptor 1 is removed.

The recording paper S having the toner image transferred thereon is conveyed to the compression unit 9 by the conveyance belt 13. The compression unit 9 is arbitrarily installed, and the compression unit 9 applies a fixing process to the recording paper S having the toner image transferred thereon by applying pressure only or applying heat and pressure by means of pressing members 91 and 92 and thereby fixing the image on the recording paper S. The recording paper S having the image fixed thereon is conveyed to a paper ejection unit 14 by conveyance rollers and is discharged out of the machine from the paper ejection unit 14.

Furthermore, the image forming apparatus 100 includes a paper inverting unit 24, and enables conveying the recording paper S subjected to a heat-fixing process to the paper inverting unit 24 right before the paper ejection unit 14, inverting the front and back, and discharging the recording paper S, or conveying the recording paper S with the front and back reversed, again to the image forming unit 10 and forming an image on both surfaces of the recording paper S.

<Irradiation Unit>

FIG. 2 is a schematic configuration diagram of the irradiation unit 40 in the image forming apparatus 100.

The image forming apparatus 100 according to an embodiment of the present invention includes an irradiation unit 40. The irradiation unit 40 includes a light source 41 and a heating member 93. Examples of a device constituting the light source 41 include a light emitting diode (LED), a laser light source, and the like.

The light source 41 irradiates the toner image formed on the recording medium with light to soften the toner image. Light irradiation conditions are not particularly limited as long as the light irradiation melts and fluidizes the composition of the present invention contained in the toner of the developer. The wavelength of the light to be irradiated to the toner image may be such that the wavelength is of the extent that can sufficiently fluidize the composition, and the wavelength is preferably within the range of 280 nm or more and 480 nm or less, more preferably within the range of 300 nm or more and 420 nm or less, and further preferably within the range of 330 nm or more and 420 nm or less. The irradiation amount of light in the light source 41 may also be such that the light can sufficiently fluidize the composition, for example, the irradiation amount is within the range of 0.1 J/cm$^2$ or more and 200 J/cm$^2$ or less, preferably within the range of 0.1 J/cm$^2$ or more and 100 J/cm$^2$ or less, and more preferably within the range of 0.1 J/cm$^2$ or more and 50 J/cm$^2$ or less.

When the toner image is softened by irradiating the toner image with light by the light source 41, the toner image may be heated by the heating member 93 together with light irradiation. Whereby, softening and melting of the toner image can proceed more efficiently. The heating temperature at this time is, for example, within the range of 20° C. or more and 200° C. or less, and preferably within the range of 20° C. or more and 150° C. or less. The softened toner image is left, heated, or irradiated with visible light at room temperature (in the range of range of 25±15° C.), whereby the toner image can be solidified and fixed on the recording medium. Meanwhile, as described later, the fixing step preferably further includes a step of pressing the softened toner image. In the pressing step, the softened toner image is preferably further heated.

The light source 41 is to irradiate light toward a first surface on the photoreceptor side in the recording paper S that holds the toner image, and is disposed on the photoreceptor side with respect to the recording paper S surface that is nipped between the photoreceptor 1 and a transfer roller 5 that is a transfer unit. Moreover, the heating member 93 is disposed on the side opposite to the light source 41 with respect to the recording paper S surface. Furthermore, the light source 41 and the heating member 93 are disposed along the conveyance direction (paper conveyance direction) of the recording paper S.

The light source 41 and the heating member 93 are disposed on the downstream side in the paper conveyance direction with respect to the nip position between the photoreceptor 1 and the transfer roller 5 and on the upstream side in the paper conveyance direction with respect to the compression unit 9.

According to the image forming method according to an embodiment of the present invention, the photoreceptor 1 is electrostatically charged by applying uniform electric charge thereto by the charging device 2, subsequently the photoreceptor 1 is scanned with the light flux irradiated by the exposure device 3 based on original image data, and an electrostatic latent image is formed. Next, a developer having a toner containing the composition of the present invention is supplied onto the photoreceptor 1 by the developing unit 4.

When recording paper S is conveyed from the tray 16 to the image forming unit 10 in accordance with a timing at which the toner image carried on the surface of the photoreceptor 1 reaches the position of the transfer roller 5 that is a transfer unit by rotation of the photoreceptor 1, the toner image on the photoreceptor 1 is transferred onto the recording paper S that is nipped between the transfer roller 5 and the photoreceptor 1 by a transfer bias applied to the transfer roller 5.

Furthermore, the transfer unit 5 also functions as a pressing member, and the transfer unit 5 can reliably adhere the toner image to the recording paper S while transferring the toner image from the photoreceptor 1 to the recording paper S.

After the toner image is transferred onto the recording paper S, the blade 85 of the cleaning unit 8 removes any developer remaining on the surface of the photoreceptor 1.

In a process in which the recording paper S on which the toner image has been transferred is conveyed to the compression unit 9 by the conveyance belt 13, the light source 41 irradiates the toner image transferred onto the recording paper S with light. By irradiating the toner image on the first surface of the recording paper S with light by the light source 41, the toner image can be more reliably melted, and fixability of the toner image to the recording paper S can be improved.

When the recording paper S holding the toner image reaches the compression unit 9 by the conveyance belt 13, the pressing members 91 and 92 compress the toner image to the first surface of the recording paper S. Since the toner image is softened by light irradiation by the light source 41 before being subjected to a fixing process by the compression unit 9, energy saving of image compression to the recording paper S can be attempted. Furthermore, in the step of solidifying the toner image and fixing the toner image on the recording medium, the toner image is pressed by the pressing members 91 and 92, whereby the fixability of the toner image on the recording paper S is further improved.

The pressure at the time of pressing the toner image is as described above. Meanwhile, the pressing step may be carried out before or simultaneously with the step of irradiating the toner image with light and thereby softening the toner image, or may be carried out after the step. From the viewpoint that a toner image in a state of being softened in advance can be pressed and thus image strength can be easily increased, it is more preferable that the pressing step is carried out after light irradiation.

Furthermore, the pressing member 91 can heat the toner image on the recording paper S when the recording paper S passes through between the pressing members 91 and 92. The toner image softened by light irradiation is further softened by the heating, and as a result, the fixability of the toner image to the recording paper S is further improved.

The heating temperature of the toner image is as described above. The heating temperature of the toner image (surface temperature of the toner image) can be measured by a non-contact temperature sensor. Specifically, for example, a non-contact temperature sensor may be installed at a position where the recording medium is discharged from the pressing member, and the surface temperature of the toner image on the recording medium may be measured.

The toner image compressed by the pressing members 91 and 92 is solidified and fixed on the recording paper S.

In an embodiment of the present invention, a fixing device includes a compression unit including a pressing member.

In an embodiment of the present invention, the pressing member has a heating means.

In an embodiment of the present invention, the temperature of the pressing member is preferably 15° C. or more, more preferably 20° C. or more, further preferably more than 20° C., even more preferably 30° C. or more, and even more preferably 40° C. or more. The upper limit is not particularly limited, but is, for example, 200° C. or less, 150° C. or less, or 100° C. or less.

<Photoresponsive Adhesive, Optical Switching Material>

Since the polymer of the present invention is fluidized by light irradiation and reversibly non-fluidized, a photoresponsive adhesive (photosensitive adhesive) that can be repeatedly used and an optical switching material can be prepared using the polymer of the present invention. For example, the photoresponsive adhesive can be applied to various adhesion technologies as a photoresponsive adhesive capable of repeated photodesorption corresponding to a change in the viscosity (coefficient of friction). That is, an embodiment of the present invention is a photoresponsive adhesive or optical switching material containing the polymer of the present invention.

The photoresponsive adhesive of the present invention is also suitable for recycling utilization in addition to use in temporal tacking that can be used repeatedly; however, the photoresponsive adhesive is not limited to these.

EXAMPLES

Hereinafter, the present invention will be specifically described with reference to Examples, but the present invention is not limited thereto.

<Synthesis of Azomethine Derivative Monomer 12>

[Chemical 30]

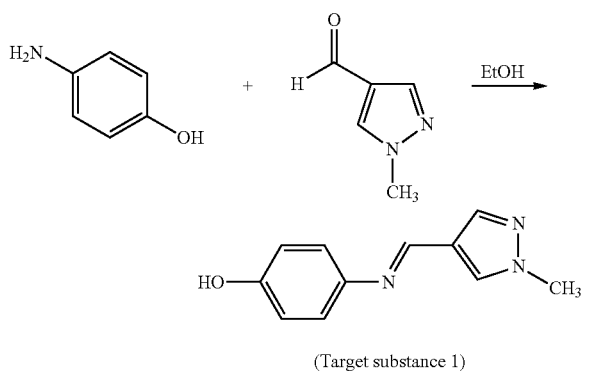

(Target substance 1)

Into a 100-ml four-necked flask, 4-aminophenol (5 g, 0.046 mol), 1-methyl-1H-pyrazole-4-carbaldehyde (5.1 g, 0.046 mol), and 100 ml of ethanol were charged, and the mixture was heated and stirred. The reaction liquid was suction-filtered, and the resulting powder was washed with cold ethanol. Further, recrystallization was carried out with methanol/ethanol to obtain a target substance 1.

[Chemical 31]

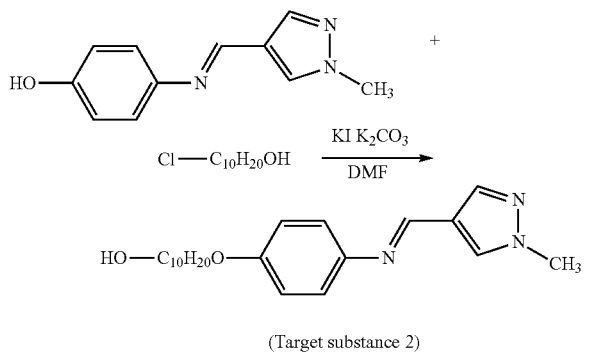

(Target substance 2)

Subsequently, in a 200-ml four-necked flask, the target substance 1 (4.6 g, 0.023 mol) obtained above was dissolved in 25 ml of dimethylformamide (DMF). To this, 4.88 g (0.035 mol) of potassium carbonate was added, and the mixture was stirred while being maintained at 30° C. To this, 10.2 mg (0.06 mmol) of potassium iodide and 10-chloro-1-decanol (5.0 g, 0.026 mol) were added, and the mixture was reacted at 110° C. This was cooled to room temperature and added to 650 g of ice, and then the resultant was filtered. Crystals were dispersed in 400 ml of water, washed by stirring overnight, filtered, and dried. Further, recrystallization was carried out with ethanol to obtain a target substance 2.

[Chemical 32]

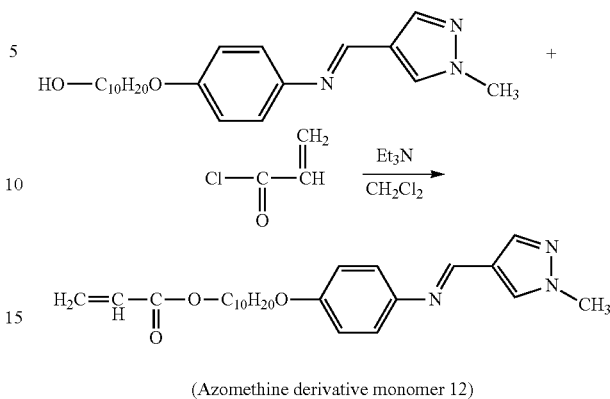

(Azomethine derivative monomer 12)

Next, into a 100-ml four-necked flask, the target substance 2 (3.6 g, 0.01 mol) obtained above, 1.34 ml (0.01 mol) of triethylamine, and 30 ml of dichloromethane were charged. At this time, the raw materials were in a dispersed state. While the internal temperature was maintained at 0° C., a solution obtained by dissolving 1.0 g (0.011 mol) of acrylic acid chloride in 10 ml of dichloromethane was added dropwise while the internal temperature was maintained at 0° C. to 5° C. As the solution was added dropwise, the raw materials were dissolved.

After completion of the dropwise addition, the reaction liquid was returned to room temperature, and stirring was performed. After completion of the reaction, dichloromethane was removed by concentration, the residue was dissolved in ethyl acetate, the solution was washed with dilute hydrochloric acid, an aqueous solution of sodium hydrogen carbonate, and saturated brine, and an organic layer was dried over magnesium sulfate and then concentrated. Orange-colored crystals thus obtained were purified using a silica gel column (ethyl acetate/heptane=1/5) to obtain azomethine derivative monomer 12.

<Synthesis of Azomethine Derivative Monomer 1>

Azomethine derivative monomer 1 was synthesized by changing 1-methyl-1H-pyrazole-4-carbaldehyde to 5-methylthiophene-2-carboxaldehyde.

<Synthesis of Azomethine Derivative Monomer 2>

Azomethine derivative monomer 2 was synthesized by changing 1-methyl-1H-pyrazole-4-carbaldehyde to 5-hexylthiophene-2-carboxaldehyde, and 10-chloro-1-decanol to 6-chloro-1-hexanol.

<Synthesis of Azomethine Derivative Monomer 3>

Azomethine derivative monomer 3 was synthesized by changing 1-methyl-1H-pyrazole-4-carbaldehyde to 5-methylfuran-2-carboxaldehyde and 4-aminophenol to 4-aminobenzenehexanol. (In the synthesis method, the step of obtaining the target substance 2 is omitted.)

<Synthesis of Azomethine Derivative Monomer 4>

Azomethine derivative monomer 4 was synthesized by changing 1-methyl-1H-pyrazole-4-carbaldehyde to 2-formyl-1-methylpyrrole, and 10-chloro-1-decanol to 8-chloro-1-octanol.

<Synthesis of Azomethine Derivative Monomer 5>

Azomethine derivative monomer 5 was synthesized by changing 1-methyl-1H-pyrazole-4-carbaldehyde to 1-methyl-1H-pyrazole-3-carboxaldehyde.

<Synthesis of Azomethine Derivative Monomer 6>

Azomethine derivative monomer 6 was synthesized by changing 1-methyl-1H-pyrazole-4-carbaldehyde to 1-methylpyrazole-5-carboxaldehyde.

<Synthesis of Azomethine Derivative Monomer 7>

Azomethine derivative monomer 7 was synthesized by changing 1-methyl-1H-pyrazole-4-carbaldehyde to 1-methylimidazole-4-carboxaldehyde.

<Synthesis of Azomethine Derivative Monomer 8>

Azomethine derivative monomer 8 was synthesized by changing 1-methyl-1H-pyrazole-4-carbaldehyde to 1-methylimidazole-5-carboxaldehyde.

<Synthesis of Azomethine Derivative Monomer 9>

Azomethine derivative monomer 9 was synthesized by changing 1-methyl-1H-pyrazole-4-carbaldehyde to 5-butylthiophene-2-carboxaldehyde, 4-aminophenol to 6-aminonaphthalen-2-ol, and 10-chloro-1-decanol to 6-chloro-1-hexanol.

<Synthesis of Azomethine Derivative Monomer 10>

Azomethine derivative monomer 10 was synthesized by changing 1-methyl-1H-pyrazole-4-carbaldehyde to 1-methyl-1H-pyrazole-3-carboxaldehyde, 4-aminophenol to 4-hydroxy-4'-aminobiphenyl, and 10-chloro-1-decanol to 4-chloro-1-butanol.

<Synthesis of Azomethine Derivative Monomer 11>

Azomethine derivative monomer 11 was synthesized by changing 1-methyl-1H-pyrazole-4-carbaldehyde to 3-formyl-1-methylpyrrole, and 10-chloro-1-decanol to 8-chloro-1-octanol.

<Synthesis of Azomethine Derivative Monomer 13>

Azomethine derivative monomer 13 was synthesized by changing 1-methyl-1H-pyrazole-4-carbaldehyde to 1-butyl-1H-pyrazole-4-carbaldehyde, and 10-chloro-1-decanol to 6-chloro-1-hexanol.

<Synthesis of Azomethine Derivative Monomer 14>

Azomethine derivative monomer 14 was synthesized by changing 4-aminophenol and 1-methyl-1H-pyrazole-4-carbaldehyde to 5-methyl-2-thienylamine and 4-hydroxy-2,6-dimethylbenzaldehyde, and changing 10-chloro-1-decanol to 6-chloro-1-hexanol.

<Synthesis of Azomethine Derivative Monomer 15>

Azomethine derivative monomer 15 was obtained in the same manner as the azomethine derivative monomer 12 by changing acrylic acid chloride to methacrylic acid chloride.

<Synthesis of Azomethine Derivative Monomer 16>

Azomethine derivative monomer 16 was synthesized by changing 4-aminophenol and 1-methyl-1H-pyrazole-4-carbaldehyde to 5-hydroxythiophene-2-carboxaldehyde and 2-aminonaphthalene, and changing 10-chloro-1-decanol to 4-chloro-1-butanol.

<Synthesis of Azomethine Derivative Monomer 17>

Azomethine derivative monomer 17 was synthesized by changing 4-aminophenol and 1-methyl-1H-pyrazole-4-carbaldehyde to 5-hydroxythiophene-2-carboxaldehyde and 2-phenanthreneamine, and changing 10-chloro-1-decanol to 6-chloro-1-hexanol.

<Synthesis of Azomethine Derivative Monomer 18>

Azomethine derivative monomer 18 was synthesized by changing 4-aminophenol to 4-butoxy-1,1'-biphenyl-4-amine, changing 1-methyl-1H-pyrazole-4-carbaldehyde to 1-hydroxypyrazole-4-carbaldehyde, and changing 10-chloro-1-decanol to 6-chloro-1-hexanol.

<Synthesis of Azomethine Derivative Monomer 19> Comparative Example

Azomethine derivative monomer 19 was synthesized in the same manner as the azomethine derivative monomer 12 except that 4-aminophenol was changed to 1,3-dimethyl-1-pyrrole-2 amine, 1-methyl-1H-pyrazole-4-carbaldehyde was changed to 4-hydroxybenzaldehyde, and 10-chloro-1-decanol was changed to 6-chloro-1-hexanol.

<Synthesis of Azobenzene Derivative Monomer> Comparative Example

The following comparative compound 1 (number average molecular weight Mn: 2870) was obtained by the method described in paragraphs 0217 to 0227 of JP 2014-191078 A.

[Chemical 33]

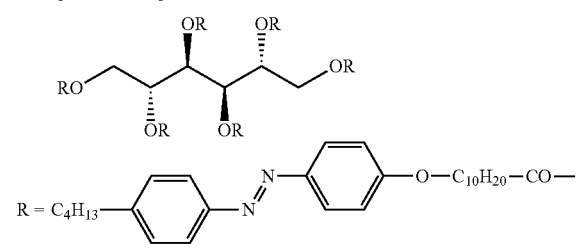

<Polymer 1>

In a 100-ml four-necked flask, 1.8 g (4.21 mmol) of the azomethine derivative monomer 1 obtained above, 5 mg (0.023 mmol) of 4-cyanopentanoic acid dithiobenzoate, and 1 mg (0.006 mmol) of AIBN were dissolved in 4 ml of anisole.

Then, the atmosphere was changed to an argon gas atmosphere by freeze-degassing, and then polymerization was carried out by raising the temperature to 75° C. and stirring the solution for 8 hours. To the resulting polymer solution, 40 ml of methanol was gradually added dropwise, and then THF was added thereto to remove unreacted azomethine derivative monomer 1. The polymer solution thus separated was dried for 24 hours in a vacuum drying furnace at 40° C. to obtain azomethine derivative-containing polymer 1. The number average molecular weight Mn of the obtained polymer 1 was measured by a GPC method, and found to be 15,000.

Meanwhile, molecular weight distribution was measured by GPC as follows.

Specifically, using an apparatus "HLC-8220" (manufactured by TOSOH CORPORATION) and a column "TSKguardcolumn+TSKgel SuperHZM-M3 series" (manufactured by TOSOH CORPORATION), tetrahydrofuran (THF) was flown as a carrier solvent at a flow rate of 0.2 mL/min while maintaining the column temperature at 40° C., a measurement sample was dissolved in tetrahydrofuran to have a concentration of 1 mg/mL under dissolving conditions including 5-minute treatment using an ultrasonic disperser at room temperature (25° C.), a sample solution was obtained subsequently by treating with a membrane filter with a pore size of 0.2 μm, 10 μL of the sample solution was injected to the apparatus together with the carrier solvent, the detection was made by using a refractive index detector (RI detector), and molecular weight distribution of the measurement sample was calculated using a calibration curve determined by using mono-dispersed polystyrene reference particles. As standard polystyrene samples for calibration curve measurement, 10 standard polystyrene samples were measured, using those having a molecular weight of $6 \times 10^2$, $2.1 \times 10^3$, $4 \times 10^3$, $1.75 \times 10^4$, $5.1 \times 10^4$, $1.1 \times 10^5$, $3.9 \times 10^5$, $8.6 \times 10^5$, $2 \times 10^6$, or $4.48 \times 10^6$ manufactured by Pressure Chemical Co., and a calibration curve was prepared. Moreover, a refractive index detector was used as the detector.

The number average molecular weight Mn was calculated from a chromatogram showing a molecular weight distribution measured by GPC as described above.

<Preparation of Polymer Particle Dispersion Liquid 1>

80 Parts by mass of dichloromethane and 20 parts by mass of the polymer 1 obtained above were mixed and stirred while being heated at 50° C. to obtain a solution containing the polymer 1. To 100 parts by mass of the resulting solution, a mixed liquid of 99.5 parts by mass of distilled water warmed to 50° C. and 0.5 parts by mass of a 20% by mass aqueous sodium dodecylbenzenesulfonate solution was added. Thereafter, the mixture was emulsified by stirring for 20 minutes at 16,000 rpm using a homogenizer (manufactured by Heidolph Instruments GmbH & CO. KG) equipped with a shaft generator 18F to obtain an emulsified liquid of the polymer 1. The resulting emulsified liquid was charged into a separable flask, and heated and stirred at 40° C. for 90 minutes while nitrogen was blown into a gas phase to remove the organic solvent, thereby obtaining a polymer particle dispersion liquid 1. The particle size of the polymer particles in the polymer particle dispersion liquid 1 was measured using MICROTRAC UPA-150 (manufactured by NIKKISO CO., LTD.), and found to be 185 nm in terms of a mass average particle size.

(Preparation of Black Colorant Particle Dispersion Liquid (Bk-1))

90 Parts by mass of sodium n-dodecyl sulfate was added to 1,600 parts by mass of ion-exchanged water. While stirring this solution, 320 parts by mass of carbon black "REGAL 330R" (manufactured by Cabot Corporation) was gradually added to the solution, and then dispersion treatment was performed using a stirring device "CLEARMIX" (manufactured by M Technique Co., Ltd.), thereby preparing a black colorant particle dispersion liquid (Bk-1). The volume-based median diameter of the colorant particles in the black colorant particle dispersion liquid (Bk-1) was 110 nm.

(Preparation of Toner 1)

Into a reaction vessel equipped with a stirring device, a temperature sensor and a cooling tube, 480 parts by mass (in terms of solid content) of the particle dispersion liquid of the polymer 1 and 2,000 parts by mass of ion-exchanged water were charged. Then, a 5 mol/L aqueous sodium hydroxide solution was added thereto under stirring at 150 rpm to adjust the pH (in terms of 25° C.) to 10.

Thereafter, 24 parts by mass (in terms of solid content) of the colorant particle dispersion liquid (Bk-1) was charged, and subsequently, an aqueous solution obtained by dissolving 60 parts by mass of magnesium chloride in 60 parts by mass of ion-exchanged water was added thereto at 30° C. over 10 minutes under stirring at 150 rpm. After this system was left for 3 minutes, the temperature was raised to 70° C. over 60 minutes under stirring at 200 rpm, and a particle growth reaction was continued while maintaining at 70° C. In this state, the particle size of aggregate particles was measured with "Coulter Multisizer 3" (manufactured by Beckman Coulter, Inc.), and at the time when the volume-based median diameter (Ds) reached 6.1 μm, an aqueous solution obtained by dissolving 20 parts by mass of sodium chloride in 80 parts by mass of ion-exchanged water was added thereto to stop particle growth. The mixture was stirred at 70° C. for 1 hour, then the temperature was further raised, and the mixture was heated and stirred in a state of 75° C. to implement fusion of the particles. Thereafter, the mixture was cooled to 30° C. to obtain a dispersion liquid of toner base particles.

Subsequently, solid-liquid separation was performed, a toner cake that was dehydrated was washed by repeating an operation of being redispersed in ion-exchanged water and performing solid-liquid separation for 3 times, then dried at 40° C. for 24 hours to obtain toner base particles.

To the resulting toner base particles, 1.5% by mass of hydrophobic silica (number average primary particle size: 12 nm) was added, and the mixture was mixed using a Henschel mixer (registered trademark) to obtain toner 1.

(Toners 2 to 19)

Polymers 2 to 19 having a molecular weight shown in the following table were synthesized by using azomethine derivative monomers shown in the following table and appropriately adjusting polymerization conditions. Meanwhile, in the following table, a structure of A refers to A in the structural unit shown in the general formula (2). In the general formula (2), each polymer has a structural unit in which A is a structure shown in the following table, $r_1$ is a hydrogen atom in the polymers 1 to 14 and 16 to 19, and $r_1$ is a methyl group in the polymer 15.

Hereinafter, toners 2 to 19 were obtained in the same manner as the toner 1.

(Toners 20 to 23)

Polymer 20

Polymer 20 was obtained in the same manner except that in the synthesis of polymer 1, the amount of the azomethine derivative monomer 12 was changed to 1.2 g, and the amount of the styrene monomer was changed to 0.6 g.

Polymers 21 to 23

Polymers 21 to 23 were obtained by changing 0.6 g of the styrene monomer in the synthesis of polymer 20, to 0.6 g of ethyl acrylate, 0.6 g of n-butyl methacrylate, and 0.3 g/0.3 g of styrene monomer/methyl acrylate, respectively.

Toners 20 to 23

Toners 20 to 23 were obtained in the same manner as in the toner 1 using the polymers 20 to 23.

(Toners 24 to 31)

Polymer 24

<Synthesis of Macroinitiator 24>

In a 100-ml recovery flask, 2,2'-bipyridyl (230 mg, 1.47 mmol) was put, and Cu(I)Br (95 mg, 0.66 mmol), styrene (15 g, 144 mmol) and ethyl 2-bromoisobutyrate (35 mg, 0.18 mmol) were further added thereto in a glove box under a nitrogen atmosphere, and the recovery flask was tightly sealed. This was heated and stirred in an oil bath at 100° C. Thereafter, tetrahydrofuran was added thereto in an appropriate amount, and the mixture was passed through a neutral alumina column. This was purified by reprecipitation from methanol and centrifugation to obtain macroinitiator 24. The number average molecular weight (β Mn) of the obtained macroinitiator 24 was measured by a GPC method and found to be 5,000.

<Synthesis of Polymer 24>

In a 100-ml recovery flask, the azomethine derivative monomer 12 (20 g, 47 mmol) obtained above and the macroinitiator 24 (0.92 g, 0.18 mmol) were put, and Cu(I)Cl (29 mg, 0.29 mmol), 1,1,4,7,10,10-hexamethyltriethylenetetramine (136 mg, 0.59 mmol) and anisole (4.9 g, 41.1 mmol) as a solvent were further added thereto in a glove box under a nitrogen atmosphere, and the recovery flask was tightly sealed. Then, the mixture was heated and stirred in an oil bath at 80° C. Thereafter, chloroform was added thereto in an appropriate amount, and the mixture was passed through a basic alumina column. This was purified by reprecipitation from methanol and centrifugation to obtain a polymer 24. The total number average molecular weight Mn of the obtained polymer 24 was measured by a GPC method and found to be 17,000. From this, the number average molecular weight (a Mn) of the structural unit derived from the azomethine derivative is determined to be 12,000.

Toner 24

Toner 24 was prepared in the same manner except that the polymer 24 was used instead of the polymer 1.

Polymer 25

Macroinitiator 25 was obtained by changing, in the preparation of macroinitiator 24, ethyl 2-bromoisobutyrate to α,α'-dibromo-p-xylene. Polymer 25 was obtained in the same manner except that in the synthesis of polymer 24, the macroinitiator 24 was changed to the macroinitiator 25.

Polymer 26

Macroinitiator 26 was obtained in the same manner except that in the synthesis of polymer 24, ethyl 2-bromoisobutyrate was changed to ethylene bis(2-bromoisobutyrate), 2,2'-bipyridyl was changed to 1,1,4,7,10,10-hexamethyltriethylenetetramine, styrene was changed to the azomethine derivative monomer 12, and anisole was further added.

Polymer 26 was obtained in the same manner except that in the synthesis of polymer 24, the macroinitiator 24 was changed to the macroinitiator 26, 1,1,4,7,10,10-hexamethyltriethylenetetramine was changed to 2,2'-bipyridyl, the azomethine derivative monomer 12 was changed to styrene, and anisole was removed.

Polymer 27

Macroinitiator 27 was obtained in the same manner except that in the synthesis of macroinitiator 24, ethyl 2-bromoisobutyrate was changed to 1,1,1-tris(2-bromoisobutyryloxymethyl) ethane.

Polymer 27 was obtained in the same manner except that in the synthesis of polymer 24, the macroinitiator 24 was changed to the macroinitiator 27.

Polymer 28

Macroinitiator 28 was obtained in the same manner except that in the synthesis of macroinitiator 26, ethylene bis(2-bromoisobutyric acid) was changed to 1,1,1-tris(2-bromoisobutyryloxymethyl) ethane.

Polymer 28 was obtained in the same manner except that in the synthesis of polymer 26, the macroinitiator 26 was changed to the macroinitiator 28.

Polymer 29

Macroinitiator 29 was obtained in the same manner except that in the synthesis of macroinitiator 24, ethyl 2-bromoisobutyrate was changed to pentaerythritol tetrakis (2-bromoisobutyrate).

Polymer 29 was obtained in the same manner except that in the synthesis of polymer 24, the macroinitiator 24 was changed to the macroinitiator 29.

Polymer 30

Macroinitiator 30 was obtained in the same manner except that in the synthesis of macroinitiator 26, ethylene bis(2-bromoisobutyric acid) was changed to pentaerythritol tetrakis(2-bromoisobutyrate).

Polymer 30 was obtained in the same manner except that in the synthesis of polymer 26, the macroinitiator 26 was changed to the macroinitiator 30.

Polymer 31

Macroinitiator 31 was obtained in the same manner except that as in the synthesis of macroinitiator 25, styrene was changed to methyl acrylate. Polymer 31 was obtained in the same manner except that in the synthesis of polymer 25, the macroinitiator 25 was changed to the macroinitiator 31.

Toners 24 to 31

Toners 24 to 31 were obtained in the same manner as in the toner 1, by changing the polymer 1 to the polymers 24 to 31.

(Toner 32)

(Preparation of Styrene-Acrylic Resin Particle Dispersion Liquid)

A 5-L reaction vessel equipped with a stirring device, a temperature sensor, a cooling tube and a nitrogen introducing unit was charged with 5.0 parts by mass of sodium lauryl sulfate and 2,500 parts by mass of ion-exchanged water, and the internal temperature of the vessel was raised to 80° C. with stirring at a stirring rate of 230 rpm in a nitrogen stream.

Subsequently, an aqueous solution in which 15.0 parts by mass of potassium persulfate (KPS) was dissolved in 300 parts by mass of ion-exchanged water was added, and the temperature of the liquid was again set to 80° C. Thereafter, a monomer mixed liquid composed of 840.0 parts by mass of styrene (St), 288.0 parts by mass of n-butyl acrylate (BA), 72.0 parts by mass of methacrylic acid (MAA) and 15 parts by mass of n-octyl mercaptan was added dropwise over 2 hours. After completion of the dropwise addition, the mixture was heated and stirred at 80° C. for 2 hours to perform polymerization, thereby preparing a dispersion liquid a1 of styrene-acrylic resin A1 particles having a volume-based median diameter of 120 nm.

The glass transition temperature (Tg) of the styrene-acrylic resin A1 was 52.0° C., and the weight average molecular weight (Mw) was 28,000.

Toner 32

Toner 32 was obtained in the same manner except that in the preparation of the toner 1, 480 parts by mass (in terms of solid content) of the particle dispersion liquid of the polymer 1 was changed to 336 parts by mass (in terms of solid content) of the particle dispersion liquid of the polymer 12 and 144 parts by mass (in terms of solid content) of the dispersion liquid a1 of the styrene-acrylic resin A1 particles.

(Toner 33)

<Preparation of Amorphous Polyester Resin Dispersion Liquid>

A reaction vessel equipped with a stirring apparatus, a thermometer, a condenser and a nitrogen gas introduction tube was charged with monomers of the following composition and 0.25 parts by mass of tin dioctylate with respect to 100 parts by mass of a total of monomers of the following composition. The mixture was reacted at 235° C. for 6 hours under a nitrogen gas stream, then cooled to 200° C., and reacted for 1 hour. The temperature was raised to 220° C. over 5 hours, and polymerization was performed under a pressure of 10 kPa until a desired molecular weight was obtained, thereby obtaining a pale yellow transparent amorphous polyester resin (B1). The weight average molecular weight of the amorphous polyester resin (B1) was 18,000, and the acid value was 17.8 mgKOH/g.

| | |
|---|---|
| Bisphenol A ethylene oxide 2 mol adduct | 50.2 parts by mass |
| Bisphenol A propylene oxide 2 mol adduct | 249.8 parts by mass |
| Terephthalic acid | 82.5 parts by mass |
| Fumaric acid | 32.0 parts by mass |

72 Parts by mass of the amorphous polyester resin (B1) was added to 72 parts by mass of methyl ethyl ketone, and dissolved by stirring the mixture at 30° C. for 30 minutes. 2.1 Parts by mass of a 25% by mass aqueous sodium hydroxide solution was added to the oil phase liquid, and the mixture was placed in a reaction vessel having a stirring apparatus. While stirring the oil phase liquid, 252 parts by mass of ion-exchanged water at 30° C. was added dropwise over 70 minutes and mixed. During the dropwise addition, the liquid in the vessel became cloudy, and after the entire amount was added dropwise, an emulsified liquid in a uniform emulsified state was obtained.

This emulsified liquid was heated to 60° C. and stirred for 3 hours under a reduced pressure of 15 kPa (150 mbar) using a diaphragm type vacuum pump V-700 (manufactured by BUCHI), thereby distilling and removing methyl ethyl ketone to prepare an amorphous polyester resin particle dispersion liquid (B1).

Toner 33

Toner 33 was obtained in the same manner except that in the preparation of the toner 1, 480 parts by mass (in terms of solid content) of the particle dispersion liquid of the polymer 1 was changed to 336 parts by mass (in terms of solid content) of the particle dispersion liquid of the polymer 12 and 144 parts by mass (in terms of solid content) of the dispersion liquid B1 of the amorphous polyester resin B1 particles.

Comparative Example 1 Toner

Comparative toner 1 was obtained in the same manner except that the azomethine derivative monomer 1 was changed to the azomethine derivative monomer 19.

Comparative Example 2 Toner

Comparative toner 2 was obtained in the same manner except that the azomethine derivative monomer 1 was changed to the azobenzene derivative monomer.

(Preparation of Developer)

The toners 1 to 33 and the toners of Comparative Examples 1 and 2 prepared above were mixed with ferrite carrier particles coated with a copolymer resin of cyclohexane methacrylate and methyl methacrylate (monomer mass ratio 1:1) with a volume average particle size of 30 μm so as to obtain a toner particle concentration of 6% by mass, and developers 1 to 33 and developers of Comparative Examples 1 and 2 were obtained. Mixing was carried out for 30 minutes using a V-type mixer.

[Evaluation: Photoresponsive Adhesion Test of Polymer]

Changes in adhesiveness associated with light irradiation of the polymers 1 to 33 prepared in each of Examples were evaluated in the following photoresponsive adhesion test using a device illustrated in a figure. As shown in the figure, 2 mg of a polymer was mounted on a cover glass 1 of 18 mm square within a radius of 6 mm from the center of the glass, and a cover glass 2 of the same size was covered at a position shifted by about 4 mm in a direction parallel to the cover glass 1 so as to cover the entire polymer. This was heated to melt the sample, and thus the cover glass 1 and the cover glass 2 were adhered. Each of the resulting samples was subjected to a non-fluidity→fluidity test as described below and then subjected to a fluidity→non-fluidity (return) test as described below.

<Non-Fluidity→Fluidity Test>

A part (A) shown in FIG. 3 was fixed to a holder with cellophane tape, and a vinyl string of 30 cm long loaded with a 100-g weight was fixed to a part (C) with cellophane tape. A part (B) was irradiated with light at 365 nm in an irradiation amount of 20 J/cm², whether the cover glass 2 would come off from the cover glass 1 was confirmed, and the result was determined according to the following evaluation criteria.

—Evaluation Criteria for Non-Fluidity→Fluidity Test—
○: The cover glass 2 completely came off from the cover glass 1.

Δ: The cover glass 2 was shifted.
×: The cover glass 2 did not move.

<Fluidity→Non-Fluidity (Return) Test>

After completion of the non-fluidity→fluidity test, the following experiment was performed on a sample in which the cover glass 2 completely came off and a sample in which the cover glass 2 was shifted. Meanwhile, for the sample shifted, the cover glasses 1 and 2 were peeled off by hand. Five minutes after completion of light irradiation of the non-fluidity→fluidity test (for 5 minutes, left in a natural environment, that is, in a dark room at room temperature), a cover glass 3 (of the same size as the cover glasses 1 and 2) was mounted so as to cover the sample portion (part (B)) of the cover glass 1 used in the above test, whether the cover glass 1 and the cover glass 3 would adhere to each other was confirmed, and the result was determined according to the following evaluation criteria.

—Evaluation Criteria for Fluidity→Non-Fluidity (Return) Test—
○: Did not adhere (non-fluidized)
Δ: Partially adhered (a fluidized state was maintained in some portion)
×: Adhered (a fluidized state was maintained).

Meanwhile, it could be confirmed that all of the polymers prepared in Examples, which were rated ○ in the evaluation of the fluidity→non-fluidity (return) test, were re-solidified after the non-fluidity→fluidity test was performed.

[Evaluation: Fixability Test]

A fixability test was performed using the developers 1 to 33 and the developers of Comparative Examples 1 and 2 obtained above, in a normal temperature and normal humidity environment (temperature: 20° C., relative humidity: 50% RH). A developer was disposed between a pair of parallel flat plate (aluminum) electrodes, the developer being placed on one electrode and a paper (Mondi color copy paper, basis weight: 120 g/m²) as a recording medium being placed on the other electrode, while the developer was caused to slide by magnetic force, and the toner was developed at a gap between the electrodes of 0.5 mm under conditions of a DC bias and an AC bias so that the toner adhesion amount would be 5 g/m². Thus, a toner layer was formed on the surface of the plain paper and was fixed with each fixing device to obtain a printed matter (image formation). A toner image of 1 cm square of this printed matter was rubbed 15 times with "JK Wiper (registered trademark)" (manufactured by NIPPON PAPER CRECIA CO., LTD.) under a pressure of 50 kPa, and the fixing ratio of the image was evaluated. A fixing ratio of 60% or more was defined as acceptable. Meanwhile, the fixing ratio of the image is a numerical value expressed in percentage, obtained by measuring the reflection densities of the printed image and the rubbed image with a fluorescence spectral densitometer "FD-7" (manufactured by Konica Minolta, Inc.), and dividing the reflection density of the rubbed solid image by the reflection density of the printed solid image.

As the fixing device, the following four types of fixing devices configured by appropriately modifying the device illustrated in FIG. 2 were used:

No. 1: The compression unit 9 of FIG. 2 is absent, heating is not performed by the heating member 93, the wavelength of ultraviolet light irradiated from the light source 41 is 365 nm (light source: LED light source with an emission wavelength of 365 nm+10 nm), and the irradiation amount is 12 J/cm²;

No. 2: The compression unit 9 of FIG. 2 is present, heating is not performed by the heating member 93, the temperature of the pressing member 91 is 20° C., and the pressure at the time of pressing is 0.2 MPa. The light source and the irradiation amount of the irradiation unit 40 are similar to those of No. 1;

No. 3: The compression unit 9 of FIG. 2 is present, heating is not performed by the heating member 93, the temperature of the pressing member 91 is 50° C., and the pressure at the time of pressing is 0.2 MPa. The light source and the irradiation amount of the irradiation unit 40 are similar to those of No. 1.

No. 4: The compression unit 9 of FIG. 2 is absent, the temperature of the heating member 93 is 50° C., and the wavelength and irradiation amount of the light source 41 are similar to those of No. 1.

[Color Reproducibility Evaluation]

Color reproducibility of the images of Examples and Comparative Examples obtained above was evaluated by visual evaluation by 10 monitors according to the following evaluation criteria. Specifically, as samples for evaluation and comparison, toners in which the polymer 1 was all changed to a styrene-acrylic resin were prepared. Developers were prepared in the same manner as described above using these toners, development was carried out in the same manner as the image formation in the fixability test, and fixation was carried out with the following fixing device No. 5.

Fixing device No. 5: The compression unit 9 of FIG. 2 is present, heating is not performed by the heating member 93, the temperature of the pressing member 91 is 150° C., the pressure at the time of pressing is 0.2 MPa, and light irradiation is not carried out.

The images of the samples for evaluation and comparison and the images obtained in Examples and Comparative Examples described above were shown in sequence to the 10 monitors, and the monitors were asked whether the colors of two images were clearly different. The determination results based on the following evaluation criteria for color reproducibility are shown in Table 3 below.

—Evaluation Criteria for Color Reproducibility—

⊚: 2 or less monitors answered that the colors were clearly different.

○: 3 to 4 monitors answered that the colors were clearly different.

Δ: 5 to 7 monitors answered that the colors were clearly different.

x: 8 or more monitors answered that the colors were clearly different.

[Table 13-1]

TABLE 13

| Table 9 Monomer No. | r1 | Structure of A |
|---|---|---|
| 1 | H | —$C_{10}H_{20}O$—C6H4—N=CH—(5-methyl-2-thienyl) |
| 2 | H | —$C_6H_{12}O$—C6H4—N=CH—(5-hexyl-2-thienyl) |
| 3 | H | —$C_6H_{12}$—C6H4—N=CH—(5-methyl-2-furyl) |
| 4 | H | —$C_8H_{16}O$—C6H4—N=CH—(1-methyl-2-pyrrolyl) |
| 5 | H | —$C_{10}H_{20}O$—C6H4—N=CH—(1-methyl-3-pyrazolyl) |
| 6 | H | —$C_{10}H_{20}O$—C6H4—N=CH—(1-methyl-5-pyrazolyl) |

TABLE 13-continued

| Table 9 Monomer No. | rl | Structure of A |
|---|---|---|
| 7 | H | —C₁₀H₂₀O—C₆H₄—N=CH—(1-methylimidazol-5-yl) |
| 8 | H | —C₁₀H₂₀O—C₆H₄—N=CH—(1-methylimidazol-4-yl) |
| 9 | H | —C₆H₁₂O—(naphthalen-2,6-diyl)—N=CH—(5-butylthiophen-2-yl) |
| 10 | H | —C₄H₈O—(biphenyl-4,4'-diyl)—N=CH—(1-methylpyrazol-3-yl) |
| 11 | H | —C₈H₁₆O—C₆H₄—N=CH—(1-methylpyrrol-3-yl) |
| 12 | H | —C₁₀H₂₀O—C₆H₄—N=CH—(1-methylpyrazol-4-yl) |
| 13 | H | —C₆H₁₂O—C₆H₄—N=CH—(1-butylpyrazol-4-yl) |
| 14 | H | —C₆H₁₂O—(2,6-dimethylphenyl)—N=CH—(5-methylthiophen-2-yl) |
| 15 | CH₃ | —C₁₀H₂₀O—C₆H₄—N=CH—(1-methylpyrazol-4-yl) |
| 16 | H | —C₄H₈O—(thiophen-2,5-diyl)—CH=N—(naphthalen-2-yl) |

TABLE 13-continued

Table 9

| Monomer No. | rl | Structure of A |
|---|---|---|
| 17 | H | 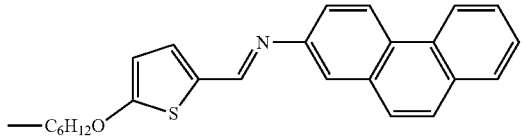 |
| 18 | H | 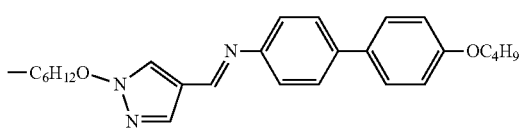 |
| 19 (Comparative) | H | 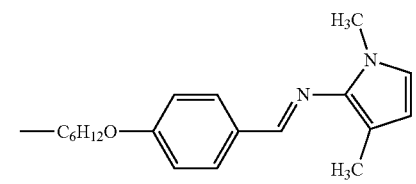 |
| Comparative | | Azobenzene derivative |

TABLE 14

| Polymer No. | Polymer structure | Structural unit α of general formula (1) Monomer No. | α Mn | Other structural unit β Structural unit | β Mn | Mn | Photoresponsive adhesion test Fluidization | Non-fluidization | |
|---|---|---|---|---|---|---|---|---|---|
| 1 | Homopolymer | 1 | — | — | — | 15000 | ○ | ○ | |
| 2 | Homopolymer | 2 | — | — | — | 17000 | ○ | ○ | |
| 3 | Homopolymer | 3 | — | — | — | 8300 | ○ | ○ | |
| 4 | Homopolymer | 4 | — | — | — | 5400 | ○ | ○ | |
| 5 | Homopolymer | 5 | — | — | — | 11000 | ○ | ○ | |
| 6 | Homopolymer | 6 | — | — | — | 19000 | ○ | ○ | |
| 7 | Homopolymer | 7 | — | — | — | 25000 | ○ | ○ | |
| 8 | Homopolymer | 8 | — | — | — | 3500 | ○ | ○ | |
| 9 | Homopolymer | 9 | — | — | — | 45000 | ○ | ○ | |
| 10 | Homopolymer | 10 | — | — | — | 16000 | ○ | ○ | |
| 11 | Homopolymer | 11 | — | — | — | 12000 | ○ | ○ | |
| 12 | Homopolymer | 12 | — | — | — | 6800 | ○ | ○ | |
| 13 | Homopolymer | 13 | — | — | — | 15000 | ○ | ○ | |
| 14 | Homopolymer | 14 | — | — | — | 13000 | ○ | ○ | |
| 15 | Homopolymer | 15 | — | — | — | 9500 | ○ | ○ | |
| 16 | Homopolymer | 16 | — | — | — | 12500 | ○ | ○ | |
| 17 | Homopolymer | 17 | — | — | — | 14000 | ○ | ○ | |
| 18 | Homopolymer | 18 | — | — | — | 9600 | ○ | ○ | |
| 19 | Homopolymer | 12 | — | — | — | 3000 | ○ | ○ | |
| 20 | Random copolymer | 12 | — | St | — | 12000 | ○ | ○ | |
| 21 | Random copolymer | 12 | — | EA | — | 9300 | ○ | ○ | |
| 22 | Random copolymer | 12 | — | n BMA | — | 7500 | ○ | ○ | |
| 23 | Random copolymer | 12 | — | St/MA | — | 15000 | ○ | ○ | |
| 24 | Block copolymer α-β | 12 | 12000 | St | 5000 | 17000 | ○ | ○ | |
| 25 | Block copolymer 2α-β | 12 | 11000 | St | 9000 | 20000 | ○ | ○ | |
| 26 | Block copolymer α-2β | 12 | 7000 | St | 6600 | 13600 | ○ | ○ | |
| 27 | Block copolymer 3α-β | 12 | 4800 | St | 32400 | 37200 | ○ | ○ | |
| 28 | Block copolymer α-3β | 12 | 6600 | St | 9000 | 15600 | ○ | ○ | |
| 29 | Block copolymer 4α-β | 12 | 1000 | St | 2400 | 3400 | ○ | ○ | |
| 30 | Block copolymer α-4β | 12 | 12000 | St | 27000 | 39000 | ○ | ○ | |
| 31 | Block copolymer 2α-β | 12 | 12000 | MA | 7500 | 19500 | ○ | ○ | |
| 32 | Homopolymer | 19 | — | — | — | 15000 | x | x | Comparative Example 1 |
| 33 | Azobenzene derivative | — | — | — | — | — | ○ | x | Comparative Example 2 |

St: styrene, EA: ethyl acrylate, nBMA: n-buty methacrylate, MA: methyl acrylate

TABLE 15

| Example No. | Toner No. | Polymer No. | Polymer Ratio (% by mass) | Binder resin Type | Binder resin Ratio (% by mass) | Fixing device No. | Fixability Rank | Fixability Fixing ratio | Color reproducibility |
|---|---|---|---|---|---|---|---|---|---|
| 1 | 1 | 1 | 100 | — | — | 1 | Δ | 72 | ◎ |
| 2 | 2 | 2 | 100 | — | — | 1 | Δ | 74 | ◎ |
| 3 | 3 | 3 | 100 | — | — | 1 | Δ | 68 | ◎ |
| 4 | 4 | 4 | 100 | — | — | 1 | Δ | 71 | ◎ |
| 5 | 5 | 5 | 100 | — | — | 1 | Δ | 72 | ◎ |
| 6 | 6 | 6 | 100 | — | — | 1 | Δ | 67 | ◎ |
| 7 | 7 | 7 | 100 | — | — | 1 | Δ | 70 | ◎ |
| 8 | 8 | 8 | 100 | — | — | 1 | Δ | 71 | ◎ |
| 9 | 9 | 9 | 100 | — | — | 1 | ○ | 78 | ◎ |
| 10 | 10 | 10 | 100 | — | — | 1 | ○ | 76 | ◎ |
| 11 | 11 | 11 | 100 | — | — | 1 | ◎ | 90 | ◎ |
| 12 | 12 | 12 | 100 | — | — | 1 | ◎ | 93 | ◎ |
| 13 | 13 | 13 | 100 | — | — | 1 | ◎ | 94 | ◎ |
| 14 | 14 | 14 | 100 | — | — | 1 | Δ | 65 | ◎ |
| 15 | 15 | 15 | 100 | — | — | 1 | ◎ | 92 | ◎ |
| 16 | 16 | 16 | 100 | — | — | 1 | ○ | 80 | ◎ |
| 17 | 17 | 17 | 100 | — | — | 1 | ○ | 81 | ◎ |
| 18 | 18 | 18 | 100 | — | — | 1 | ◎ | 92 | ◎ |
| 19 | 19 | 19 | 100 | — | — | 1 | ○ | 84 | ◎ |
| 20 | 20 | 20 | 100 | — | — | 1 | ◎ | 90 | ◎ |
| 21 | 21 | 21 | 100 | — | — | 1 | ◎ | 93 | ◎ |
| 22 | 22 | 22 | 100 | — | — | 1 | ◎ | 93 | ◎ |
| 23 | 23 | 23 | 100 | — | — | 1 | ◎ | 92 | ◎ |
| 24 | 24 | 24 | 100 | — | — | 1 | ◎ | 92 | ◎ |
| 25 | 25 | 25 | 100 | — | — | 1 | ◎ | 94 | ◎ |
| 26 | 26 | 26 | 100 | — | — | 1 | ◎ | 90 | ◎ |
| 27 | 27 | 27 | 100 | — | — | 1 | ○ | 86 | ◎ |
| 28 | 28 | 28 | 100 | — | — | 1 | ◎ | 91 | ◎ |
| 29 | 29 | 29 | 100 | — | — | 1 | ○ | 78 | ◎ |
| 30 | 30 | 30 | 100 | — | — | 1 | ○ | 86 | ◎ |
| 31 | 31 | 31 | 100 | — | — | 1 | ◎ | 90 | ◎ |
| 32 | 12 | 12 | 70 | Styrene-acrylic resin | 30 | 1 | ○ | 84 | ◎ |
| 33 | 12 | 12 | 70 | Polyester resin | 30 | 1 | ○ | 82 | ◎ |
| 34 | 12 | 12 | 100 | — | — | 2 | ◎ | 95 | ◎ |
| 35 | 12 | 12 | 100 | — | — | 3 | ◎ | 97 | ◎ |
| 36 | 12 | 12 | 100 | — | — | 4 | ◎ | 95 | ◎ |
| Comparative Example 1 | 32 | 32 | 100 | — | — | 1 | X | 53 | ◎ |
| Comparative Example 2 | 33 | 33 | 100 | — | — | 1 | X | 35 | X |

REFERENCE SIGNS LIST

1 Photoreceptor
2 Charging device
3 Exposure device
4 Developing unit
5 Transfer unit
7 Paper conveyance system
8 Cleaning unit
9 Compression unit
10 Image forming unit
11 Paper feeding unit
12 Conveyance roller
13 Conveyance belt
14 Paper ejection unit
15 Manual paper feeding unit
16 Tray
17 Temperature humidity meter
20 Image processing unit
24 Paper inverting unit
40 Irradiation unit
41 Light source
71 Image reading device
72 Automatic document feeder
85 Blade
90 Control unit
91,92 Pressing member
93 Heating member
100 Image forming apparatus
d Document
S Recording paper

What is claimed is:

1. A photoresponsive polymer comprising a structural unit derived from an azomethine derivative represented by the following general formula (1), the photoresponsive polymer being fluidized by light irradiation and reversibly non-fluidized:

$$R_1\text{—}Z_1\text{=}Z_2\text{—}R_2 \qquad \text{General formula (1):}$$

wherein $Z_1$ and $Z_2$ are N or CH, while $Z_1 \neq Z_2$,
$R_1$ contains an aromatic hydrocarbon structure,
$R_2$ contains an aromatic heterocyclic structure, and
a hydrogen atom is bonded to at least one carbon atom bonded adjacent to a carbon atom in the aromatic heterocyclic structure bonded to the $Z_2$, and
wherein a number average molecular weight Mn of the photoresponsive polymer is 3,000 or more.

2. The photoresponsive polymer according to claim 1, comprising a structure derived from a (meth)acrylic acid ester.

3. The photoresponsive polymer according to claim 1, comprising a structural unit represented by general formula (2):

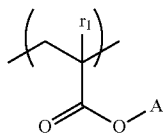

General formula (2)

in the general formula (2),
$r_1$ is a hydrogen atom or a methyl group, and
A is any one of general formulae (1-1) to (1-4):

*—$R_1$—$Z_1$=$Z_2$—$R_2$    General formula (1-1)

*-G-$R_1$—$Z_1$=$Z_2$—$R_2$    General formula (1-2)

*—$R_2$—$Z_2$=$Z_1$—$R_1$    General formula (1-3)

*-G-$R_2$—$Z_2$=$Z_1$—$R_1$    General formula (1-4)

wherein
* represents a bonding point, G is a divalent group, and $R_1$, $Z_1$, $Z_2$ and $R_2$ are as defined in the general formula (1).

4. The photoresponsive polymer according to claim 3, wherein the G is an alkylene group having 1 to 18 carbon atoms or an oxyalkylene group having 1 to 18 carbon atoms.

5. The photoresponsive polymer according to claim 1, wherein all atoms bonded adjacent to a carbon atom in the aromatic heterocyclic structure bonded to the $Z_2$ are carbon atoms, and a hydrogen atom is bonded to each of the said carbon atoms.

6. The photoresponsive polymer according to claim 3, wherein the A is represented by the general formula (1-1) or the general formula (1-2), wherein the "$Z_2$—$R_2$" structure is represented by the following formula:

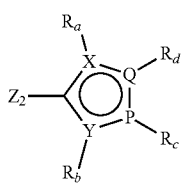

wherein at least two of X, Y, P and Q are carbon atoms, and the remainder is
a nitrogen atom, a sulfur atom or an oxygen atom, provided that at least one of X and Y is a carbon atom, and $R_a$, $R_b$, $R_c$ and $R_d$ are each independently an alkyl group having 1 to 18 carbon atoms, an alkoxy group having 1 to 18 carbon atoms or a hydrogen atom when $R_a$, $R_b$, $R_c$ and $R_d$ are present according to valences of X, Y, P and Q, provided that at least one of $R_a$ and $R_b$ bonded to a carbon atom is a hydrogen atom, and $R_a$ and $R_b$ and $R_c$ and $R_d$ may each independently form a fused ring.

7. The photoresponsive polymer according to claim 6, wherein the P and the Q are nitrogen atoms,
the X and the Y are both carbon atoms,
the $R_a$ and the $R_b$ are both hydrogen atoms, and
at least one of the $R_c$ and $R_d$ is an alkyl group having 4 or more carbon atoms.

8. The photoresponsive polymer according to claim 3, wherein the A is represented by the general formula (1-3) or the general formula (1-4), wherein the "—$R_2$—$Z_2$" structure is represented by the following formula:

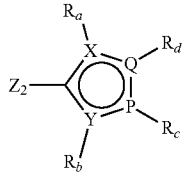

wherein at least two of X, Y, P and Q are carbon atoms, and the remainder is
a nitrogen atom, a sulfur atom or an oxygen atom, provided that at least one of X and Y is a carbon atom, and $R_a$ and $R_b$ are each independently an alkyl group having 1 to 18 carbon atoms, an alkoxy group having 1 to 18 carbon atoms or a hydrogen atom when $R_a$ and $R_b$ are present according to valences of X, Y, P and Q, provided that at least one of $R_a$ and $R_b$ bonded to a carbon atom is a hydrogen atom, one of $R_c$ and $R_d$ is a structure derived from a polymerizable group or a single bond bonded to the G, and the other is an alkyl group having 1 to 18 carbon atoms, an alkoxy group having 1 to 18 carbon atoms or a hydrogen atom when the said other is present according to the valence.

9. The photoresponsive polymer according to claim 8, wherein the P and the Q are nitrogen atoms,
the X and the Y are both carbon atoms,
the $R_a$ and the $R_b$ are both hydrogen atoms, and
one of the $R_c$ and the $R_d$ is a structure derived from a polymerizable group or a single bond bonded to the G, and the other is not present.

10. The photoresponsive polymer according to claim 1, further comprising other structural unit derived from a monomer having a vinyl-based polymerizable group.

11. The photoresponsive polymer according to claim 10, wherein the monomer having a vinyl-based polymerizable group is at least one selected from the group consisting of styrene derivatives, (meth)acrylic acid derivatives, and olefin derivatives.

12. The photoresponsive polymer according to claim 1, wherein the following general formula (3):

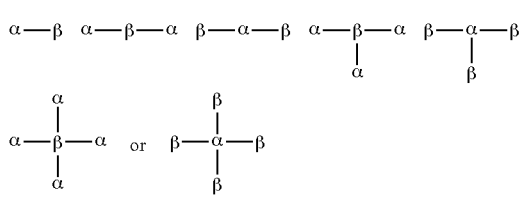

wherein
αs are each independently a polymer block containing a structural unit represented by the general formula (2), and
βs are each independently a polymer block containing a structural unit other than the structural unit represented by the general formula (2).

13. The photoresponsive polymer according to claim 12, wherein
a number average molecular weight of the α is 1,000 or more,
a number average molecular weight of the β is 1,000 or more, and
a total number average molecular weight is 3,000 or more.

14. The photoresponsive polymer according to claim 12, wherein the β is a polymer block containing at least one structural unit selected from the group consisting of styrene derivatives, (meth)acrylic acid derivatives, and olefin derivatives.

15. The photoresponsive polymer according to claim 1, wherein a wavelength of light in the light irradiation is 280 nm or more and 480 nm or less.

16. A toner comprising the photoresponsive polymer according to claim 1 as a binder resin.

17. The toner according to claim 16, further comprising another binder resin.

18. The toner according to claim 17, wherein the another binder resin contains at least one selected from the group consisting of styrene-acrylic resins and polyester resins.

19. An image forming method comprising:
forming a toner image formed of the toner according to claim 16 on a recording medium; and
irradiating the toner image with light to soften the toner image.

20. The image forming method according to claim 19, wherein a wavelength of the light is 280 nm or more and 480 nm or less.

21. The image forming method according to claim 19, further comprising pressing the toner image.

22. The image forming method according to claim 21, further comprising heating the toner image in the pressing.

23. The image forming method according to claim 22, wherein a temperature in the heating is more than 20° C.

24. The image forming method according to claim 19, wherein, in the irradiating the toner image with light to soften the toner image, the toner image is heated together with light irradiation.

25. A photoresponsive adhesive comprising the photoresponsive polymer according to claim 1.

26. An optical switching material comprising the photoresponsive polymer according to claim 1.

* * * * *